(12) United States Patent
Saha et al.

(10) Patent No.: US 12,443,902 B2
(45) Date of Patent: Oct. 14, 2025

(54) METHOD AND SYSTEM FOR UTILITY INFRASTRUCTURE CONDITION MONITORING, DETECTION AND RESPONSE

(71) Applicant: Green Grid Inc., San Ramon, CA (US)

(72) Inventors: Chinmoy Prosun Saha, San Ramon, CA (US); Jeffrey Scott Pickles, Sunnyvale, CA (US); Kourosh Jafari Khouzani, Lexington, MA (US)

(73) Assignee: Green Grid Inc., San Ramon, CA (US)

( * ) Notice: Subject to any disclaimer, the term of this patent is extended or adjusted under 35 U.S.C. 154(b) by 905 days.

(21) Appl. No.: 16/951,213

(22) Filed: Nov. 18, 2020

(65) Prior Publication Data

US 2021/0073692 A1 Mar. 11, 2021

Related U.S. Application Data

(63) Continuation-in-part of application No. 15/330,978, filed on Jun. 11, 2017, now Pat. No. 10,880,623.
(Continued)

(51) Int. Cl.
*G06Q 10/0631* (2023.01)
*B63B 35/00* (2020.01)
(Continued)

(52) U.S. Cl.
CPC ....... *G06Q 10/06316* (2013.01); *B63B 35/00* (2013.01); *G01S 17/89* (2013.01);
(Continued)

(58) Field of Classification Search
CPC .......... G06Q 10/0635; G06Q 10/0631; G06N 20/00; B63B 35/00; B63B 2035/00; B64C 39/024; H04N 7/185; G06V 20/188
(Continued)

(56) References Cited

U.S. PATENT DOCUMENTS 8,027,349 B2 * 9/2011 Brown ................... G05B 19/19
703/23
8,738,318 B2 5/2014 Spillane
(Continued)

FOREIGN PATENT DOCUMENTS

CA 2810224 A1 2/2012
CA 2994508 A1 2/2017
(Continued)

OTHER PUBLICATIONS

Li, et al.: "Advances in Vegetation Management for Power Line Corridor Monitoring Using Aerial Remote Sensing Techniques," 2010 1st International Conference on Applied Robotics for the Power Industry (2010).
(Continued)

*Primary Examiner* — Rutao Wu
*Assistant Examiner* — Stephen S Swartz
(74) *Attorney, Agent, or Firm* — Harness, Dickey & Pierce, PLC

(57) ABSTRACT

Systems and methods for utility infrastructure condition monitoring, detection, and response are disclosed. One exemplary system includes a sensor package and a monitoring and control module. The sensor package includes a plurality of sensors such as, for example, an image sensor, a video sensor, and a LiDAR sensor. The sensors may each be configured to capture data indicative of one or more conditions (e.g., an environmental condition, a structural condition, etc.) in the vicinity of the utility infrastructure. The monitoring and control includes a detection module and an alert module. The detection module is configured to receive data captured by each sensor and, based on the captured data, determine one or more conditions in the vicinity of the utility infrastructure. The detection module may be configured to then, based on the determined condi-
(Continued)

tions, provide an alert for the condition using the alert module.

24 Claims, 28 Drawing Sheets

Related U.S. Application Data

(60) Provisional application No. 62/348,950, filed on Jun. 12, 2016.

(51) Int. Cl.
| | | |
|---|---|---|
| G01S 17/89 | (2020.01) | |
| G06N 20/00 | (2019.01) | |
| G06Q 10/0635 | (2023.01) | |
| G06Q 40/08 | (2012.01) | |
| G06Q 50/163 | (2024.01) | |
| G06Q 50/26 | (2012.01) | |
| G06T 7/20 | (2017.01) | |
| G06V 10/764 | (2022.01) | |
| G06V 10/82 | (2022.01) | |
| G06V 20/10 | (2022.01) | |
| G06V 20/52 | (2022.01) | |
| G08B 17/00 | (2006.01) | |
| G08B 21/10 | (2006.01) | |
| G08B 21/16 | (2006.01) | |
| G08B 29/20 | (2006.01) | |
| H04N 7/18 | (2006.01) | |
| B64U 101/26 | (2023.01) | |
| B64U 101/30 | (2023.01) | |

(52) U.S. Cl.
CPC ....... *G06N 20/00* (2019.01); *G06Q 10/06315* (2013.01); *G06Q 10/0635* (2013.01); *G06Q 40/08* (2013.01); *G06Q 50/163* (2013.01); *G06Q 50/265* (2013.01); *G06T 7/20* (2013.01); *G06V 10/764* (2022.01); *G06V 10/82* (2022.01); *G06V 20/188* (2022.01); *G06V 20/52* (2022.01); *G08B 17/005* (2013.01); *G08B 21/10* (2013.01); *G08B 21/16* (2013.01); *G08B 29/20* (2013.01); *H04N 7/185* (2013.01); *B64U 2101/26* (2023.01); *B64U 2101/30* (2023.01)

(58) Field of Classification Search
USPC .......... 705/34; 169/70, 52; 348/61; 700/298; 340/540
See application file for complete search history.

(56) References Cited

U.S. PATENT DOCUMENTS

| | | | |
|---|---|---|---|
| 9,784,766 B2 | 10/2017 | Lindsey et al. | |
| 9,784,836 B2* | 10/2017 | Heinonen | G01S 17/89 |
| 9,913,003 B2 | 3/2018 | Lloyd et al. | |
| 10,032,267 B2* | 7/2018 | Strebel | G01S 7/4802 |
| 10,102,586 B1* | 10/2018 | Marlow | B64C 39/024 |
| 10,127,449 B2* | 11/2018 | Pestun | G08G 5/0052 |
| 10,145,684 B1* | 12/2018 | Tofte | G01C 11/02 |
| 10,212,495 B2 | 2/2019 | Lloyd et al. | |
| 2007/0055559 A1* | 3/2007 | Clawson | G06Q 50/265 |
| | | | 705/325 |
| 2009/0321094 A1* | 12/2009 | Thomas | A62C 3/025 |
| | | | 169/70 |
| 2011/0122240 A1* | 5/2011 | Becker | H04N 23/50 |
| | | | 348/61 |
| 2011/0266011 A1* | 11/2011 | Lee | A62C 37/12 |
| | | | 169/52 |
| 2012/0029871 A1 | 2/2012 | Spillane | |
| 2012/0046799 A1* | 2/2012 | Alex | G01R 15/142 |
| | | | 700/298 |
| 2012/0169498 A1* | 7/2012 | Leppanen | G06V 20/188 |
| | | | 702/2 |
| 2014/0136379 A1* | 5/2014 | Smith | G08B 29/00 |
| | | | 705/34 |
| 2014/0164306 A1* | 6/2014 | Datta | G06T 17/05 |
| | | | 706/46 |
| 2014/0176702 A1* | 6/2014 | Davis | G01K 13/00 |
| | | | 348/135 |
| 2014/0177928 A1* | 6/2014 | Bangay | G06V 20/182 |
| | | | 382/113 |
| 2014/0211005 A1* | 7/2014 | Dow | G06T 7/60 |
| | | | 356/4.01 |
| 2014/0324351 A1* | 10/2014 | Dannevik | G08B 21/10 |
| | | | 702/3 |
| 2015/0129245 A1* | 5/2015 | Weber | A62C 3/0271 |
| | | | 169/61 |
| 2015/0131079 A1* | 5/2015 | Heinonen | G06Q 10/0631 |
| | | | 356/4.01 |
| 2015/0149617 A1* | 5/2015 | Lai | H04L 43/08 |
| | | | 709/224 |
| 2015/0254738 A1* | 9/2015 | Wright, III | G06V 20/13 |
| | | | 705/26.81 |
| 2016/0229533 A1* | 8/2016 | van Cruyningen | G05D 1/0094 |
| 2016/0292312 A1 | 10/2016 | Saha et al. | |
| 2016/0299229 A1* | 10/2016 | Heinonen | G01S 17/86 |
| 2017/0052222 A1* | 2/2017 | Pasdar | H01H 47/00 |
| 2018/0098137 A1* | 4/2018 | Saha | H04Q 9/00 |
| 2018/0238955 A1* | 8/2018 | Bango | G08B 21/02 |
| 2020/0293773 A1* | 9/2020 | Loveland | G01J 1/44 |
| 2020/0334904 A1 | 10/2020 | Chang et al. | |
| 2020/0342744 A1 | 10/2020 | Patel et al. | |
| 2021/0073692 A1* | 3/2021 | Saha | G06Q 10/20 |
| 2021/0182569 A1 | 6/2021 | Lindsey et al. | |
| 2021/0183039 A1 | 6/2021 | Lindsey et al. | |
| 2021/0219383 A1 | 7/2021 | Trott et al. | |
| 2022/0069577 A1 | 3/2022 | DeSalvo et al. | |
| 2023/0012038 A1 | 1/2023 | Iyer et al. | |

FOREIGN PATENT DOCUMENTS

| | | | | |
|---|---|---|---|---|
| CN | 201331816 Y | * | 10/2009 | |
| CN | 201364161 Y | * | 12/2009 | |
| CN | 103049739 A | | 4/2013 | |
| KR | 102144974 B1 | | 8/2020 | |
| RU | 2610156 C1 | * | 2/2017 | |
| WO | WO-2009129496 A2 | * | 10/2009 | .......... G05D 1/0094 |
| WO | 2014/078360 A1 | | 5/2014 | |
| WO | WO-2017044079 A1 | * | 3/2017 | .......... B64C 39/024 |
| WO | WO-2021174291 A1 | * | 9/2021 | .......... B64C 39/024 |

OTHER PUBLICATIONS

General Order 95 Section 111—California Public Utilities Commission (2012).
English translation of CN 103049739-A (2013).
Kurinsky, Brian: "Power Line Corridor Vegetation Management: Clearing a Path to Reliable Electric Service using LiDAR," Theses Presented to the Department of Humanities and Social Services in Candidacy for the Degree of Master of Science, Northwest Missouri State University, Maryville, MO (Oct. 2013).
Australian Government—IP Australia, Examination Report No. 3 in AU Application No. 2023278096 (Feb. 20, 2025).
Office Action in equivalent CA SN 3,131,764, Canadian IP Office (May 27, 2024).
IP Australia, Examination report No. 2 for application No. 2023278096 (dated Oct. 31, 2024).

* cited by examiner

| Voltage (kV) | V1 | V2 | V3 | V4 | V5 |
|---|---|---|---|---|---|
| "Grow in to wire" MVCD (ft. or m.) | R1 | R2 | R3 | R4 | R5 |
| "Fall and Strike in to wire" MVCD (ft. or m.) | X1 | X2 | X3 | X4 | X5 |

METHOD AND SYSTEM FOR UTILITY INFRASTRUCTURE CONDITION MONITORING, DETECTION AND RESPONSE

CROSS-REFERENCE TO RELATED APPLICATIONS

This application is a continuation-in-part of U.S. patent application Ser. No. 15/330,978 filed Jun. 11, 2017, which claims the benefit and priority of U.S. Provisional Application No. 62/348,950 filed Jun. 12, 2016, both of which are incorporated by reference herein.

FIELD

The present disclosure relates to methods and systems for utility infrastructure condition monitoring, detection, and response and, in particular, monitoring and detecting conditions associated with the utility infrastructure and responding to those conditions.

BACKGROUND

This section provides background information related to the present disclosure which is not necessarily prior art.

Electric utility overhead transmission (bulk and local systems) and distribution power lines/wires/conductors are carried on metallic and nonmetallic towers and poles across very long distances in many directions which include metropolitan, urban, suburban and rural areas. Vegetation/trees from the surroundings can potentially encroach in to the overhead high voltage (4 kilo volt [kV] and above) electric lines, eventually contacting or striking these lines. These vegetation encroachment events may bring the energized lines down to the ground, ignite surrounding vegetation and cause unscheduled electric service disruptions (blackouts). These hazards are amplified in drought seasons when dead trees in the proximity of the utility power lines could fall over these high voltage electric conductors and start wildfire. The utilities and/or power lines maintenance companies need to cyclically inspect these power lines to monitor and assess vegetation conditions and mitigate hazards from potential vegetation encroachments. Based on the vegetation condition inspection findings, the power line vegetation maintenance crews cut/trim or remove vegetation/trees that reach a threshold proximity to the power lines as predefined by the relevant regulatory agencies and utility companies. There are federal, state, regional, and local level regulatory agencies to oversee this vegetation management compliance process in the United States. A few examples of such regulatory agencies and their applicable vegetation management regulations in the United States are, North American Electric Reliability Corporation (NERC) FAC-003-04, California Public Utilities Commission (CPUC) General Order (GO) 95 and California Fire Department (CAL Fire) Public Resource Code (PRC) 4292 and 4293 etc. The regulatory agencies and the utility companies within their jurisdictions have developed required minimum vegetation clearance distance (MVCD) parameter for these lines based on the rated line voltages, minimum ground to conductor clearance (MGCC) requirements, geographic locations and their compliance inspection cycles. The maximum allowable vegetation height (MAVH) under or around high voltage power lines right-of-way (ROW) is mainly controlled by the MGCC and required MVCD parameters. The utility vegetation management line of business must ensure compliance to this MVCD requirements for the electric lines that they own or maintain. This electric transmission and distribution vegetation management is a mandatory compliance process that electric utility companies (investors owned, publicly owned or privately owned), Transmission Owners (TO) and Generation Owners (GO) must carry out to ensure safe, reliable and affordable electricity supply to their customers and prevent any hazards to the environment from potential vegetation related flash-over hazards and resulting blackouts. Noncompliance to these regulations may impose steep fines and other punishments to the responsible utility companies, TO or GO.

The state-of-the-art power lines routine and non-routine patrolling process for vegetation management is a manual, tedious and costly process which involves rigorous boots-on-the-ground or foot patrolling by large inspection crews round the year. Routine patrol is cyclical and non-routine process is scheduled as need to cover requirements of special programs such as integrated vegetation management, tower or pole vegetation clearance management, emergency condition such as drought related vegetation management etc. Many crews patrol these electric lines by driving their motor vehicles and/or walking where no accessible road is available in and out of an electric lines right-of-way (ROW) under these routine and non-routine utility vegetation management programs. According to the applicable regulations, certain electric utility companies have to inspect hundred percent of their electric lines they own even though some portions of the total line length or spans (span is comprised of two subsequent towers or poles of a contiguous electric transmission or distribution line) may not have any vegetation in their proximities (wire zone and non-wire zone) that can possess any hazards by encroaching to a line (grow in to or fall in to). This foot patrol process imposes extra hazards to the inspectors in heavily wooded rugged terrains. This is a wasteful and risky process that being practiced by the electric utility industry for decades. A safer, more efficient and automated method of vegetation condition inspection is required for the electric utilities power lines vegetation management. Electric lines are counted in the unit of line miles. An electric utility company may own from a few to thousands of line miles of overhead electric transmission and/or distribution lines depending on its service territory and number of customers it serves. In certain geographic service areas in the United States an electric utility company may be responsible to manage several millions of trees along their overhead transmission and distribution electric lines right-of-way (ROW). In this situation total number of trees may be translated into a unit-based quantity such as number of trees per line mile. No vegetation to a few thousand trees per line mile are not unusual for a large electric utility company in the United States.

In another state-of-the-art approach, aerial patrol of the electric lines for vegetation condition and encroachment detections is conducted by a pilot and an inspector from an aircraft flying over the power lines (e.g., electric transmission power lines, etc.). This is a visual inspection method that requires flying at least two personnel over the electric lines in certain intervals to complete the cyclical inspections. A rotorcraft (helicopter) needs to fly at a lower altitude (about 400 feet to 500 feet above ground level [AGL]) in order to assess the vegetation condition and encroachment visually from the rotorcraft by the vegetation management inspection crew. This method is costly, creates loud engine noise in the neighborhood and faces objections from the utility customers in habitable areas. In addition, flying such close distance to the high voltage transmission lines is hazardous to the people, inspection personnel and property.

In another recent approach, airborne sensor-based patrol method using light detection and ranging (LiDAR) technology is used by a few utility companies for their vegetation management compliance inspection process. While this approach introduces certain degrees of remote sensing and process automation, this is inefficient for this particular application because it involves frequent aircraft flights over the power lines that run in many different directions in relatively shorter segments. This directional variation and segmentation of the power lines forces the LiDAR scan and data collection aircraft to unnecessarily fly over the areas that do not have any power lines because of practical maneuverability of the sensor carrying aircraft. In addition, airborne LiDAR survey do not produce real time information about the vegetation proximity around the power lines. Therefore, this monitoring process must be accomplished frequently every year. This is a costly effort. A large portion of the transmission line length of an electric utility company may not have vegetation along the ROW. In aerial LiDAR-based inspection method, the sensors have to fly over those vegetation free line lengths each year to comply with the cyclical inspection requirements in absence of a real-time power line vegetation monitoring system and method. The vegetation proximities to a power line at the time of LiDAR sensor flight do not capture the minimum possible proximities due to the higher conductor sag at the maximum operating load condition (amperage) and blow-out due to higher wind gust than the flying condition. Extensive modeling of the power line sage due to the load variations (to the maximum operating load condition), ambient temperatures and wind speed and direction variations are required to predict vegetation proximity situations at maximum load condition for each power line which must be compared with the line specific MVCD to determine required vegetation controlling measures. This method is a tedious process because it involves extensive manual data processing and modeling after each airborne LiDAR scan cycle. The time lapse between the successive scans and data processing is excessive which fails to accurately capture the actual growth of a tree within this time lapse. As a result, a required MVCD compliant tree from a scan cycle may grow taller enough to exceed the MVCD and become noncompliant during the time lapse between the successive scan. This kind of vegetation clearance noncompliance risk is higher in certain geographic and environmental regions such as riparian or orchard zones where tree growth rate along ROW is very high (e.g. about 20 feet/year). Airborne LiDAR survey cannot flag these special climatic regions without extensive manual post processing of native survey data. Therefore, the airborne LiDAR-based vegetation management process for the utility power lines involving a very large number of LiDAR scanning flights each year and extensive data processing is a huge waste of time and financial resources and threat to the environment.

Despite the aforementioned state-of-the-art approaches to manage power lines and vegetation, most of the electric utilities frequently report vegetation related power outages. The severity of damages from the electric transmission line power outages due to the vegetation encroachment is relatively higher than distribution line power outages. Vegetation encroachment related damage of a transmission line can cause cascading power outage across the power grid of a very large geographic area or even of the entire nation causing billions of dollars of economic damages. Therefore, an alternative approach is necessary for this highly critical compliance application of the utility power lines vegetation management which is more accurate, reliable, efficient, safer and cost effective.

Thus, there remains a heartfelt need for an improved system and method in which the utility power lines vegetation management process can protect the nation's critical power infrastructures, human lives, properties and environment with higher reliability, accuracy and efficiency.

SUMMARY

This section provides a general summary of the disclosure, and is not a comprehensive disclosure of its full scope or all of its features.

This current invention uses stationary visual and/or tactical sensor-based remote sensing, computing technologies and proprietary machine vision and machine learning algorithms over wireless and/or internet communication network system to automatically detect and measure vegetation proximity to the high voltage power lines and advise maintenance crews to trim/cut or remove vegetations/trees that reach a predefined threshold proximity to the high voltage utility power lines. This current sensor-based vegetation monitoring and controlling invention is a more efficient, safer and cost-effective alternative to the state-of-the-art utility power lines vegetation compliance management processes. This invention issues vegetation proximity advisory (VPA) and vegetation resolution advisory (VRA) to the electric utility vegetation management crews based on the proprietary machine learning and artificial intelligence algorithms without needing any human field power line vegetation inspectors. The power lines infrastructures such as towers, poles and conductors are in geospatially static environment which is favorable for monitoring these infrastructures remotely using this current invention. The stationary sensors may be capable of optical imaging, electromagnetic sensing or sonic sensing across wide range of spectrum including but not limiting to, red green blue (RGB) visual band, infrared (IR), multispectral (MS), Hyper-spectral (HS), light detection and ranging (LiDAR), radio detection and ranging (RADAR), synthetic aperture radar (SAR) or ultrasonic. These sensors consume low power which may be provided using integrated batteries and/or solar power source. Single or multiple sensors of different types can be used per power lines tower or pole to monitor vegetation encroachments. The sensors can be programmed for continuous and/or intermittent monitoring of the surroundings at certain spatial and temporal intervals. Based on the sensor observation over discrete time steps around a power line surrounding location the system estimates vegetation relative location and construct map of the environment using the connected and/or cloud computing system. The map output is geometrically accurate as well as topological representation of the relative distances among the objects of interest. The computation method considers slow growing movement of vegetation and relatively faster movement of conductors due to occasional high wind blow-out and applies effective digital filters to reduce any bias and measurement noise. The computation results provide vegetation proximity advisories to the end users via connected devices such as personal computers, laptop computers, tablets and mobile/cellular phones. Whenever a vegetation proximity reaches a predefined critical or potential hazard threshold distance to a power line, the system will issue the appropriate VPA and VRA for that particular location based on spatial situation of the georeferenced sensor. The end users (vegetation management or control crews) can take necessary actions based on the automatic advisory issued by this invention. This method and system requires one time installation of the sensor packages to the power lines poles/towers which can last for many years without frequent maintenance and/or replacement. The year-round cyclic inspections of the power lines by foot patrolling, air patrolling or LiDAR sensor equipped aircraft flying are eliminated by this current invention. Hence, this current invention is a safer, more efficient and cost-effective system and method of electric utility power lines vegetation management.

In one embodiment, this invention uses a stationary remote sensing sensor package that is attached/mounted on an electric transmission tower/pole to monitor surrounding vegetation encroachment within the critical zones along a ROW. Each sensor package is geospatially oriented as survey control points in standard spatial coordinate reference system using horizontal and vertical datum. The georeferencing system adds important additional geographic information such as riparian climatic region, national forest region, orchard region, high fire threat zone of the sensor package location when applicable. This sensor's viewing range and field of view (FOV) will cover an entire line span to the next tower after this host tower within the same span. Similarly, the subsequent line spans will be monitored by the sensors mounted on the subsequent towers. This method involves producing classified point clouds in three dimension (3D) and or image classification in spatial coordinates from geographically oriented and georeferenced images acquired from the tower mounted sensors and applying novel algorithms for extracting features and calculating location, height and 3D distance of vegetation segments from the subject electric transmission lines. The system provides VPA or VRA to the designated utility vegetation management personnel depicting the proximity of trees to the subject lines and suggested actions through the wired or wireless communication network in predefined temporal resolutions. The vegetation management personnel take necessary mitigation actions according the VPA or VRA received from a georeferenced sensor. The fidelity of a VPA or VRA will mostly depend on the sensor resolution and accuracy.

In another embodiment, this invention uses multiple stationary remote sensing sensor packages that are mounted on each electric transmission tower/pole to monitor surrounding vegetation encroachment within the critical zones along a ROW from multiple directions. This sensor's viewing range and field of view (FOV) will cover an entire line span to the next tower after this host tower. Similarly, the subsequent line spans will be monitored by the sensors mounted on the subsequent towers. This method involves producing classified point clouds in three dimensional (3D) and or image classification in spatial coordinates from geographically oriented and georeferenced images acquired from the tower/pole mounted sensors and applying novel algorithms for extracting features and calculating location, height and 3D distance of vegetation segments from the subject electric transmission lines. The system provides VPA and VRA to the designated utility vegetation management personnel depicting the proximity of vegetation to the subject lines through the wired or wireless communication network in predefined temporal resolutions. The vegetation management personnel take necessary mitigation actions according the VPA or VRA received from the georeferenced sensors.

In another embodiment of this invention, the stationary sensor packages remotely monitor and report vegetation growth within predefined zones around the utility power line towers and poles. This reporting is used to maintain vegetation clearance around the towers and poles.

In another embodiment, this invention enables utility vegetation management personnel to remotely assess health condition of vegetation in a ROW.

In various embodiments of the present disclosure include system for use in monitoring and detecting conditions associated a utility infrastructure and responding to the conditions. The system may include a sensor node. The sensor node may include a sensor package and a monitoring and control module. The sensor package may include a physical enclosure that integrates a plurality of sensors such as, for example, an image sensor, a video sensor, and a LiDAR sensor. The sensors may each be configured to capture data indicative of one or more conditions (e.g., an environmental condition, a structural condition, etc.) in the vicinity of the utility infrastructure and, in particular, in one or more fields of view of the sensor from the location at which the sensor package is installed. The monitoring and control module may include a detection module, an alert module, and an unmanned aircraft system (UAS) control module. The detection module may be generally configured to receive data captured by each sensor and, based on the captured data, determine one or more conditions in the vicinity of the utility infrastructure. The detection module may be configured to then, based on the determined conditions, provide an alert for the condition using the alert module.

Many other features and advantages of the present invention will be realized by those skilled in the art upon reading the following description, when considered in conjunction with the drawings, in which:

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
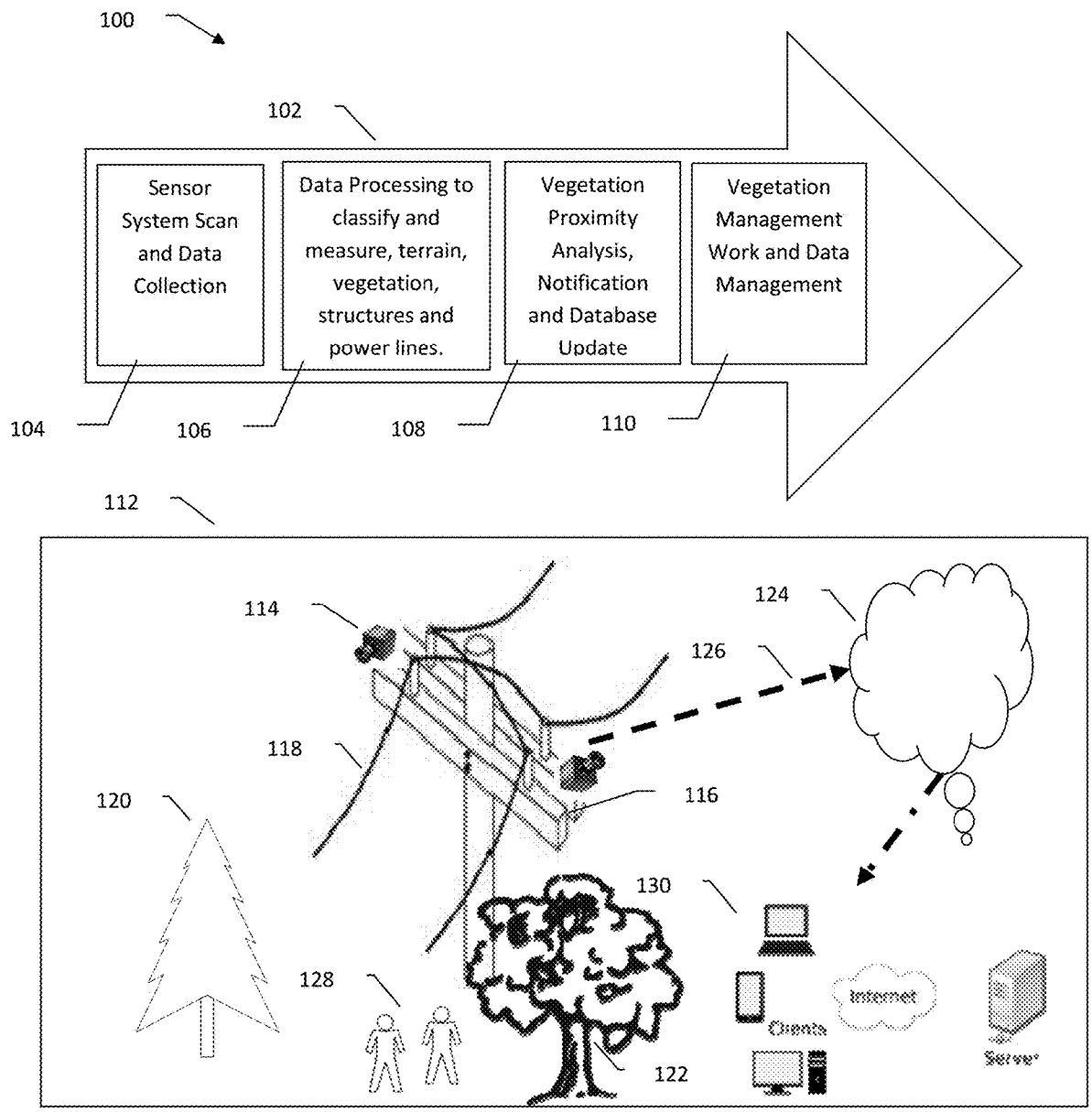
FIG. 1 illustrates a graphical overview of the system and method organized to implement embodiments of the present invention.

Directing attention to FIG. 1, there is shown the steps and functional components of the embodiments of the present invention, 100. The workflow diagram, 102 illustrates the main steps, 104, 106, 108 and 110 in the system. The sensor package continuously, periodically, intermittently or based on an event scans in step, 104 for electric wires, transmission towers, power poles, terrain, vegetation and structures along the span of the electric lines. Single or multiple sensors with fixed or adjustable zoom and field of view (FOV) are installed on each power pole or tower. The sensor package and installation provide 100% scan coverage of the electric utility ROW. The sensor package images and data are processed in step, 106 in situ or sent to the cloud computing platform for processing. Image data is classified to delineate and measure 3D objects such as electric power structure, lines, equipment, vegetation and ground. In case of a visual sensor, shapes in the point clouds can be aligned at each observation instant with image registration. Following this processing step, the vegetation proximity analysis, 108 compares the 3D vegetation and distance-to-wire or structure or equipment measurements to the required MVCD and issues applicable notifications (VPA or VRA) to the end users for each vegetation and in a span. Finally in step, 110 vegetation management crews perform work and record the results on the portable device and sync the work completion record back to the vegetation management system database.

The graphical representation of the system in, 112 where one or more sensor package(s), 114 are attached to a power pole/tower or structure, 116. The sensor package includes visual or tactical type of sensors. The sensor packages capture images/range data and meta data to measure the location and dimensions of power lines, 118 and vegetation, 120 and 122 and determine proximity to power lines, 118. The sensor package images and data are processed onboard the sensor package, 114 or sent to the cloud, 124 over wireless or wired network, 126. The vegetation proximity results are sent to the end users, 128 over the internet to their desktop or mobile devices, 130. Vegetation management teams and tree trimming crews, 128 use the vegetation proximity measurements information and advisories on their devices, 130 to schedule, perform and manage vegetation maintenance work as required.

In one embodiment of the present invention where the end users, 128 with devices, 130 select the area of interest or highest priority vegetation proximity notifications, and downloads the GIS maps with vegetation data to the local drive of the portable device to be available if the device, 130 is used outside of wireless networks. Vegetation crews perform tree work and record the results on the portable device and sync the results data back to the system after completion. This data sync process updates the VPA and VRA for the entire system to allow resources to be directed to the next highest priority area for vegetation management work to be scheduled by location and travel logistics in concert.

Figure 2:
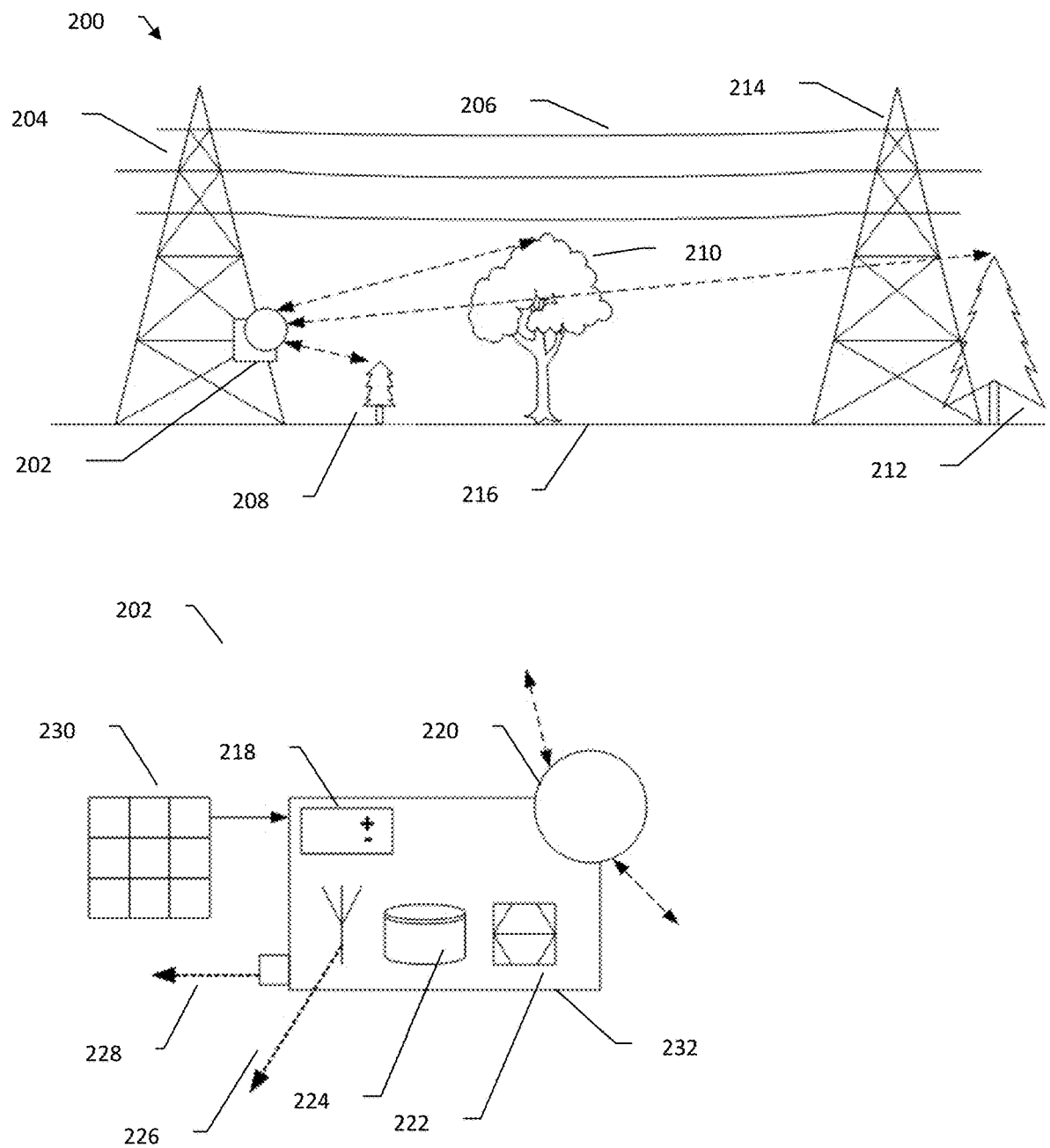
FIG. 2 illustrates a set of exemplary functional data acquisition and processing and communication equipment in a typical utility power line span to implement one of the embodiments of the present invention.

Directing attention to FIG. 2, there is shown generally an electric power line and transmission tower environment, 200 in which embodiments of the present invention operates. The sensor package, 202 attached to the power pole or tower or structure, 204 to automatically observes and collect image, spatial and weather data including, visual digital images, video, infrared (IR), LiDAR, RADAR, Sonar, range finder, multi-spectral, hyper-spectral, range, global positioning system (GPS) longitude, latitude, wind speed and direction, relative humidity, ambient temperature, altitude, date and time which are associated with the data. Collected imageries of electric wires, 206, vegetation, 208, 210, 212 and surrounding power poles, towers or structures, 214 and terrain, 216 are processed automatically to produce the required information including, classified images, measurements of power lines, power poles or transmission towers, equipment, terrain, vegetation, proximity analysis, 2D map, 3D map, VPA and VRA using proprietary methods and algorithms of the present invention. The common vegetation, 208, 210 and 212 may include ash, black oak, blue oak, casuarinas, cottonwood, cypress, deodar, Douglas fir, eucalyptus, gray pine, incense cedar, live oak, valley oak, palm, Monterey pine, ponderosa pine, Manzanita, Knotweed as well as other pine and deciduous species and brushes/bushes which can pose encroachment related risks to the transmission and distribution lines. The wires, 206 types generally include, Aluminum Conductor Steel Reinforced (ACSR), All Aluminum Alloy Conductor (AAAC), Aluminum Conductor Self Supporting (ACSS) or copper conductors.

In one embodiment, the sensor package, 202 uses a digital camera or infrared or multi-spectral or hyper-spectral sensors. Multiple georeferenced aerial images of a ROW are acquired with specific overlap to be used with photogrammetric tools and techniques to produce colorized high density point cloud and surface mesh. The range or depth of an observed object is interpolated based on the lens disparity of this stereoscopic camera system. In another embodiment, the sensor package, 202 uses a LiDAR sensor and optional digital camera to acquire georeferenced raw LiDAR data and optional photograph to produce colorized point could. The range or depth of an observed object is directly calculated based on the velocity of light in this method. In another embodiment, the sensor package, 202 includes a digital camera and range finder. This sensor package interprets pictures and tactical range data to produce VPA and VRA using proprietary machine vision and learning algorithms. In another embodiment the sensor package, 202 uses a range finder which scans the horizontal plane of the maximum allowed tree height of a span. When a tree grows up to the plane of maximum allowable tree height then the VPA or VRA notification is issued for that span automatically. This simplified tactical sensor-based system reduces the computational burden, data storage size and cost of the sensor package. These embodiments can be used in various combinations and in any of these embodiments the data is stored in local storage and/or upload to the cloud system for onsite or remote processing. The data transmission includes LAN/PAN/WAN/Wi-Fi/Cell/802.1/FTP/LoRaWAN/NB-IoT/Wi-SUN protocols. The sensor package, 202 includes general features and functions such as rechargeable battery system, 218 with battery management sub systems to ensure long battery life, the sensor lens, 220, one or more of active and passive visual or tactical sensors such as digital camera in the visible spectrum to acquire pictures and video, infrared (IR) camera, range finder, multi-spectral sensor, hyper-spectral sensor, LiDAR sensor, RADAR, Sonar, SAR, embedded microprocessor image processing engine, 222, data storage such as hard drive, removable media storage, 224, wireless antenna such as Wi-Fi, Bluetooth, cellular phone, 226, wired data connection such as USB, Ethernet, RS232 serial communications, Modbus, CAN bus, analog or digital inputs or outputs and solar panel, 230 to charge the battery system and waterproof rugged enclosure, 232 for year round outdoor use.

Figure 3:
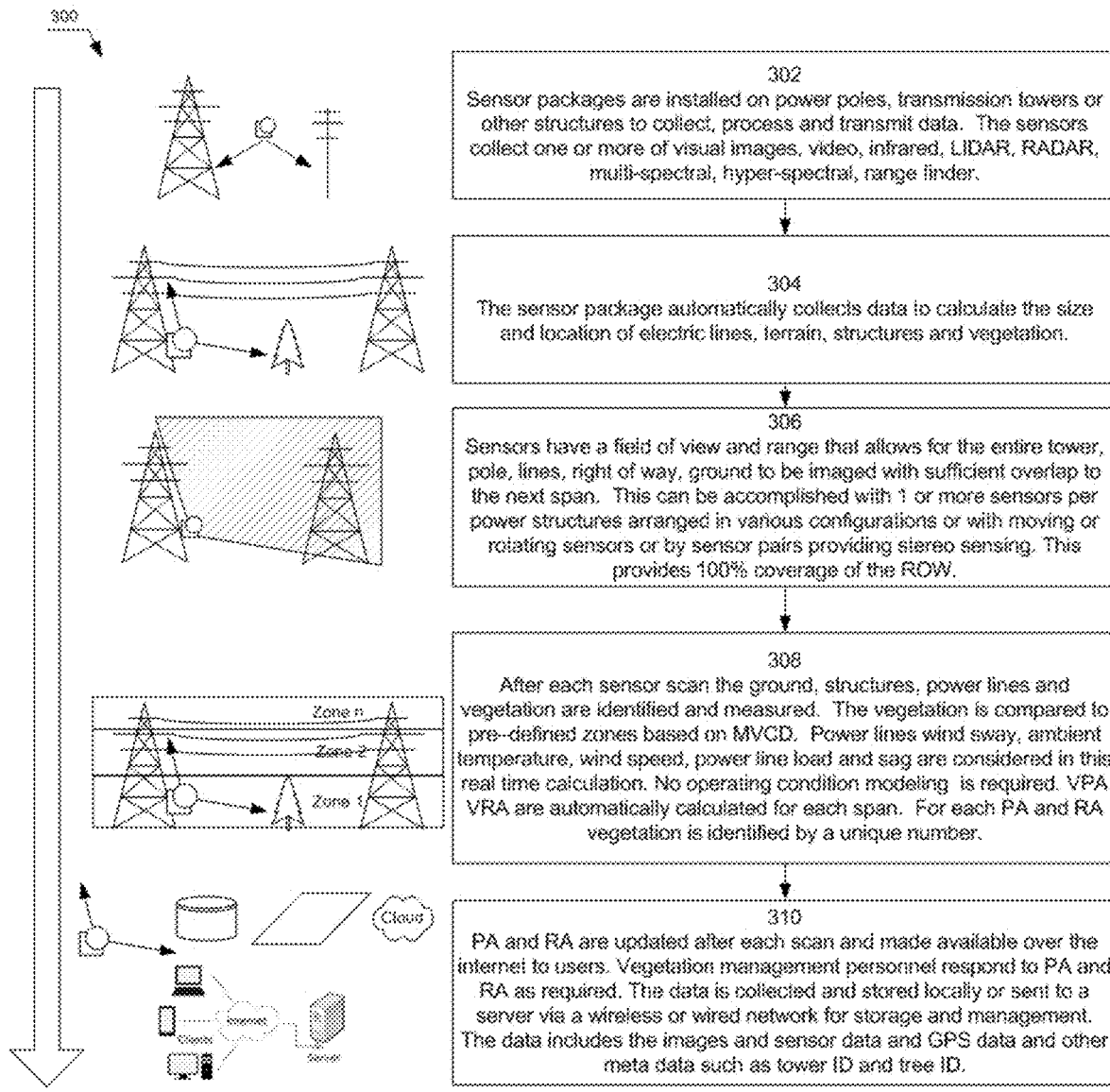
FIG. 3 illustrates a diagrammatic presentation of the sequential steps performed in the automated image data processing in accordance with the present invention.

Directing attention to FIG. 3, there is shown generally a flow chart, 300 of automated vegetation proximity data collection and processing in which embodiments of the present invention operates. One or more sensor packages are installed on one or more power pole(s)/tower(s) or structure(s) per span, 302. In the data collection and data analysis process, 304 automatically collect location and shape of objects within a power line span.

In one embodiment the sensor packages, 306 has an adjustable FOV. A wide angle (greater than 90 degrees) FOV enables image collection of nearby vegetation and the base of the power pole or tower to which the sensor package is attached. A medium or narrow field of view enables high resolution imaging of vegetation, power lines, terrain and structures at a distance greater than the distance to the next power pole or tower, thus creating a system with 100% coverage of all the power lines, structures, terrain and vegetation within a span. This arrangement is replicated for each span to cover the entire power line system.

In the flow chart step, 308 proprietary algorithms and off-the-shelf image and data processing tools are used to classify and measure power lines, vegetation, terrains and structures. After each measurement the objects are counted and compared to pre-defined zones and buffers as dictated by the applicable MVCD. The wind speed and resulting power lines wind sway (blow-out), line load and ambient temperature and resulting power line sag are automatically captured in this real-time scan and computations without any intensive manual modeling. The scan frequency and time step can be adjusted to as often as needed or based on significant weather events such as before or after a storm, events of high wind speed, rain and lightning. VPA and VRA are automatically generated for each span following any observations/scans.

In vegetation proximity data transfer and management process, 310 results of the analysis, 308 are the data and maps generated by this present invention which is distributed among the users using one of the embodiments. The current and historical results are transmitted over a wired or wireless network to the client server system. In another embodiment of 310 the raw sensor data and images are transmitted by a wired or wireless network to the server system which performs the image processing and production of analysis products which are sent to the end users. These embodiments allow for installation and operation of this system in areas with high bandwidth wireless networks, in areas with lower bandwidth wireless networks or without any preexisting wireless networks by creating a new wireless network with each sensor package as needed.

Figure 4:
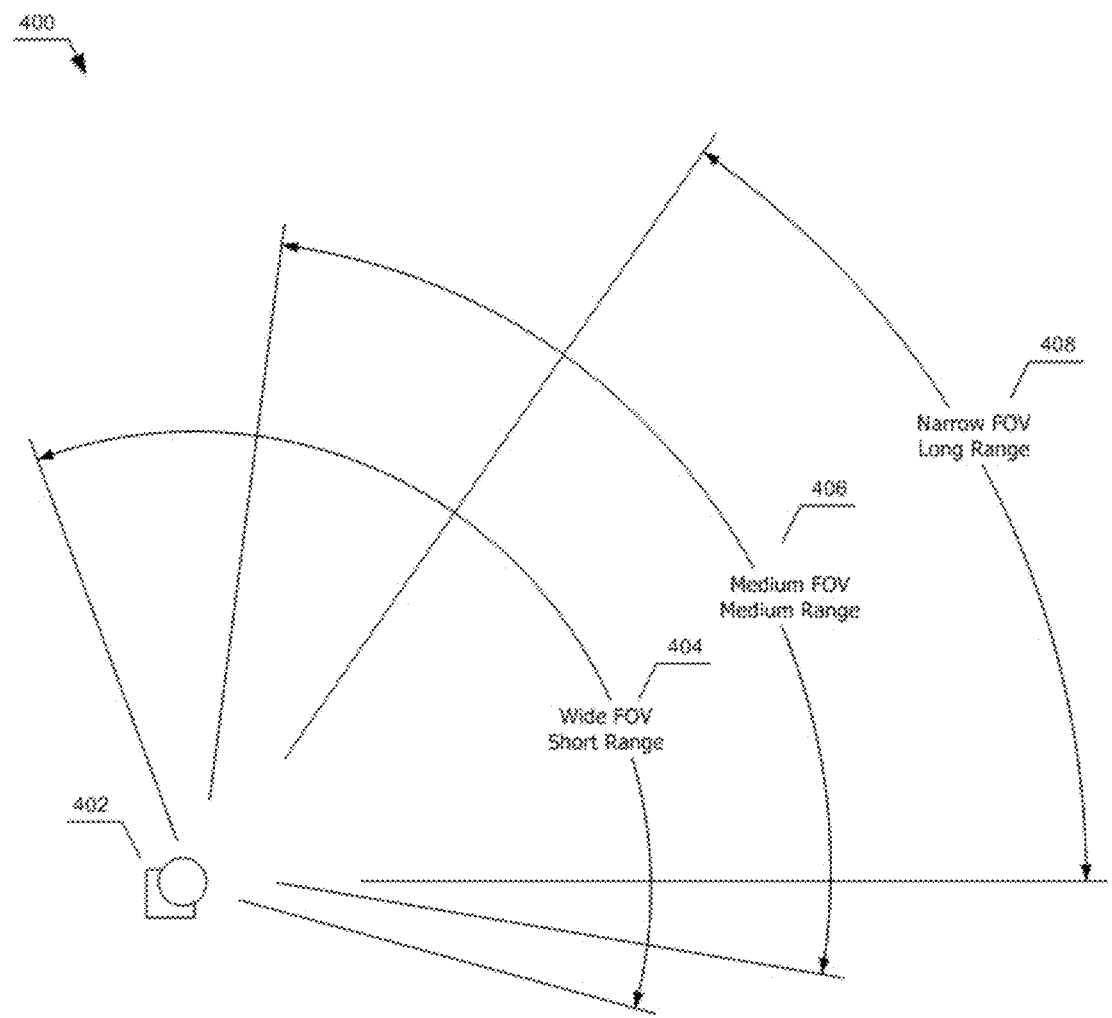
FIG. 4 illustrates imaging sensor field of view range and sensing efficacy to implement one of the embodiments of the present invention.

Directing attention to FIG. 4, there is shown generally the sensor package with adjustable FOV, 400. The sensor package, 402 scans and collects images of multiple fields of view for each collection scan to maintain good resolution and complete coverage. The sensor FOV is remotely adjustable and programmable to automatically collect multiple scans of multiple FOVs for each line span. When the wide FOV, 404 is used, the FOV is greater than 90 degrees allowing for a fish eye effect to collect a wide footprint and provide coverage of nearby vegetation and the electric lines and structure to which the sensor package is attached. When the medium FOV, 406 is used, the sensor range is increased while the footprint and coverage will overlap with the wide FOV to ensure complete coverage. When the narrow FOV setting, 408 is used, the range is increased and the coverage will overlap with the medium FOV to ensure complete coverage.

Figure 5:
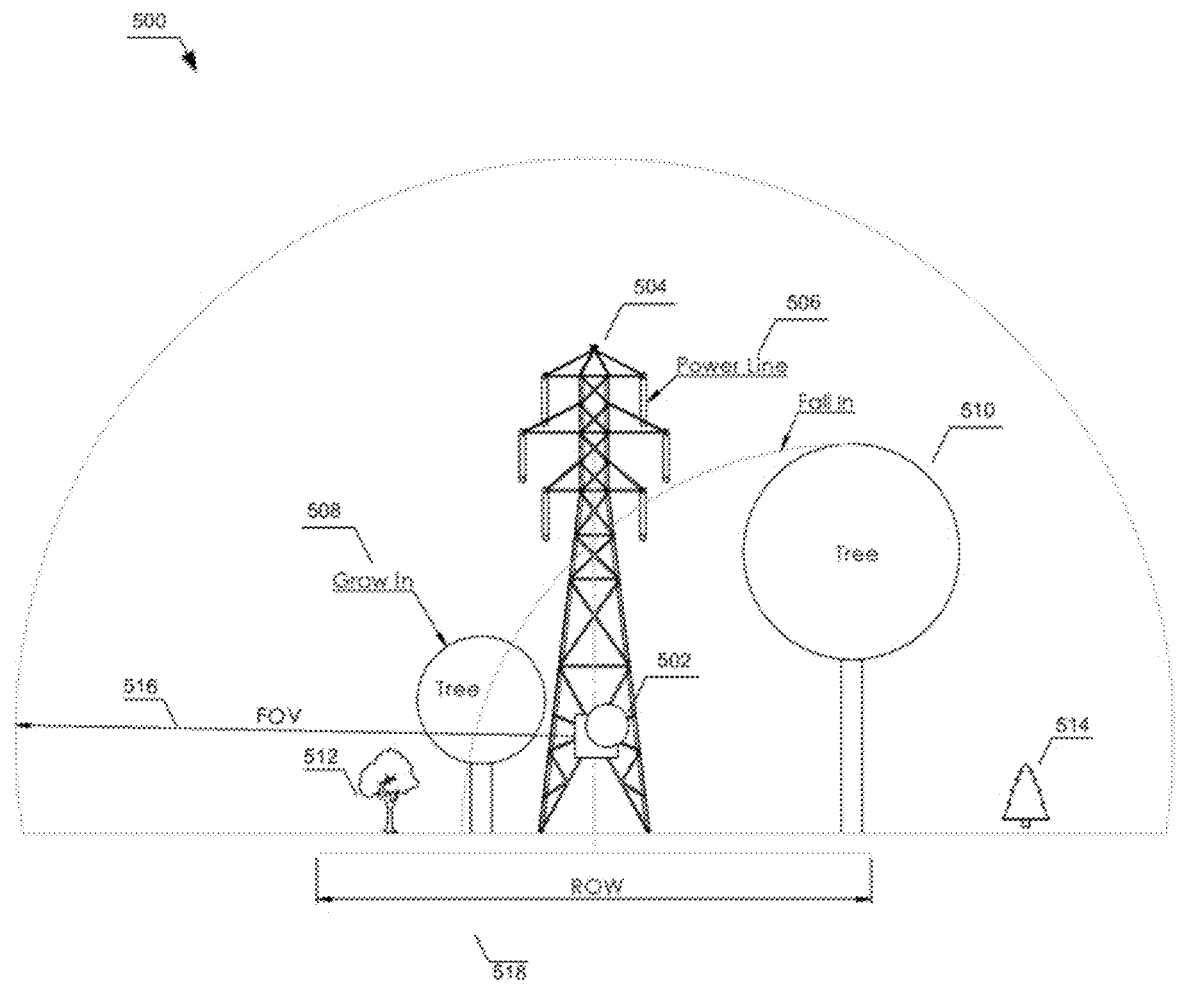
FIG. 5 illustrates exemplary images of vegetation proximity detection categories along utility power lines in accordance with the present invention.

Directing attention to FIG. 5, there is shown the end view of an electric transmission line ROW, 500. The sensor package, 502 is installed on transmission tower, 504. Power lines, 506 and trees 508, 510, 512 and 514 are within the sensor package FOV, 516. All the vegetation/trees, 508, 510, 512 within the electric ROW, 518 and vegetation and trees, 514 outside the ROW, 518 are within the sensor FOV, 516. This arrangement allows for the proposed invention to accurately identify and measure all vegetation encroachment threats including those that may grow up in to the power lines, 508 and those which may fall in to the power lines, structure or equipment 510.

Figure 6:
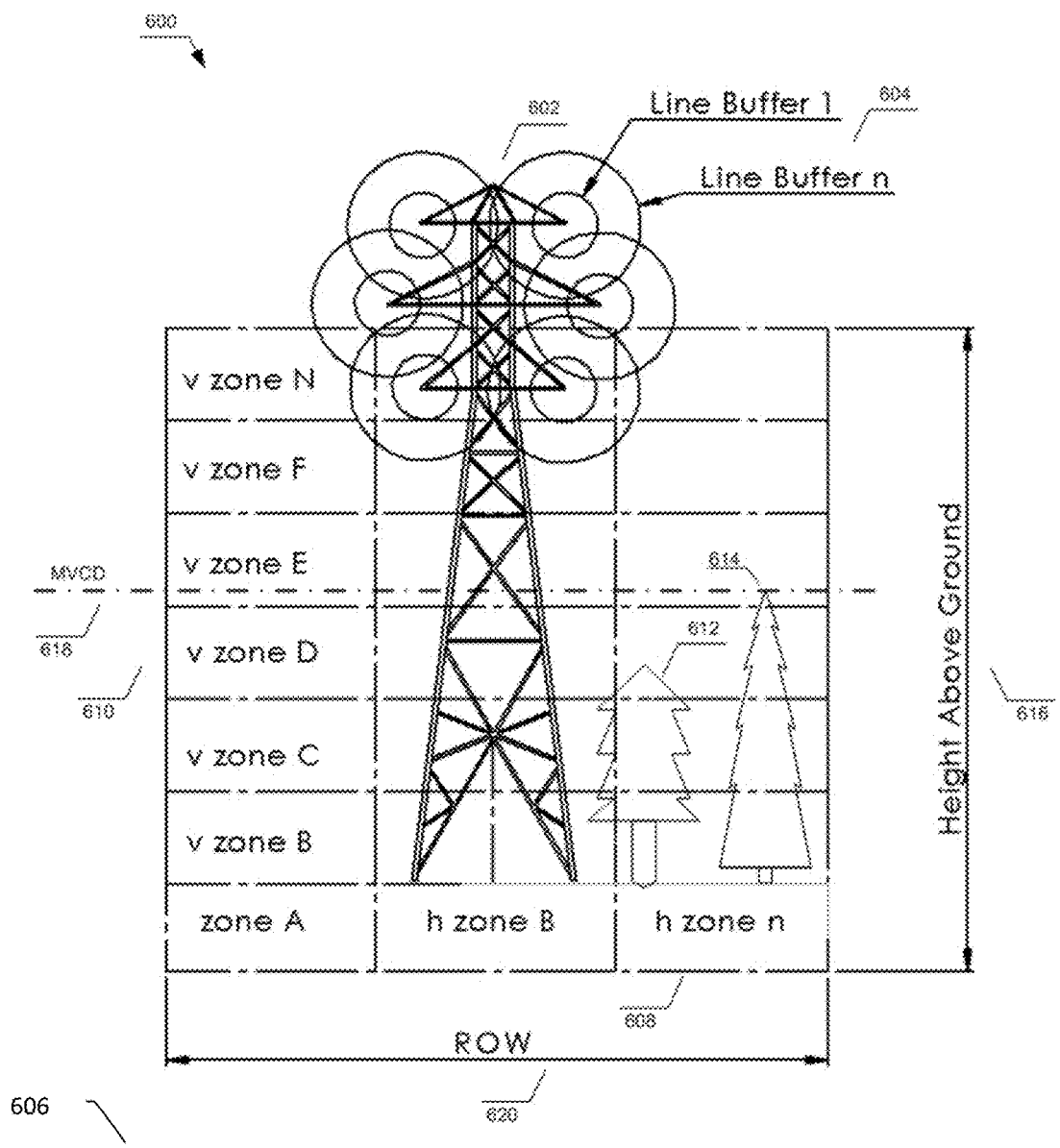
FIG. 6 illustrates vegetation proximity detection criteria and schema along the power lines in accordance with the present invention.

Directing attention to FIG. 6, an example of the vertical and horizontal zones and buffers around a set of power lines are shown with trees to describe the vegetation detection criteria, 600. The transmission tower, 602 has multiple power lines of a circuit. Each line is assigned multiple rings of buffers, 604 based on the line voltage and required MVCD. The MVCD for each line is defined by the regulatory agencies and adopted by the utilities. An example schema of MVCD for different line voltages is shown in table, 606. The horizontal zones, 608 and the vertical zones, 610 are defined for grow-in and fall-in tree detection based on the MVCD. These zones are adjusted for the terrain within each span to account for flat and sloped terrains. The tree, 612 occupies a set of multiple zones and the tree, 614 occupies a different set of multiple zones. Both of these trees, 612 and 614 is assigned unique identification numbers, GPS coordinates in latitude and longitude and orthometric height above ground, 616, canopy radius and type/species. In this example, 600, the tree, 614 height is reaching the MVCD threshold. Therefore, the system will automatically issue a VRA for the tree crews to accomplish tree clearance action. The tree, 612 height is less than the MVCD. Therefore, the system will automatically issue a VPA to the vegetation management personnel for information only.

Figure 7:
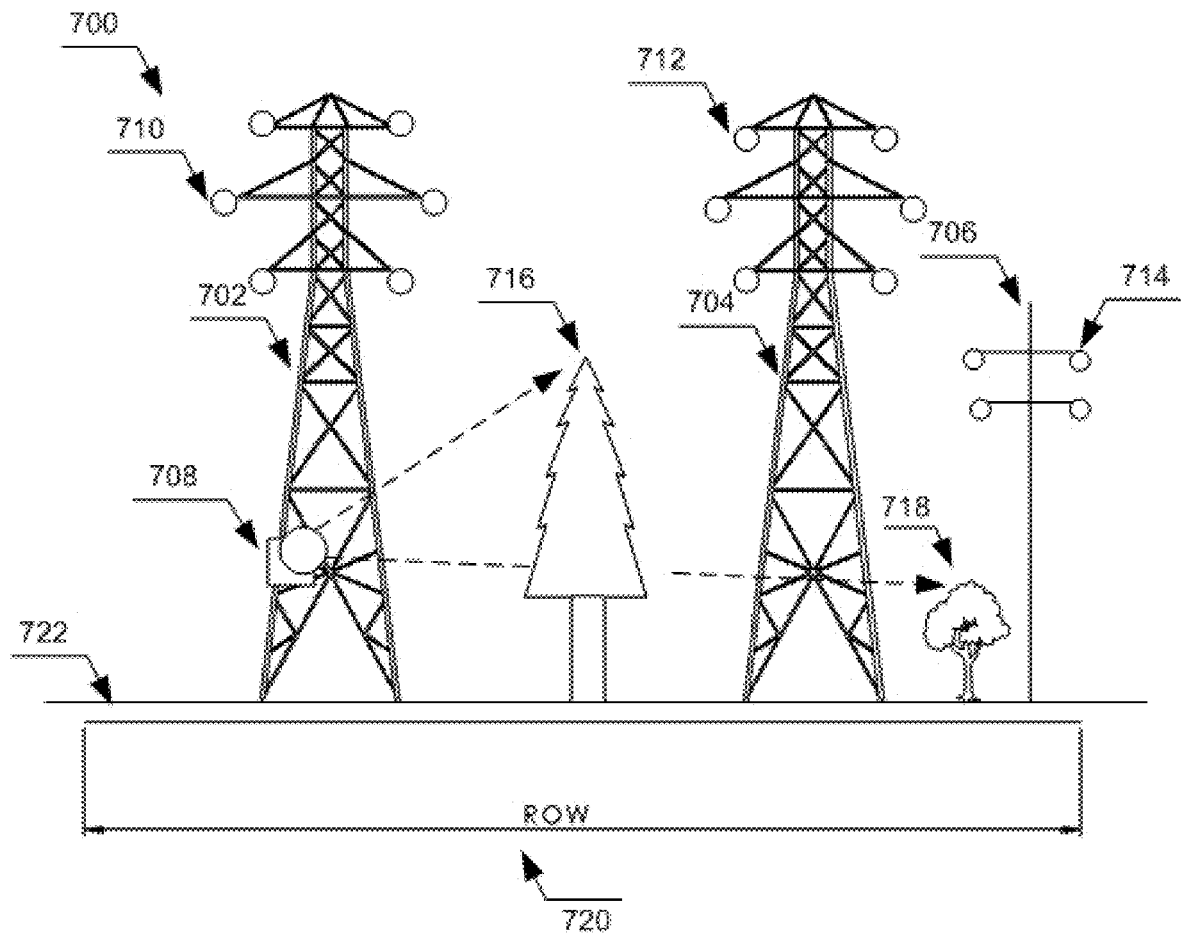
FIG. 7 illustrates a situation where multiple transmission circuits and distribution circuits share a single corridor and vegetation proximity detection criteria and determination schema along the multi-circuit power lines in accordance with the present invention.

Directing attention to FIG. 7, an embodiment of the current invention wherein an end view of a single electric utility corridor/ROW, 700 with multiple transmission towers, 702 and 704 and an underbuild distribution pole, 706 are shown. Here the sensor package, 708 is installed on tower, 702 to be able to image all electric wires, 710, 712 and 714, the vegetation, 716 and 718 and structures, 704 and 706 within the ROW, 720 and is able to detect and measure vegetation distances between the transmission and distribution lines.

Figure 8:
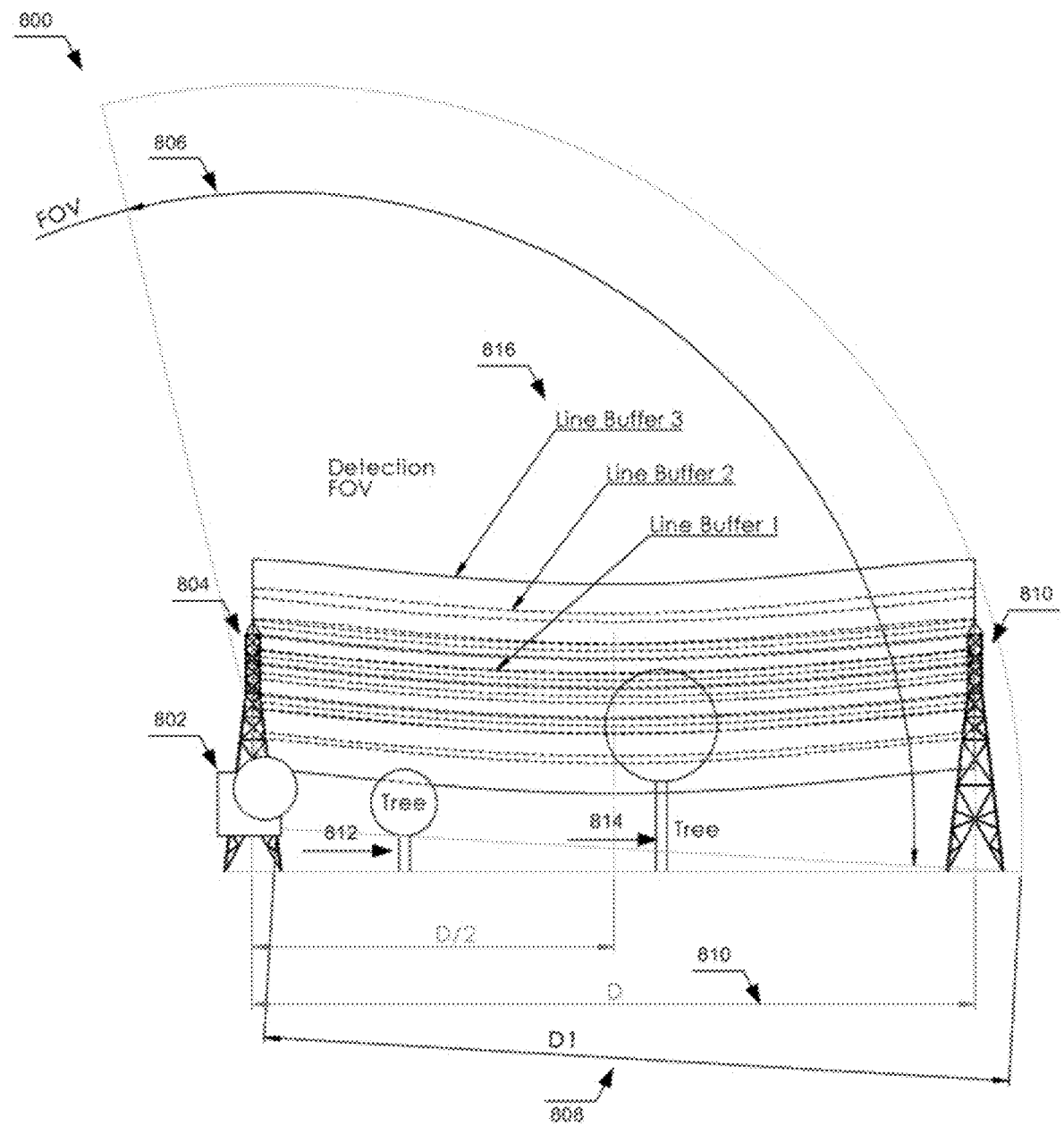
FIG. 8 illustrates a side view of the single sensor package per span-based detection range and field of view in accordance with the present invention.

Directing attention to FIG. 8, an embodiment of the current invention wherein a single sensor package per span with full span coverage, 800 is shown. In one embodiment a single sensor package, 802 is installed on a transmission tower, 804 with a FOV, 806 and range, 808 equals to D1 which scans the complete distance to the next tower, 810 equals to D of the span. This single sensor package with fixed or adjustable FOV is able to scan the ground, vegetation, electric lines and towers. The sensor package scans and detects vegetation, 812 and 814 within the sensor FOV, 806. The vegetation is ranked by its proximity to the power lines and 3D cylindrical buffers, 816 around each wire based on the wire voltage. In this embodiment a single sensor package covers the entire span distance to then next tower and additional range to overlap scan coverage by the sensor package on the subsequent tower. In this embodiment a single sensor package per tower provides 100% coverage of the electric wires, towers, terrain and vegetation in a span.

Figure 9:
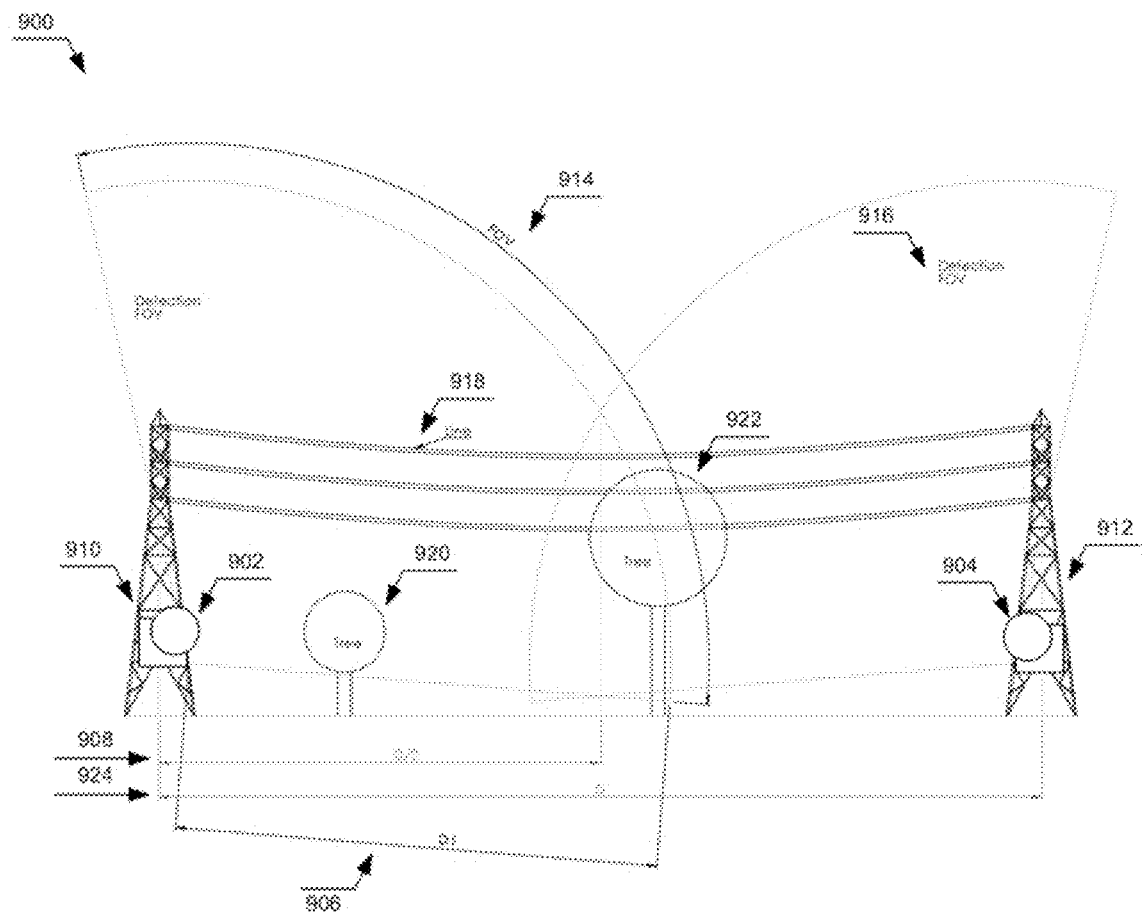
FIG. 9 illustrates a side view of the two sensor packages per span-based detection range and field of view in accordance with the present invention.

Directing attention to FIG. 9, an embodiment of the current invention wherein a dual sensor package per span with full span coverage, 900 is shown. In this embodiment a dual sensor package, 902 and 904 has the range, 906 equals to D1 which is slightly greater than the mid span distance, 908 equals to D/2 are installed on tower, 910 and 912, respectively. Each sensor package has overlapping FOV, 914 and 916 to provide 100% coverage of the electric lines, 918, structures, terrain and vegetation, 920 and 922 in the span, 924 equals to D. This design requires two sensor packages per tower to be installed to cover subsequent spans.

Figure 10:
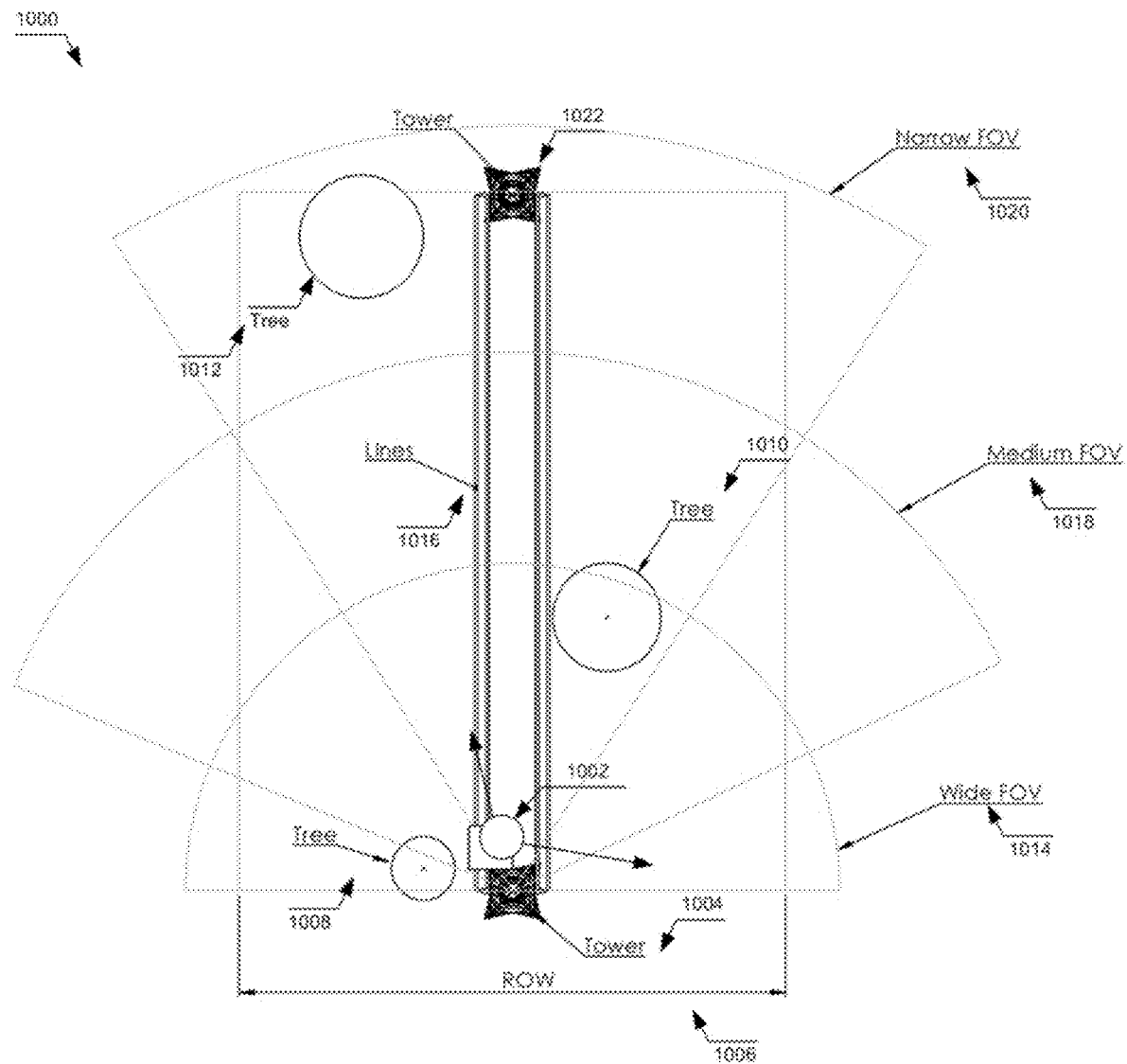
FIG. 10 illustrates a top view of the one sensor package per span-based detection range and field of views in accordance with the present invention.

Directing attention to FIG. 10, an embodiment of the current invention wherein a bird's eye view of a single sensor with adjustable FOV per span with full span coverage, 1000 is shown. In this embodiment, a sensor package, 1002 is installed on tower, 1004 which can use an adjustable FOV to scan the entire footprint of the span ROW, 1006. The sensor package with adjustable FOV can be combined with the previously described embodiments with single or multiple sensor packages per span. When the sensor package scans the span, the sensor automatically collects data and scans the area for each FOV setting. The FOV settings provide overlap to ensure 100% coverage of the ROW in the span to scan the nearby vegetation, 1008, medium distant vegetation, 1010 and distant vegetation, 1012 within the ROW of the span. In this embodiment the sensor automatically collects imagery data with a wide FOV, 1014 which captures the nearby ground and vegetation, 1008 and power lines 1016, a medium FOV, 1018 which scans the power lines, 1016, and intermediate distant vegetation, 1010 and a narrow FOV, 1020 which scans the power lines, 1016 and terrain and vegetation past the next tower, 1022. This variable FOV sensors allow for high resolution and accuracy for both nearby and distant scans within a span.

Figure 11:
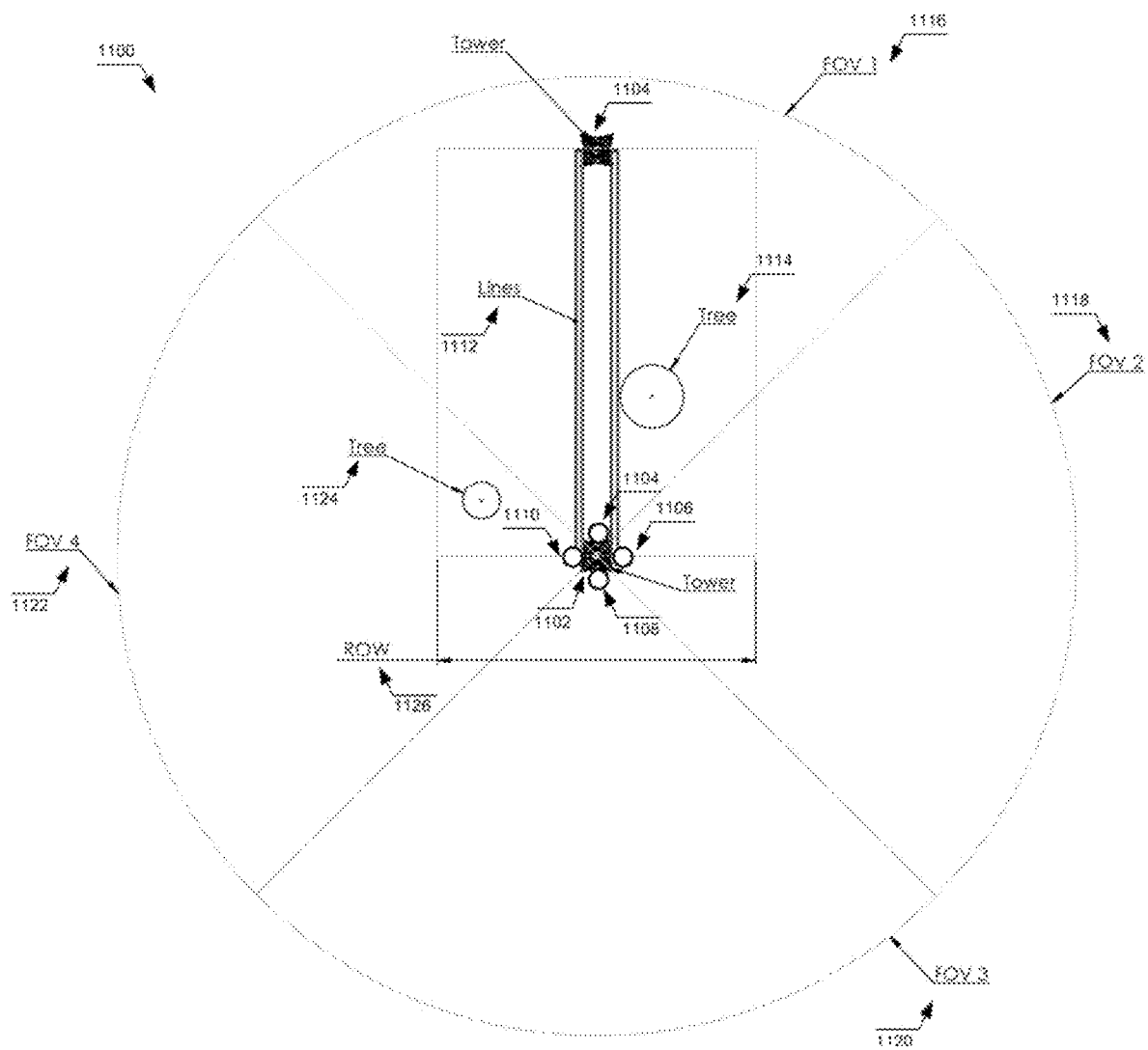
FIG. 11 illustrates a top view of the multiple sensor packages per tower in span-based detection range and field of views in accordance with the present invention.

Directing attention to FIG. 11, in this embodiment wherein 4 sensor packages per tower are used to provide 100% coverage of the ROW and beyond for a span is shown in the bird's eye view, 1100. The transmission tower or power pole, 1102 has 4 sensors, 1104, 1106, 1108 and 1110 installed such that each sensor's FOV covers a portion of the ROW and beyond. Sensor, 1104 scans the area parallel with the span and scans power lines, 1112 and vegetation, 1114 within sensor FOV, 1116. Sensor, 1106 scans the area to the right side of the transmission tower, 1102 within FOV, 1118. The sensor, 1106 FOV, 1118 may be adjacent or overlapping with sensor, 1104 and sensor, 1108 FOVs. The sensor, 1108 FOV, 1120 scans in parallel with the span facing the opposite direction as sensor, 1104. Sensor, 1110 FOV, 1122 completes the coverage with adjacent or overlapping coverage with sensors, 1104 and 1108. Here a tree, 1124 which is in close proximity to the transmission tower, 1102 is not in the FOV of sensor, 1104 but is captured by the scan of the sensor, 1110 with a FOV, 1122 to the left side of the transmission tower, 1102. This embodiment may be combined with other previously described embodiments to optimize the system of sensor packages for a given electric ROW, 1126 and spans to provide 100% coverage for vegetation encroachment detection requirements with no blind spots.

Figure 12:
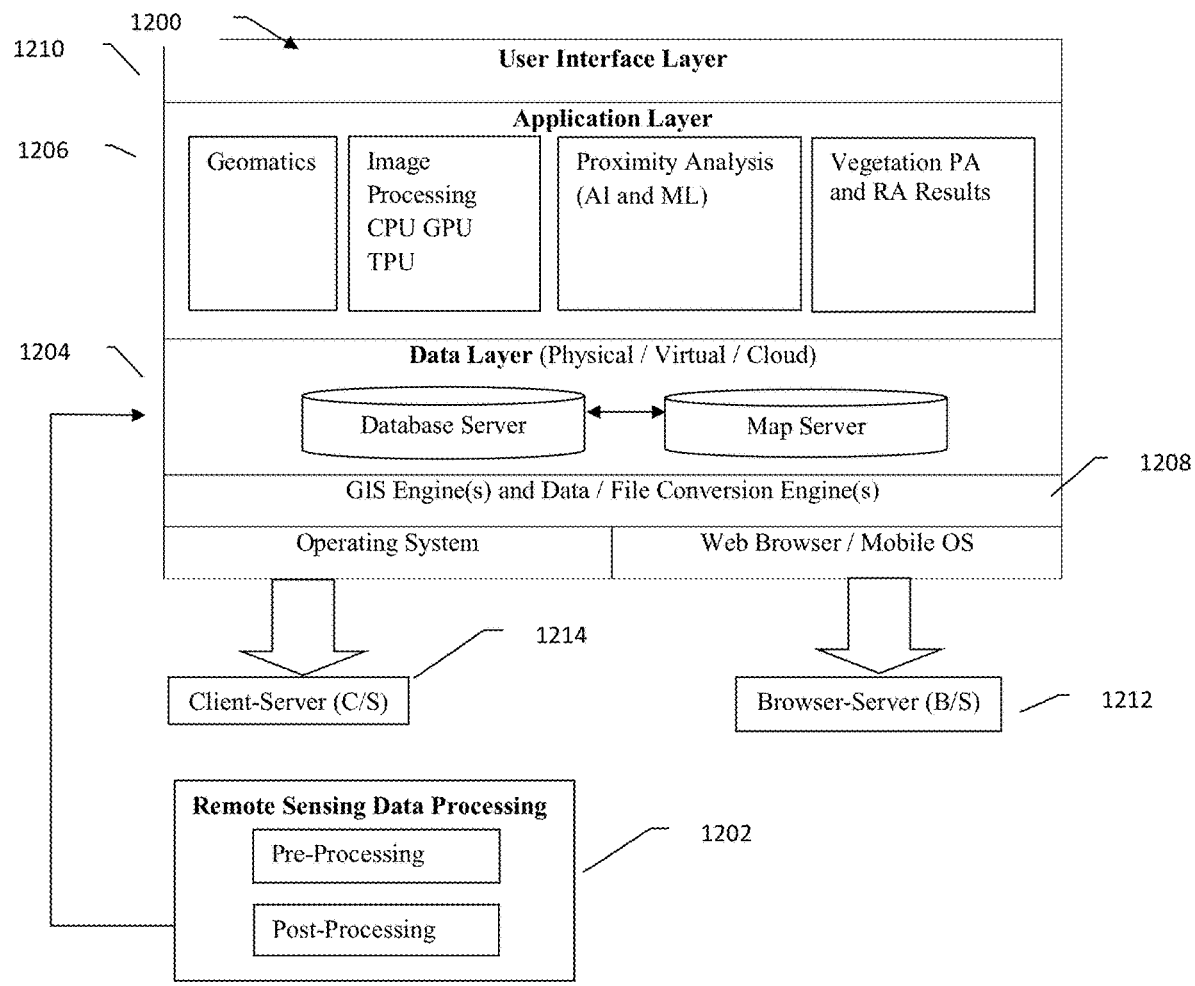
FIG. 12 illustrates a diagrammatic representation of the remote sensing and computing environment and user interface to implement one of the embodiments of the present invention.

Directing attention to FIG. 12, the diagrammatic representation of the sensing, processing, computing and reporting environment and user interface to implement the embodiments of the present invention, 1200 is shown. The sensor package layer, 1202 is the data and image collection process which feeds data to the data layer, 1204. The application layer, 1206 using a combination of proprietary artificial intelligence algorithms, scripts, and off-the-shelf software and central processing unit (CPU), graphics processing unit (GPU) and tensor processing unit (TPU) hardware, processes the data and images, calculates location and dimensions of vegetation, power lines and structures and calculate the vegetation proximity to electric lines based on pre-defined MVCD thresholds. The data product of this application layer is the proximity and resolution for each vegetation. These results are sent to the data layer, 1204. The VPA and VRA results with location, dimension and meta data are stored in the database. Each time a new observation/ scan is completed for a span, the most recent results are stored and the previous results are stored for a period of time to allow for the changes to be tracked for the period of time intervals. The geographic information system (GIS) engine and data file conversion engine, 1208 extracts data on request from the users through the user interface layer, 1210. These users may use the extracted data while having access to the internet or may choose to download the data to a mobile device for use in the field through server layer, 1212. Users select areas of power lines, spans, or towers by ID or name or by drawing a polygon on an interactive map using the client server, 1214.

Figure 13:
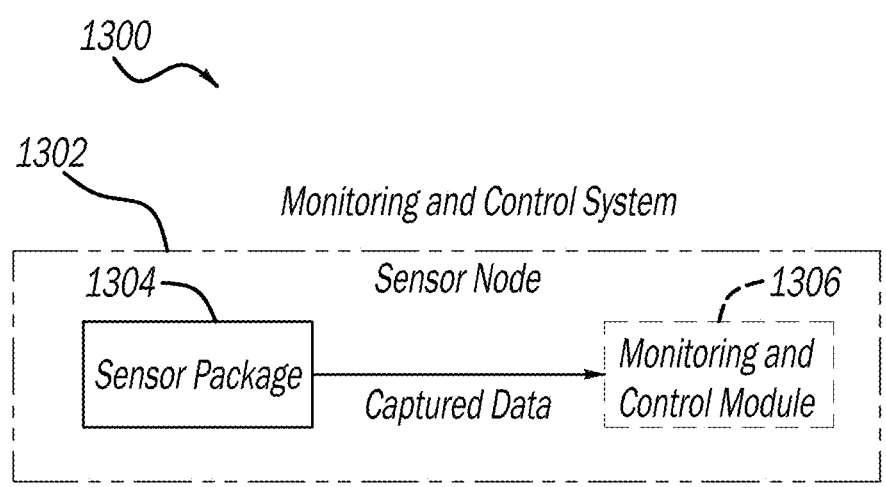
FIG. 13 is a graphical illustration of a system 1300 for in monitoring and detecting conditions associated a utility infrastructure and responding to the conditions.

FIG. 13 is a graphical illustration of a system 1300 for use in monitoring and detecting conditions associated a utility infrastructure and responding to the conditions. The system 1300 may be implemented in connection with one or more environments described above in reference to FIGS. 1-12 and/or below, in which a variety of conditions may exist, form, and/or subside (e.g., vegetation growth, fire, wind, utility structure vibration, etc.). As also described above in reference to FIGS. 1-12 and/or below, the utility infrastructure may include one or more conductors (e.g., electric power transmission and/or distribution lines, etc.) supported by a plurality of support structures (e.g., poles and/or towers, etc.), such that a span is formed between successive support structures.

In various embodiments, the system 1300 may be configured for use in monitoring underwater infrastructures (e.g., underwater power lines, cables, pipelines, etc.), benthic cover, and benthos.

The system 1300 includes a sensor node 1302 (or module). The example sensor node 1302 includes a sensor package 1304 and a monitoring and control module 1306, each configured to communicate with one another.

Figure 14:
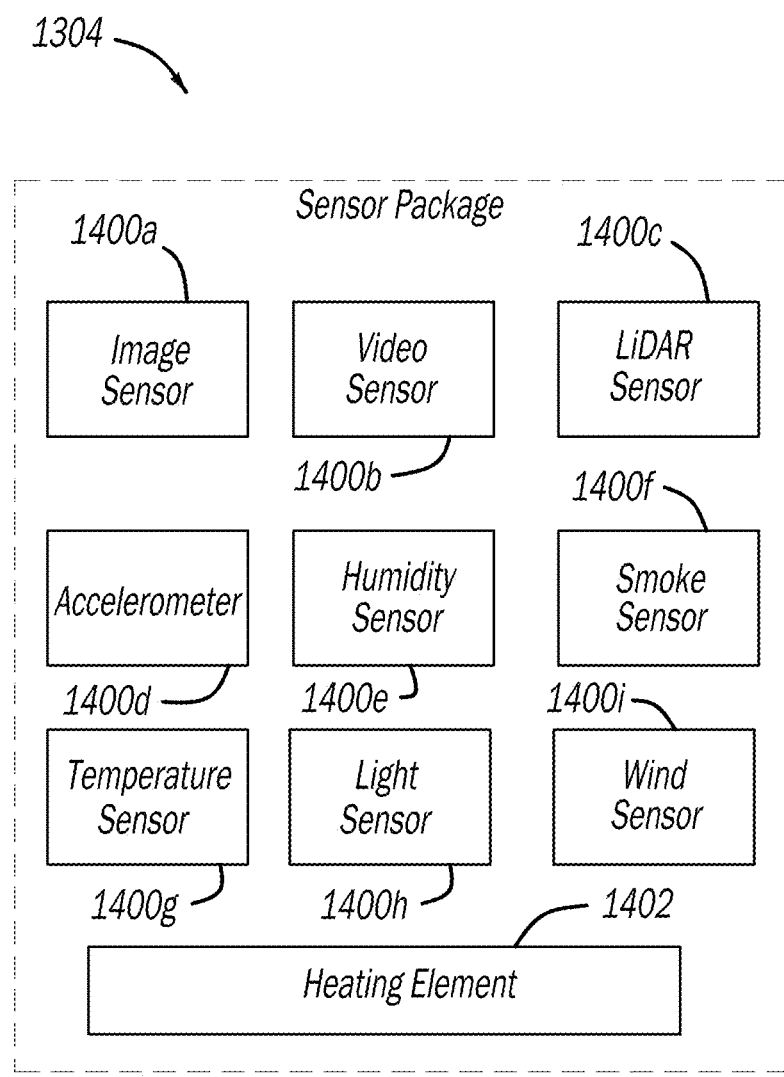
FIG. 14 is a graphical illustration of an example sensor package that may be used in the system of FIG. 13.

FIG. 14 is a graphical illustration of an example sensor package 1304. The sensor package 1304 includes a physical enclosure that integrates a plurality of sensors 1400a-g. The example enclosure includes an image sensor 1400a (e.g., a digital camera, etc.), a video sensor 1400b (e.g., a digital video camera, etc.), a LiDAR sensor 1400c, an accelerometer 1400d, a humidity sensor 1400e, a smoke sensor 1400f, a temperature sensor 1400g, light sensor 1400h, and a wind sensor 1400i (e.g., an anemometer, etc.). In various embodiments, the sensor package 1304 and/or sensors 1400 may be consistent with one or more of the sensor packages and/or sensors described above in reference to FIGS. 1-12. Each sensor node 1302 and, in particular, each sensor package and/or monitoring and control module 1306 may be powered using a wireless power station, a connected battery, and/or a solar panel.

In various embodiments, where the system 1300 is configured for use in monitoring underwater infrastructures, the various sensors 1400 may include submergible sensors (e.g., a submergible image sensor 1400a, etc.) and/or other electromagnetic sensors.

In various embodiments, the enclosure of the sensor package 1304 includes a heating element 1402 (e.g., an electric heater, etc.). The heating element 1402 is configured to active in response to the ambient temperature reaching a predefined threshold. In various embodiments, the threshold may be the temperature at which ice forms, whereby ice formation is prevented or eliminated on the sensor package 1304 (e.g., on the lenses of the sensors 1400, etc.). In various embodiments, the enclosure includes an umbrella or shroud (not shown) attached thereto, such that the viewing path of the sensors 1400 (e.g., an area in the direction in which the lenses of one or more sensors 1400 are pointing, etc.) is protected from foreign material (e.g., dust, snow, rain water, etc.). In various embodiments, the exterior surface of the enclosure (e.g., the entire surface of the enclosure, etc.) is coated with a flame retardant material (not shown) to protect the enclosure and sensors 1400 from flames.

The sensor package 1304 is configured for installation at a variety of physical locations, including one or more of the locations described above in reference to FIGS. 1-12. The locations may include a support structure (e.g., a pole or tower, etc.), a building in the vicinity of the utility infrastructure, and/or another structure (e.g., a pole, tower, or boom, etc.) separate from the utility infrastructure. power lines The sensors 1400 are each configured to capture data indicative of one or more conditions (e.g., an environmental condition, a structural condition, etc.) in the vicinity of the utility infrastructure and, in particular, in one or more fields of view of the sensor 1400 from the location at which the sensor package 1304 is installed. In various embodiments, the fields of view may be consistent with those described above in reference to FIGS. 1-12.

The conditions may include motion (e.g. vibration, etc.) of a support structure (e.g., a pole or tower, etc.) of the utility infrastructure, motion of vegetation (e.g., trees, etc.), species of vegetation (e.g., trees, etc.), wild life (e.g., migratory birds, habitats of the wildlife (e.g., protected or endangered habitats (e.g., nests, etc.), etc.), vegetation conditions (e.g., conditions of trees, etc.), an object hanging on a power line of the utility infrastructure (broadly, windthrow), fire and/or smoke, power line oscillation (broadly, blowout), clearance distances and, in particular, minimum-ground-to-conductor clearance (MGCC) distance, conductor-to-conductor distances, damage (or potential damage) to the utility infrastructure (e.g., power lines, support structures or other equipment, etc.), environmental encroachments on the utility infrastructure (e.g., power lines, etc.).

Example vegetation include Coast Live Oak (*Quercus agrifolia*), Douglas Fir (*Pseudotsuga menziesii*), Blue Gum Eucalyptus (*Eucalyptus globulus*), Valley Oak (*Quercus lobata*), Live Oak (*Quercus wislizeni*), Ponderosa Pine (*Pinus ponderosa*), Monterey Pine (*Pinus radiate*), edible fig, red gum, shamel ash, iceplant, Himalayan blackberry, Brazilian pepper tree, Mexican fan palm, yellow starthistle, Japanese Knotweed, and century plants.

Example wild life may include mole salamanders, true frogs, Giant garter snake, Bald eagle, American peregrine falcon, kangaroo rats, Gray wolf, Island fox, bighorn sheep, herons, egrets, bald eagles, warblers, swallows, tanagers, and flycatchers.

Example vegetation conditions include stresses on the vegetation, vegetation diseases, infestations of the vegetation, and/or hazards to the vegetation such as, for example, from biotic stressors (insects, fungus, virus or other microbes) or abiotic stressors (malnutrition, drought or flood).

Example windthrow conditions include tree limbs, an entire tree, a broken support structures hanging from a power line.

Example damage to the utility infrastructure include a broken cross-arm, broken insulator, a fallen transformer, a disconnected power line conductor, a broken pole or tower, a broken splice, and/or ice formation on a power line or other structure.

Example environment encroachments include grow-in, fall-in, and overhang of vegetation on the utility infrastructure (e.g., on a power line, pole or towers, etc.)

The example sensors 1400 are each configured to provide (e.g., transmit, etc.) the captured data (broadly, condition data) to the monitoring and control module 1306.

Figure 15:
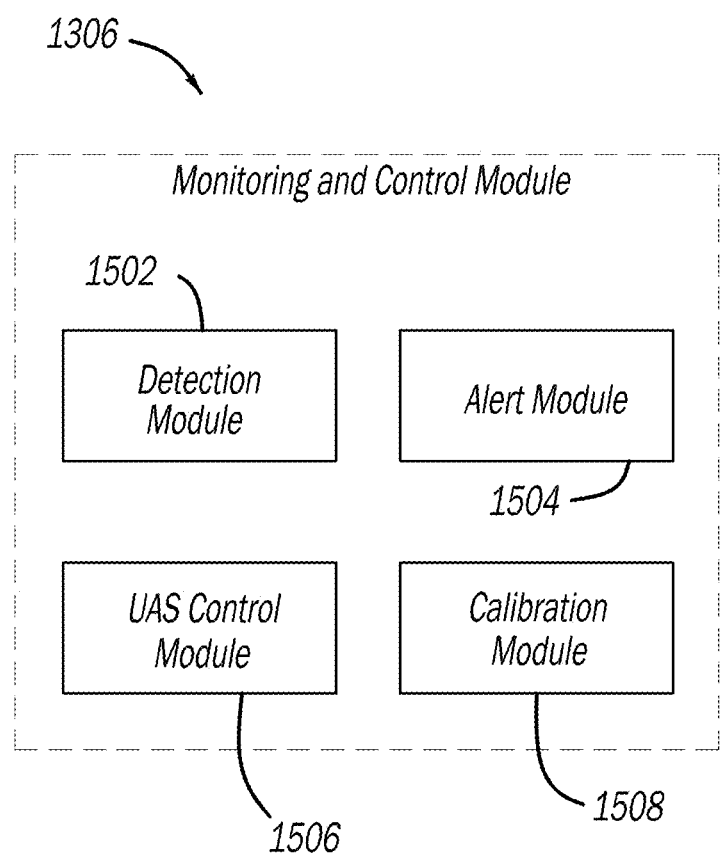
FIG. 15 is a graphical illustration of an example monitoring and control module that may be used in the system of FIG. 13.

FIG. 15 is a graphical illustration of an example monitoring and control module 1306. The monitoring and control module 1306 is configured to communicate with and receive the data captured by each sensor 1400 of the sensor package 1304.

The example monitoring and control module 1306 includes a detection module 1502, an alert module 1504, and an unmanned aircraft system (UAS) control module 1506. In various embodiments, the monitoring and control module 1306 may include, in addition and/or the alternative to the UAS control module 1506, a watercraft control module (not shown). In various embodiments, the monitoring and control module 1306 may further include calibration module 1508.

The monitoring and control module 1306 may be integrated with the sensor package 1304 (e.g., in the enclosure of the sensor package, etc.) or remote from the sensor package 1304 (e.g., running on a server in the cloud, etc.). In various embodiments (e.g., where the monitoring and control module is remote from the sensor package 1304, etc.), the monitoring and control module 1306 may be configured to communicate with and receive data captured by a plurality of sensor packages 1304 installed throughout one or more utility infrastructures.

As described in greater detail below, the detection module 1502 is generally configured to receive data captured by each sensor 1400 of the sensor package and, based on the captured data, determine one or more conditions in the vicinity of the utility infrastructure. The detection module 1502 is configured to then, based on the determined conditions, provide (e.g., transmit, etc.) an alert for the condition using the alert module 1504. In various embodiments, the condition include includes the determined condition.

Figure 16:
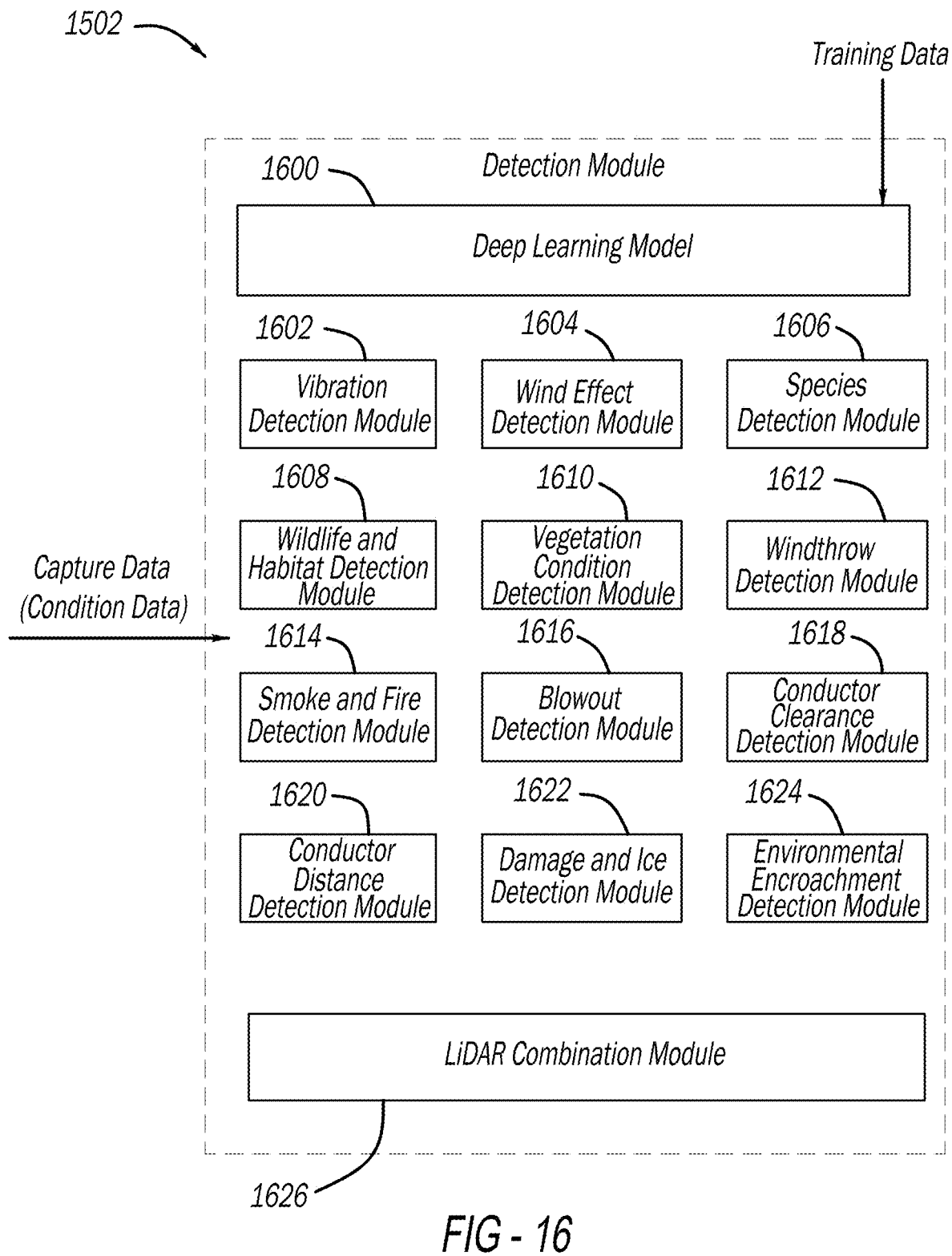
FIG. 16 is a graphical illustration of an example detection module that may be used in the system of FIG. 13.

FIG. 16 is a graphical illustration of an example detection module 1502. In various embodiments, the detection module 1502 includes a machine learning model 1600. The example machine learning module includes a deep learning model. The deep learning model may include a plurality of deep learning models, including a classification model, regression model, objection detection model, object segmentation model, semantic segmentation model, landmark detection model, and/or action recognition model. The detection module is configured to train the deep learning models using data (e.g., historical data, etc.) indicative of known (or previously determined) conditions. In various embodiments, the known conditions are consistent with the conditions described above in connection with the sensors 1400.

In various embodiments, the classification model may include one or more of the following networks or variants thereof: AlexNet (see ImageNet Classification with Deep Convolutional Neural Networks), VGG-16 (see: K. Simonyan & A. Zisserman, Very Deep Convolutional Networks for Large-Scale Image Recognition), VGG-19, Inception-v1 (see Going Deeper with Convolutions), Inception-v3 (see Rethinking the Inception Architecture for Computer Vision), ResNet-18, ResNet-34, ResNet-50 (see Deep Residual Learning for Image Recognition), ResNet-101, ResNet-152, Xception (see Xception: Deep Learning with Depthwise Separable Convolutions), Inception-v3, Inception-v4 (see Inception-v4, Inception-ResNet and the Impact of Residual Connections on Learning), Inception-ResNets (see Inception-v4, Inception-ResNet and the Impact of Residual Connections on Learning), ResNeXt-50 (see Aggregated Residual Transformations for Deep Neural Networks), SqueezeNet, ShuffleNet, MobileNet v1, MobileNet v2, GoogleNet, DenseNet-121, DenseNet-169, and/or DenseNet-201.

In various embodiments, the regression model may include one or more modified classification network. In various embodiments, the modification to the classification network may use a fully connected linear layer that includes a desired number of continuous outcomes (e.g., instead of using a Softmax layer at the end that may results in a label output, etc.).

In various embodiments, the objection detection model may include one or more of the following networks or variants thereof: Region-Based Convolutional Neural Network (R-CNN) (see Rich feature hierarchies for accurate object detection and semantic segmentation), Fast R-CNN (see Fast R-CNN), Faster R-CNN (see Faster R-CNN: Towards Real-Time Object Detection with Region Proposal Networks), YOLO (see You Only Look Once: Unified, Real-Time Object Detection), YOLOv2 (see YOLO9000: Better, Faster, Stronger), YOLOv3 (see YOLOv3: An Incremental Improvement), SSD (see SSD: Single Shot MultiBox Detector), FPN (see Feature Pyramid Networks for Object Detection), RetinaNet (see Focal Loss for Dense Object Detection), CornerNet: Detecting Objects as Paired Keypoints, and/or EfficientDet: Scalable and Efficient Object Detection.

In various embodiments, the objection segmentation model may include a Mask R-CNN network or variants thereof.

In various embodiments, the semantic segmentation model may include one or more of the following networks or variants thereof: U-Net: Convolutional Networks for Biomedical Image Segmentation, DeepLab (see, Semantic Image Segmentation with Deep Convolutional Nets, Atrous Convolution, and Weakly- and Semi-Supervised Learning of a Deep Convolutional Network for Semantic Image Segmentation, FCN: Fully Convolutional Networks for Semantic Segmentation, FPN: Feature Pyramid Network, The One Hundred Layers Tiramisu: Fully Convolutional DenseNets for Semantic Segmentation, Multi-Scale Context Aggregation by Dilated Convolutions, Fully Connected CRFs, Rethinking Atrous Convolution for Semantic Image Segmentation, Encoder-Decoder with Atrous Separable Convolution for Semantic Image Segmentation, FastFCN: Rethinking Dilated Convolution in the Backbone for Semantic Segmentation, Improving Semantic Segmentation via Video Propagation and Label Relaxation, Gated-SCNN: Gated Shape CNNs for Semantic Segmentation, PSPNet: Pyramid Scene Parsing Network, DeepLab, DeepLabv3 and DeepLabv3+, PANet: Path Aggregation Network, and/or EncNet: Context Encoding Network.

In various embodiments, the landmark detection model may include one or more of the following networks or variants thereof: Facial Landmark Detection by Deep Multi-task Learning, Joint face detection and alignment using multi-task cascaded convolutional networks, and/or Hyperface: A deep multi-task learning framework for face detection, landmark localization, pose estimation, and gender recognition.

In various embodiments, the action recognition model may include one or more of the following networks or variants thereof: Large-scale Video Classification with Convolutional Neural Networks, Two-Stream Convolutional Networks for Action Recognition in Videos, LSTM architecture: Long-term Recurrent Convolutional Networks for Visual Recognition, 3D ConvNets: Learning Spatiotemporal Features with 3D Convolutional Networks, MotionNet, Quo Vadis, Action Recognition: A New Model and the Kinetics Dataset by Zisserman, 3DResNet, pseudo-residual C3D, and/or Classification with Channel-Separated Convolutional Networks.

Referring again to FIG. 15, and as described in greater detail below, the alert module 1504 is generally configured to, in response to the detection module 1502, transmit the alert for the determined condition to one or more personal (e.g., an emergency responder or utility infrastructure personal, etc.) or devices (e.g., of a mobile device of an emergency responder, etc.). In various emboldens, the alert may include real-time situational awareness of the condition (e.g., a live video feed of the environment and hazards (e.g., fire, etc.), etc.).

As also described in greater detail below, the UAS control module 1506 is generally configured to, in response to the determined condition, dispatch one or more dispatch and control one or more UAS (e.g., drones, etc.) to the location of the condition to surveil and/or treat the condition.

In various embodiments that may include a watercraft control module, the watercraft control module may be configured to, in response to the determined condition, dispatch one or more surface and/or submergible autonomously and/or remotely controlled watercraft to the location of the condition to surveil and/or treat the condition. In various embodiments, the watercraft may include an unmanned autonomous submarine and described in U.S. Pat. No. 7,290,496 to Asfar et al., the entirety of which is incorporated herein by reference. The watercraft may include, for example, electromagnetic sensors configured to capture data indicative of an underwater condition, a communications receiver/transmitter configured to transmit the captured data to the monitor and control module 1304, a microprocessor configured to control the sensors and to provide the captured data to the monitor and control module 1304 via the receiver/transmitter, and propulsion system.

In various embodiments, calibration module 1508 is optionally configured to, in response to manual user input, calibrate the detection module to detect the condition (e.g., in the alternative to using the deep learning model 1600 to detect the condition, etc.).

With continued reference to FIG. 16, the example detection module 1502 includes a plurality of different detection modules, including a vibration detection module 1602, a wind effect detection module 1604, a species detection module 1606, a wildlife and habitat detection module 1608, a vegetation condition detection module 1610, a windthrow detection module 1612, a smoke and fire detection module 1614, a blowout detection module 1616, a conductor clearance detection module 1618, a conductor distance detection module 1620, a damage and ice detection module 1622, and an environment encroachment detection module 1624.

The example vibration detection module 1602 is configured to receive the captured data from one or more sensors 1400 (e.g., the image sensor 1404a, video sensor 1400b, or LiDAR sensor 1400c, etc.) and identify a pole or tower in the captured data using the deep learning model 1600. The vibration detection module 1602 is configured to determine, based on the identified pole or tower shaking or pixel displacement of the pole or tower in time increments of the captured data (e.g., in successive image frames of data captured by the image sensor 1400a or video sensor 1400b, etc.), an amplitude and frequency of the pole or tower in both degrees of freedom (i.e., x and y degrees). The vibration detection module 1602 is configured to, based on the amplitude and frequency, determine an estimated probability that the pole or tower will fail (e.g., break, collapse, etc.).

The vibration detection module 1602 is configured to, determine whether the estimated probability meets a predefined threshold. Using the alert module 150, the vibration detection module 1602 is configured to, in response to the estimated probability meeting the predefined threshold, cause an alert for the probable failure of the pole or tower to be provided.

In various embodiments, the predefined threshold may be based on the natural frequency of the pole or tower in the field of view of the sensor 1400 that is configured to transmit the captured data to the monitoring and control module 1306. In connection therewith, it should be appreciated that a vibration frequency of a pole or tower matching the natural frequency of the pole or tower will generate resonant frequency, at which point the pole or tower will experience maximum vibration amplitude and undergo disastrous mechanical failure a condition known as resonance disaster.

It should also be appreciated that premature mechanical failure of a pole or tower of the utility infrastructure can happen for reasons that include high wind, earthquake, and impact from foreign object (e.g., as a moving vehicle, etc.). Determining these kinds of imminent failures in advance is advantageous for "condition based" maintenance of electric power line infrastructure. This is an improvement over utility infrastructures that are maintained using "on condition" maintenance philosophy which requires manual inspections of all infrastructures in certain frequencies irrespective of their actual condition.

In various embodiments, the sensor package 1400a and, in particular, each sensor 1400 providing captured data to the vibration detection module 1602 may be fixedly mounted to another pole or tower. However, the pole or tower to which the sensor 1400 is mounted may be subject to its own sway and/or vibration, thereby causing a disturbance to the frame of reference of the sensor 1400. The vibration detection module 1602 is configured to estimate the motion of pole or tower to which sensor 1400 is mounted and, in connection with determining amplitude and frequency of the pole or tower in the field of view of the sensor 1400, factor in the motion of the pole or tower to which the sensor 1400 is mounted.

Figure 17:
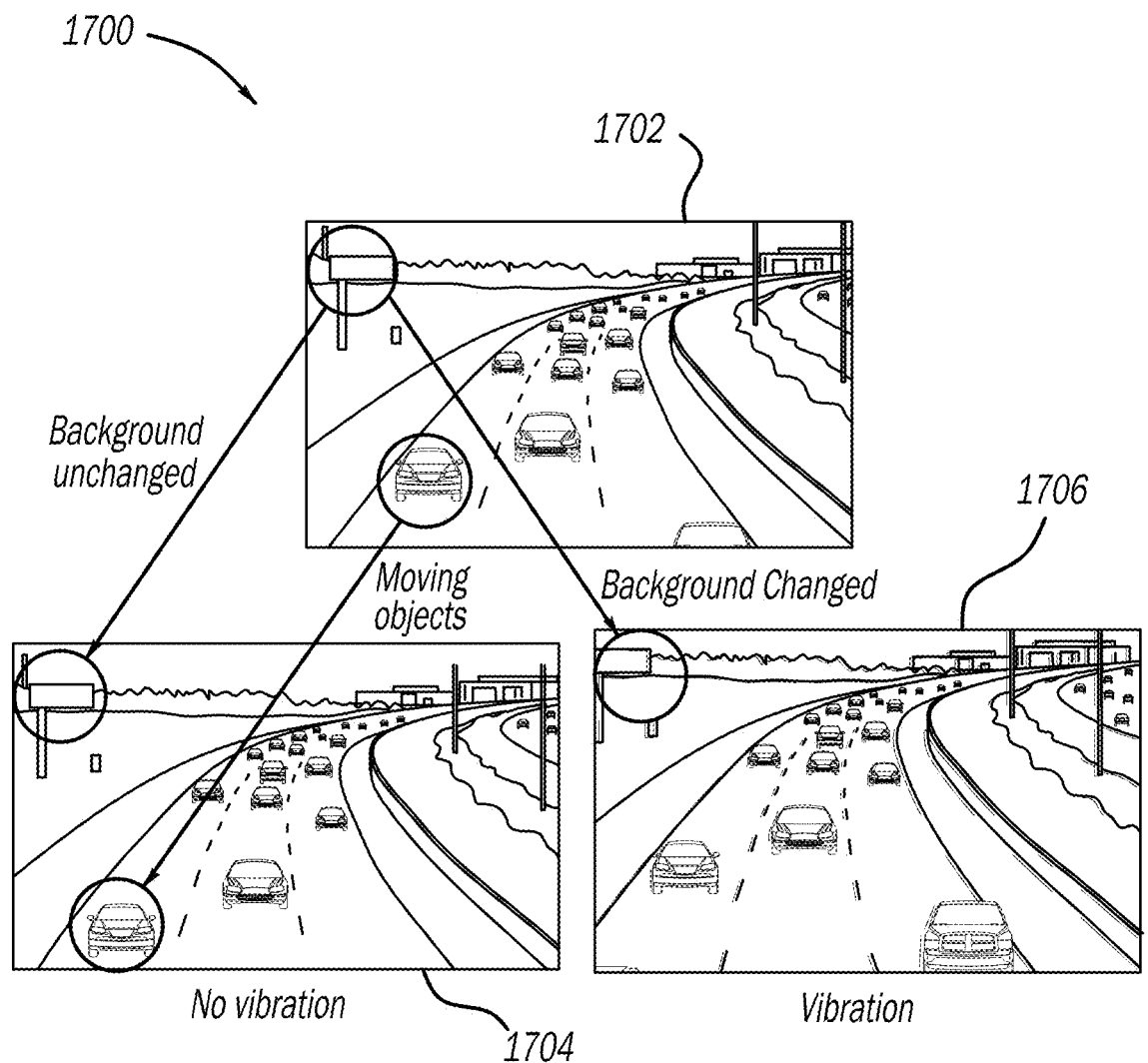
FIG. 17 includes a graphical illustration that conceptually illustrates example image frames.

In connection with factoring in the motion of the pole or tower to which the sensor 1400 is mounted, the vibration detection module 1602 is configured to compare successive frames from the captured data received from the sensor 1400 at different time t points. FIG. 17 includes a graphical illustration that conceptually illustrates example successive frames 1700 that may be compared at different time t points. In one example, the successive frames 1700 received from the sensor 1400 (e.g., the image sensor 1400a, etc.) include a base frame 1702 captured at time t and a successive frame 1704 captured at time t+1. As conceptually illustrated therein, the position of the pole or tower remains generally stagnant from frame 1702 to frame 1704.

However, as expected, the position of the car advances from frame 1702 to frame 1704. The vibration detection module 1602 is configured to determine, based on a comparison of frames 1702 and 1704 at different time t points, that the pole or tower to which the sensor package 1302 is attached and, in particular, the sensor 1400, is still. However, in another example, the position of the pole or tower is changed from base frame 1702 to successive frame 1706 captured at time t+2. And, the position of the car, as is not to be expected, recedes from base frame 1702 to successive frame 1706. The vibration detection module 1602 is configured to determine, based on a comparison of frames 1702 and 1704 at different time t points, that the pole or tower to which the sensor 1400 is attached and, in particular, the sensor 1400, is vibrating (or moving).

In connection therewith, the vibration detection module 1602 is configured to detect the motion of the sensor 1400, in addition to the amplitude of the motion, using any one or more of a variety of known imagine processing or machine learning-based techniques.

Figure 18:
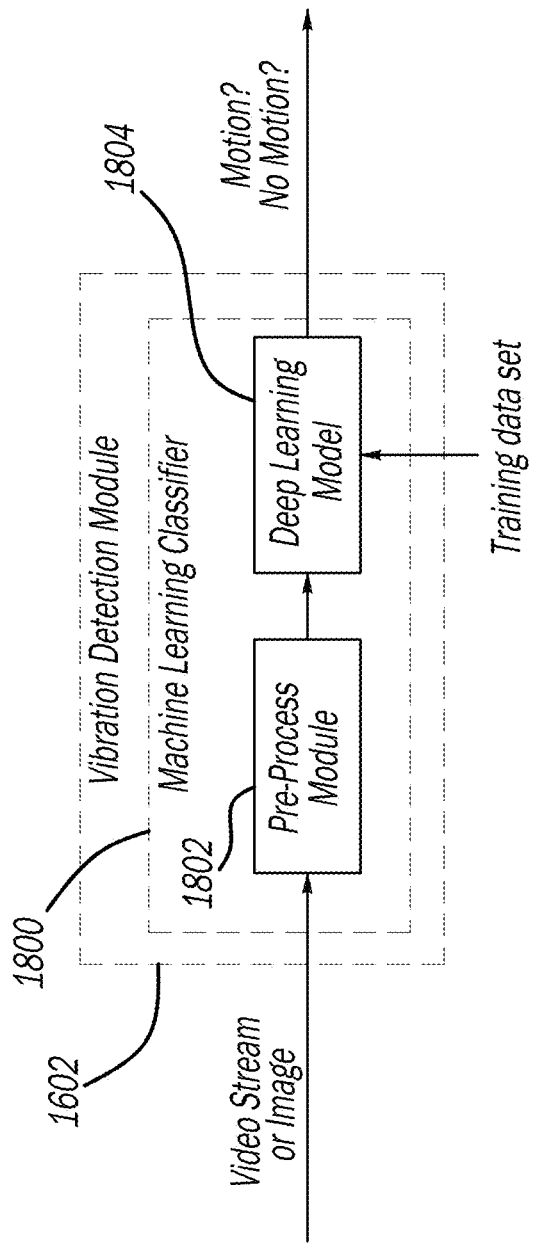
FIG. 18 is a graphical illustration of an example machine learning classifier that may be used in the system of FIG. 13.

In various embodiments, the vibration detection module 1602 is configured to detect motion of the pole or tower in the captured data received from the sensor 1400 using a machine learning classifier 1800. FIG. 18 is a graphical illustration of an example machine learning classifier 1800. The machine learning classifier includes a pre-process module 1802 and a machine learning model 1804. The example machine learning model 1804 is a deep learning model generally consistent with deep learning model 1600 and may include one or more networks described above in reference the deep learning model 1600 or variants thereof (e.g., a convolutional neural network combined with recurrent neural networks, etc.).

The vibration detection module 1602 is configured to receive a training data set and train the machine learning classifier 1800 and, in particular, the deep learning model 1804, using a training dataset. The example training data set includes condition data (e.g., videos, etc.) captured by a sensor (e.g., image sensor 1400*a* or video sensor 1400*b*, etc.) mounted on a still pole or tower and condition data captured by a sensor mounted on a moving pole or tower. The vibration detection module 1602 is configured to estimate model parameters for the deep learning model 1804 using an optimization technique such as, for example, back-propagation, whereby the performance of the deep learning model can then be estimated by executing the deep learning model 1804 on a test set of validation data input to the deep learning model 1804, whereby the performance of the deep learning model 1804 is prepared to classify "unseen" video (e.g., video captured by video sensor 1400*b* when utility infrastructure is being monitored using system 1300, etc.).

Then, when the system 1300 is monitoring the utility infrastructure, the pre-process module 1802 is configured to receive condition data (e.g., a video stream or images, etc.) captured by one or more sensors 1400 and to pre-process the condition data. The pre-process module 1802 is configured to then provide the pre-processed condition data to the deep learning model 1804.

Figure 19:
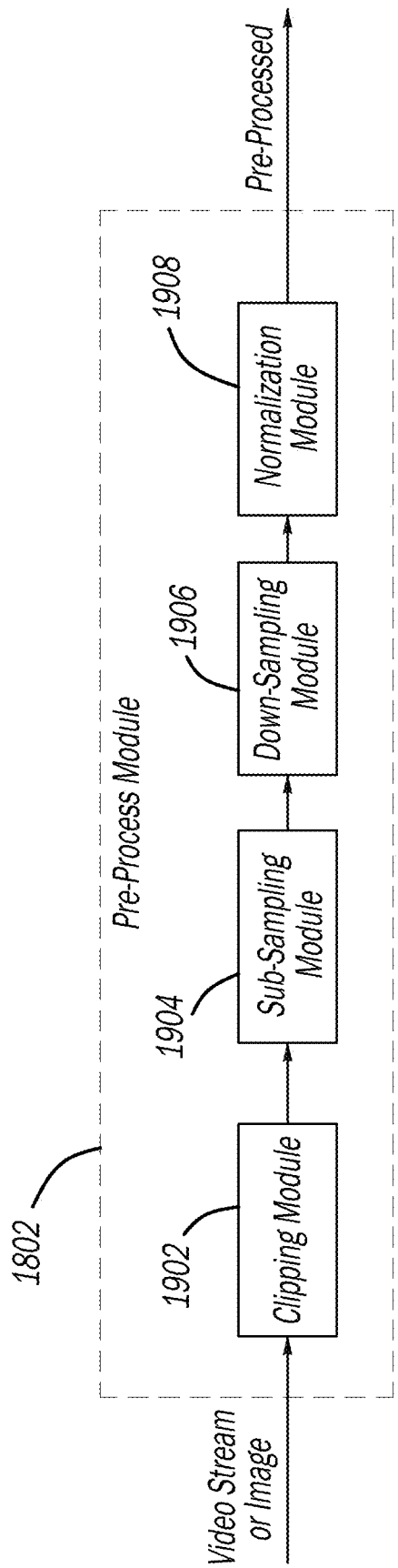
FIG. 19 is a graphical illustration of the example pre-process module that may be used in the machine learning classifier of FIG. 18.

FIG. 19 is a graphical illustration of the example pre-process module 1802. The pre-process module 1802 includes a clipping module 1902, a sub-sampling module 1904, a down-sampling module 1906, and a normalization module 1908.

In connection with pre-processing the condition data, the pre-process module 1802 and, in particular, the clipping module 1902 is configured to receive the condition data from one or more sensors 1400 (e.g., image sensor 1400*a* or video sensor 1400*b*, etc.) and clip the condition data (e.g., video, etc.) from time t to time t+Δt. The clipping module 1902 is configured to then provide the clipped condition data to the sub-sampling module 1904. The sub-sampling module is configured to receive the clipped condition data and sub-sample the clipped video in time, for example, every 3 frames. In various embodiments, the sub-sampling module 1904 may be configured to keep all frames and/or the pre-process module 1902 may be configured to bypass the sub-sampling module 1904 depending on, for example the maximum desirable frequency of motion for detection below the natural frequency of a specific support structure.

With continued reference to FIG. 19, the sub-sampling module 1904 is configured to receive the sub-sampled condition data (or, potentially, the clipped condition data) and down-sample the frames of the condition data to reduce the size (e.g., the image size, etc.), thereby speeding up execution/calculation. The down-sampling module 1906 is configured to then provide the down-sampled condition data to the normalization module 1908. In various embodiments, down-sampling module 1904 may be configured to maintain the frames and/or the sub-sampling module 1906 or clipping module 1902 may be configured to bypass the down-sampling module 1906, depending on, for example, a desirability to process frames of the condition data in full resolution.

The normalization module 1908 is configured to receive the down-sampled condition data (or, potentially, the clipped condition data or sub-sampled condition data) and normalize the intensity of the condition data (e.g., the image, etc.). The normalization module 1908 is configured to then provide the pre-processed condition data and, in particular, the normalized condition data to the deep learning model 1804.

Referring again to FIG. 16, in various embodiments, the vibration detection module 1602 is configured to detect the amount of motion (or amplitude of a vibration) of the pole or tower of the utility infrastructure, in addition to the motion itself. In connection therewith, the vibration detection module 1602 may be configured to, in connection with detecting the amount of motion, generate a displacement vector in pixel units, for example if Δt is small. The vibration detection module 1602 may be configured to detect the amount of motion using the displacement vector. Alternatively, the vibration detection module 1602 may be configured to generate a trajectory by breaking the condition data (e.g., a video clip, etc.) into smaller segments and estimating one vector of motion for each segment.

In various embodiments, the vibration detection module 1602 may be configured to use a regression model to map the condition data (e.g., a video clip, etc.) to the amount of motion in each degree of freedom of the support structure (e.g., a pole or tower, etc.). The regression model may include one or more networks described above in reference to the deep learning model 1600 or variants thereof (e.g., a convolutional neural network, etc.). In various embodiments where detection of the angle of motion of the support structure may be desirable (e.g., for a limited number of angles, etc.), the vibration detection module 1602 may be configured to use a classifier model to classify the motion of the support structure to a set of discrete angles. In connection therewith, the vibration detection module 1602 may be configured to train the regression and/or classifier models using a training data that includes a known amount of motion in terms of pixel units between a plurality of frames in the condition data at times t and t+Δt.

In connection detecting the amount of motion, the vibration detection module 1602 is configured to train the regression model using the training data set as input and motion amplitudes as outputs of the model, whereby the regression model is configured to determine the amount of motion of the support structure in the condition data (e.g., in a given video clip, etc.). The vibration detection module 1602 is configured to measure the amount of motion at different time t points in the condition data and to plot or record the motion versus time. The vibration detection module 1602 is configured to then apply signal processing techniques to calculate, based on the motion versus time, the frequency of vibration of the support structure.

Figure 20:
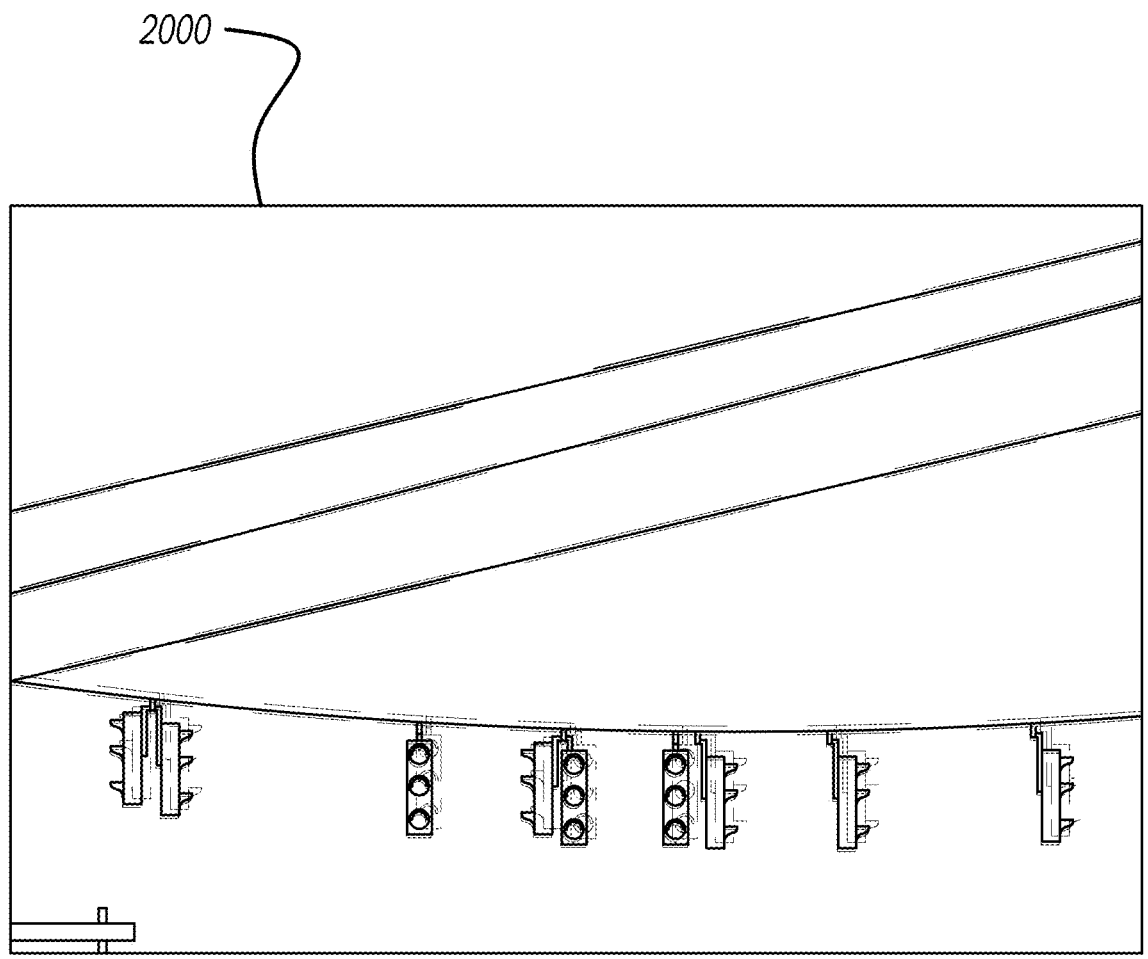
FIG. 20 illustrates an example of condition data that includes a single blurred image.

In various embodiments, the vibration detection module 1602 may configured to detect motion of a pole or tower of the utility infrastructure and measure the amount of motion using a single image and, in particular, an image having a long exposure time received as condition data from one or more sensors 1400 (e.g., image sensor 1400*a*, etc.). FIG. 20 illustrates an example of condition data that includes a single blurred image 2000. In connection therewith, the vibration detection module 1602 may be configured to train a machine learning model to detect and/or measure the amount of the motion of the support using a training dataset that includes blurred images and the status of each blurred image (e.g., "motion" or "no motion," etc.). The machine learning model may be a deep learning model that includes a regression model consistent with the deep learning model 1600 described above. The machine learning model may be trained with similar types of data. Alternatively, the vibration detection module 1602 may be configured to use known image processing techniques to detect and/or measure the amount of motion of the support structure.

In various embodiments, the one or more sensors 1400 from which the condition data is received by the vibration detection module 1602 may be adjusted based on multiple camera settings (e.g., zoom, focal length of lens, etc.), to thereby calibrate the amount of motion detectable in the condition data captured by the sensors 1400. For example, when the image sensor 1400*a* is zoomed into more distance locations, the image sensors 1400*a* is more sensitive to motion and smaller motions of the support structure will shift the background image. The vibration detection module 1602 may be configured to communicate with the sensor package 1302 to zoom the image sensor 1400 at more distance locations with a desirable background (e.g., more stationary objects that are automatically detected by the vibration detection module 1602, etc.), to thereby detect vibration with a higher sensitivity. In various embodiments, the camera settings may be adjusted manually.

In various embodiments, the training, validation, and and/or test data sets use with the vibration detection module 1602 may be prepared using manual annotation, automated or semi-automated annotations, and/or synthetic image/ video generation. For example, blurring in images due to motion may be generated by a blurring model.

With continued reference to FIG. 16, the example wind effect detection module 1604 is configured to receive the captured data from one or more sensors 1400 (e.g., the video sensor 1404*b*, etc.) and detect motion, the amount of motion, and/or the pattern of the motion of the vegetation (broadly, wind effect characteristics) (e.g., due to wind effect, etc.) using the deep learning model 1600. The wind effect detection module 1604 is configured to determine, based on the wind effect characteristics (e.g., the detection of wind motion, the amount of wind motion, etc.), whether the vegetation poses a potential risk to the utility infrastructure, thereby meriting attention. Using the alert module 1504, the wind effect detection module 1604 is configured to, in response to the determination that the vegetation poses a risk to the utility infrastructure, cause an alert for the potential risk to be provided. In various embodiments, the alert may identify the vegetation that poses the risk.

In various embodiments, the wind effect detection module 1604 is configured to, in connection with the detecting the wind effect characteristics, use machine learning and/or computer visions algorithms that include a classification task, an object detection task, a landmark detection task, an instance segmentation task, a semantic segmentation task, and a probability mapping (heat mapping) task. The machine learning model is consistent with the deep learning model 6000.

For each of task, the wind effect detection module 1604 is configured to train the deep learning model and test the deep learning model using training and test data sets. Before using the deep learning model to determine the wind effect characteristics, the wind effect detection module 1604 is configured to use an image stabilizer or motion correction technique (e.g., a mechanical technique, a processing-based technique, etc.) to remove motion artifacts in the condition data received from the one or more sensors 1400.

For the classification task, the wind effect detection module 1604 is configured train the deep learning model using a training dataset that includes images and/or videos of vegetation (e.g., trees, etc.) that belong to different classes such, as for example, a "normal" tree class or an "abnormal" tree class. The normal class includes a class of trees that will likely survive long enough whereby they do not need attention in the near future. The abnormal class includes a class of tree that will likely fall by themselves or by an external force such as wind, whereby they do need attention in the near future. Other set of classes of vegetation may also be included in the training dataset.

For the object detection task, the wind effect detection module 1604 is configured to identify the location of individual vegetation (e.g., trees, etc.) in the condition data (e.g., images or video, etc.) received from the one or more sensors (e.g., image sensor 1400*a*, video sensor 1400*b*, etc.) based on, for example, the coordinates of a point inside the object (for example center of object), a bounding box around the object, etc. The wind effect detection module 1604 may be configured to, in connection with the objection detection task, identify the individual vegetation (e.g., trees, etc.) in the condition data and to then use a classifier to classify the vegetation into the appropriate category. The training and test datasets include the appropriate annotations.

For the object detection task, the wind effect detection module 1604 may be configured to use multiple types or versions of detection algorithms each having different sensitivity or specificity settings. One version of the detection algorithm may be configured with high sensitivity setting (potentially at the expense of lower specificity). The wind effect detection module 1604 may then be configured to execute the algorithm on the condition data (e.g., image or video, etc.) received from the one or more sensors (e.g., image sensor 1400*a*, video sensor 1404*b*, etc.) with a relatively wide view. The wind effect detection module 1604 may then be configured to execute the algorithm to detect potential locations of the vegetation of interest. The wind effect detection module 1604 may be configured to then provide (e.g., transmit, etc.) a command to the one or more sensors 1400 to cause the sensors 1400 more closely focus, zoom, or orient to a at the detected locations and capture new condition data (e.g., images or video, etc.) for those locations. The wind effect detection module 1604 may be configured to then provide the new condition data the algorithm with higher specificity, to thereby reject any false positive.

For the landmark detection task, the wind effect detection module 1604 is configured to detect a set of landmarks on each individual vegetation (e.g., each tree, etc.), for example, landmarks on the trunk or canopy of a tree, etc. The wind effect detection module 1604 is configured to, at each time point in the condition data (e.g., video, etc.), determine a "pose" of the tree based on the landmarks. The wind effect detection module 1604 is configured to track the landmarks over time in different frames of the condition data receive from the one or more sensors 1400, whereby the pattern of tree motion can be identified. The wind effect detection module 1604 is configured to then classify the identified patterns into appropriate categories using a classifier that is separately trained for this task.

For the segmentation task, the wind effect detection module 1604 is configured to classify each individual pixel in the condition data (e.g., image or video, etc.) received from the one or more sensors 1400a (e.g., image sensor 1400a or video sensors 1400b, etc.) into an appropriate category (broadly, semantic segmentation). In various embodiments, this semantic segmentation may be describable when the condition data and, in particular, images received from the one or more sensors 1400 are desired to be analyzed as a whole. The wind effect detection module 1604 may be configured to train a machine learning model used for the semantic segmentation task that includes images or videos and their associated segmentation maps (label maps). The machine learning model may be any segmentation model, such as those based on deep learning.

For the probability mapping (heat mapping) estimation task, the wind effect detection module 1604 is configured to, using a machine learning model consistent with the deep learning model 1600, assign a continuous variable to each individual pixel in the condition data (e.g., an image or video, etc.) that correlates with the likelihood of a problem. The wind effect detection module 1604 may be configured to train or test the machine learning model using training or test sets similar to the training or test sets used the segmentation task. For example, the wind effect detection module 1604 may be configured to, for each image in the condition data received from the one or more sensors 1400, generate a probability map by assigning 1 to the pixels in the image that are inside the region with a problem and 0 to all other pixels, whereby the mapping serves as a probability map to be estimated.

In various embodiments, the wind effect detection module 1604 may be used to generate a probability map to first identify the areas in the condition data received from the one or more sensors 1400 that need initial attention, for example, all the trees or all the trees that potentially have problem. The wind effect detection module 1604 may be configured to then focus on those areas of the condition data (e.g., an image, etc.) only. In connection therewith, the wind effect detection module 1604 may be configured to directly apply other techniques, such as object detection, classification, etc. Or, the wind effect detection module 1604 may be configured to communicate with the one or more sensors 1400 (e.g., the image sensors 1400a, etc.) to cause the image sensors 1400 to change pose, for example by changing pan, tilt, and zoom of the image sensors 1400a to focus more on the regions of interest in the field of view and acquire additional condition data (e.g., images or video, etc.), whereby the wind effect detection module 1604 may perform a more accurate analysis.

That said, it should be appreciated that the above-described configuration and functionality of the wind effect detection module 1604 may be applied to all functionalities of the present disclosure (e.g., each of the plurality of detection modules 1502, etc.).

The example species detection module 1606 is configured to receive the captured data from one or more sensors 1400 (e.g., the image sensor 1404a, video sensor 1400b, or LiDAR sensor 1400c, etc.) and identify vegetation (e.g., trees, etc.) in the captured data using the deep learning model 1600. The species detection module 1606 is configured to then determine, using the deep learning model 1600, the species of the identified vegetation. The species detection module 1606 is configured to, based on the species of the vegetation, determine whether the species is one that is classified as problematic to the utility infrastructure such as, for example, a species that is more susceptible to failure under external force (e.g., wind, etc.) due to canopy shape and/or wood mechanical properties.

In connection with determining whether the vegetation is a problematic species, the species detection module 1606 may be configure to compare the identified species to a list that includes a plurality of known problematic species and identify the species as problematic based on a match. Known problematic species include those that may have relatively lower wood tensile strengths that are susceptible to wind failure or disease that may cause the vegetation to fall on a power line or other part of the utility infrastructure, such as, for example, Black Oak (*Quercus velutina*), Tanoak (*Notholithocarpus densiflorus*), Gray Pine (*Pinus sabiniana*), Coast Live Oak (*Quercus agrifolia*), Douglas Fir (*Pseudotsuga menziesii*), Blue Gum Eucalyptus (*Eucalyptus globulus*), Valley Oak (*Quercus lobata*), Live Oak (*Quercus wislizeni*), Ponderosa Pine (*Pinus ponderosa*) and Monterey Pine (*Pinus radiata*). Known problematic species also include those that are susceptible to invading the utility infrastructure (e.g., power lines, etc.), such as, for example edible fig, red gum, shamel ash, iceplant, Himalayan blackberry, Brazilian pepper tree, Mexican fan palm, yellow starthistle, Manzanita and Japanese Knotweed, etc.

Using the alert module 1504, the species detection module 1606 is configured to, in response to a determination that the identified species is problematic, cause an alert for identified species to be provided.

In various embodiments, the deep learning model 1600 used by the species detection module 1606 may be configured to use classification, object detection, instance segmentation, and/or semantic segmentation algorithms to identify the vegetation and species thereof in the condition data. For each of these algorithms, the species detection module 1606 may be configured to train or test the deep learning model 1600 using desirable training or test datasets. For classification, the species detection module 1606 may be configured to train the deep learning model 1600 using images or videos of vegetation (e.g., trees, etc.) and to assign an appropriate species label to each image or video. For instance segmentation, the species detection module 1606 may be configured to outline each individual vegetation (e.g., tree, etc.), assign the appropriate species label thereto, and generate a segmentation map. For semantic segmentation, the species detection module 1606 may be configured to assign each individual pixel of the image or video in the condition data a label that specifies whether the pixel is inside the vexation (e.g., a tree, etc.) and if so, the species of vegetation to which the pixel belongs. For tasks, the species detection module 1606 is configured to use an appropriate algorithm or model for the task which may include any machine learning model, including deep learning models such as convolutional neural network and recurrent neural network.

In various embodiments, species detection module 1606 may be configured to determine the species of the vegetation (e.g., trees, etc.) in the condition data using a tree detection algorithm and then classifying the tree by cropping the condition data (e.g., an image, etc.) at the location of the tree and providing the cropped condition data to a vegetation (e.g., tree, etc.) species classification algorithm.

The example wildlife and habitat detection module 1608 is configured to receive the captured data from one or more sensors 1400 (e.g., the image sensor 1404a, video sensor 1400b, or LiDAR sensor 1400c, etc.) and, using the deep learning model 1600, identify wildlife (e.g., migratory birds, etc.) or wildlife habitats (e.g., nests, etc.) in the captured data (e.g., images or video, etc.). The wildlife and habitat detection module 1608 is configured to then, using the deep learning model 1600, determine whether the identified wildlife or habitats are protected, endangered, or otherwise of concern. The wildlife may include, for example, migratory birds (e.g., herons, egrets, bald eagles, warblers, swallows, tanagers and flycatchers, etc.), mole salamanders, true frogs, Giant garter snake, Bald eagle, American peregrine falcon, kangaroo rats, Gray wolf, Island fox, and bighorn sheep, etc. Using the alert module 1504, the wildlife and habitat detection module 1608 is configured to, in response to a determination that the identified wildlife or habitat is protected, endangered, or otherwise of concern, cause an alert for identified wildlife or habitat to be provided, whereby personnel associated with the utility infrastructure may take care not to harm the wildlife or damage their habitats (e.g., when fixing an issue with the utility infrastructure, etc.).

In various embodiments, the captured data received by the wildlife and habitat detection module 1608 from the one or more sensors 1400 may include video clips or a sequence of images. In the case of a sequence of images, the wildlife and habitat detection module 1608 may be configured to generate higher resolution images from the sequence using super-resolution techniques. The wildlife and habitat detection module 1608 may be configured to identify the wildlife or wildlife habitats and to determine whether the identified wildlife or habitats are protected, engaged, or otherwise of concern.

In various embodiments, the wildlife and habitat detection module 1608 is configured to use a deep learning model 1600 based on objection detection techniques, including those based on deep learning to detect wildlife and habitats. The wildlife and habitat detection module 1608 is configured to train and test the deep learning model using collected images that contain, for example, damaged habitats, as well as images that contain habitats in good condition. The wildlife and habitat detection module 1608 is configured to outline all habitats by placing a bounding box around each habitat or outlining the habitat.

The example vegetation condition detection module 1610 is configured to receive the captured data from one or more sensors 1400 (e.g., the image sensor 1404a, video sensor 1400b, or LiDAR sensor 1400c, etc.) and, using the deep learning model 1600, identify vegetation (e.g., trees, etc.) in the captured data (e.g., images or video, etc.). The vegetation condition detection module 1610 is configured to then, using the deep learning model 1600, determine whether the identified vegetation has a disease, stress, infestation, or otherwise poses a hazard to the utility infrastructure. Using the alert module 1504, the vegetation condition detection module 1610 is configured to, in response to a determination that the identified vegetation has a disease, stress, infestation, or otherwise poses a hazard, cause an alert for identified vegetation to be provided, whereby personnel associated with the utility infrastructure may take remove or monitor problematic vegetation.

In various embodiments, the vegetation condition detection module 1610 is configured to use a deep learning model 1600 and detect the conditions of interest in a manner that is consistent with the deep learning model 1600 used by the species detection module 1606. However, the vegetation condition detection module 1610 is configured to train the deep learning model 1600 using training and test data sets that include a set of classes showing different diseases and/or health conditions.

In various embodiments, the vegetation condition detection module 1610 may be configured to, in connection with using the deep learning model 1600 to determine whether the identified vegetation has a disease, stress, infestation, or otherwise poses a hazard to the utility infrastructure, calculate the average color of each identified vegetation (e.g., tree, etc.) within the image segmentation or a manually input polygon. The vegetation condition detection module 1610 may be configured to compare the species of the vegetation (e.g., as determined by the species detection module 1606, etc.), the time of year, and height of the vegetation, with vegetation that are abnormally red or which are missing leaves. The vegetation condition detection module 1610 may then be configured to, for example, automatically flag vegetation as higher risk that matches the abnormally red vegetation. The higher risk flag may be based on abnormally red trees having a higher risk of falling over in high wind and higher risk due to change of ignition due to low water content and dry fuel.

In various embodiments, the vegetation condition detection module 1610 may be configured to, based on an output of the result of a specific disease or stress from the deep learning model 1600, characterize each vegetation (e.g., each tree, etc.) as healthy, dying or dead. In connection therewith, the vegetation condition detection module 1610 may be configured to, if 100% to 60% of the pixels manifest disease or stress, characterize the vegetation as dead. The vegetation condition detection module 1610 may be configured to, if 59.99% to 30% of the pixels manifest disease or stress, characterized the vegetation as dying. The vegetation condition detection module 1610 may be configured to, if less than 30% of the pixels manifest disease or stress, characterize the vegetation as healthy.

The example windthrow detection module 1612 is configured to configure to receive the captured data from one or more sensors 1400 (e.g., the image sensor 1404a, video sensor 1400b, or LiDAR sensor 1400c, etc.) and identify, using the deep learning model 600, power lines in the condition data (e.g., images or video, etc.). The windthrow detection module 1612 is configured to then, using the deep learning model 1600, determine whether a foreign object is impacting the power line. Such objects may include, for example, a tree limb hanging on the power line. Using the alert module 1504, the windthrow detection module 1612 is configured to, in response to a determination that a foreign object is impacting the power line, cause an alert for the identified power line and/or the foreign object to be provided, whereby personnel associated with the utility infrastructure may proactively de-energize the power line to avoid ignition.

In various embodiments, the windthrow detection module 1612 may be configured to train the deep learning model 1600 using training or test data sets that include a set of annotated images or video that show the location of objects hanging on power lines. The location may be specified by any known method, such as, for example, a point inside the object or outline of the object.

The example smoke and fire detection module 1614 is configured to configure to receive the captured data from one or more sensors 1400 (e.g., the image sensor 1404a, video sensor 1400b, the smoke sensor 1400f, the temperature sensor 1400, etc.) and identify, using the deep learning model 600, smoke or fire in the captured data (e.g., images or video, etc.) Using the alert module 1504, the windthrow detection module 1612 is configured to, in response to a determination that an identification of smoke or fire, cause an alert for the smoke or fire condition to be provided.

Figure 21:
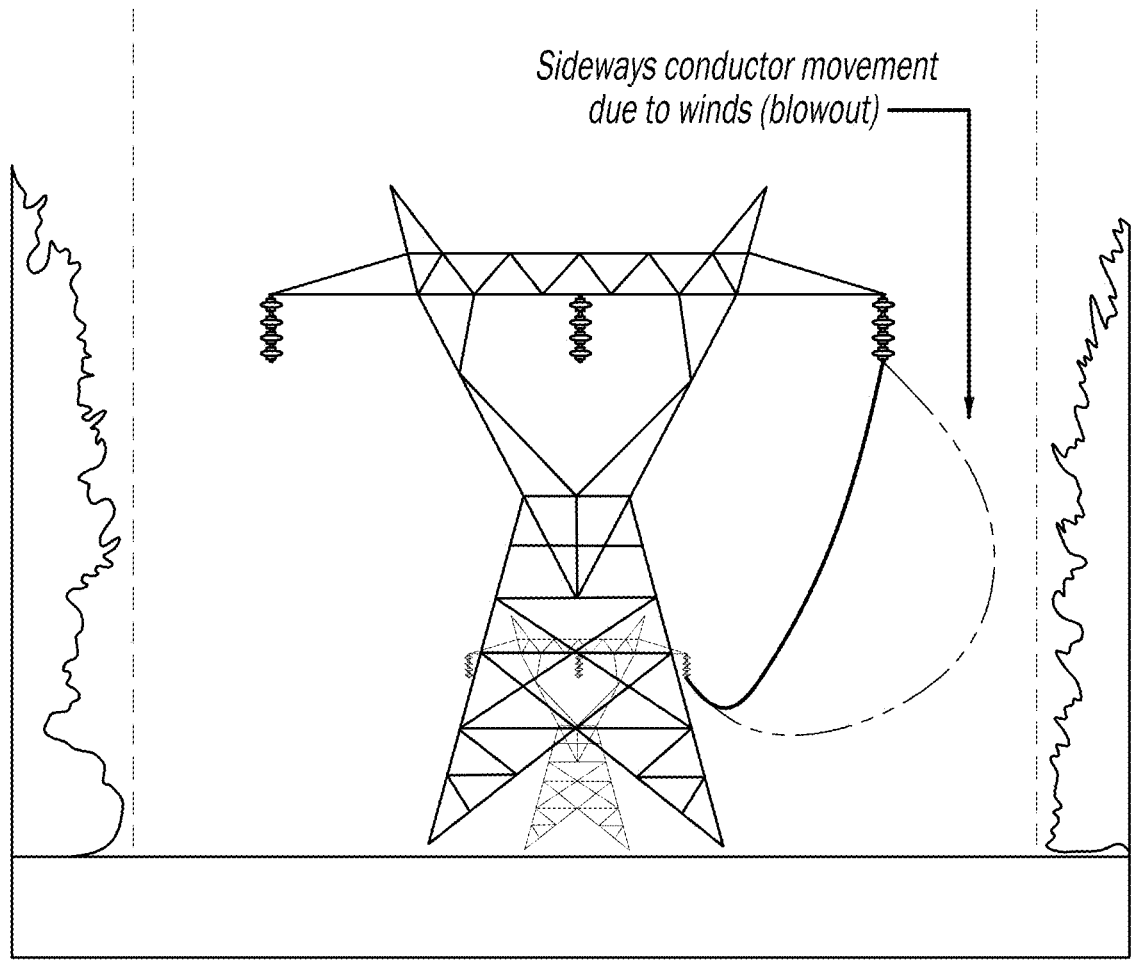
FIG. 21 is a graphical illustration of an example of power line blowout.

FIG. 21 is a graphical illustration of an example of power line blowout, illustrated in connection with a tower that is configured to support three conductors/power lines for three different phases (with only one of three power lines being shown). The example blowout detection module 1616 is configured to receive the captured data from one or more sensors 1400 (e.g., the image sensor 1404a, video sensor 1400b, or LiDAR sensor 1400c, etc.) and, using the deep learning model 1600, identify one or more power lines in the captured data. The blowout detection module 1616 is configured to identify, using the deep learning model 1600, blowout for the identified power lines. Using the alert module 1504, the blowout detection module 1616 is configured to, in response to an identification of blowout for the power lines, cause an alert for the blowout condition to be provided.

In various embodiments, the blowout detection module 1616 is configured to, in connection with determine whether a blowout condition exists for the identified power lines, train or test the deep learning model 1600 using training or test set data that includes at least two classes of data: (1) set of videos clips or image sequences that contain oscillating power lines and (2) set of videos or image sequences of power lines that are not oscillating. The blowout detection module 1616 is configured to detect power lines in the video or images.

The blowout detection module 1616 is configured to then communicate one or more sensors 1400 (e.g., the image sensor 1400a or video sensor 1400b, etc.) to cause the image sensors 1400 to direct focus on the areas in the field of view where oscillation is detected. The blowout detection module 1616 is configured to communicate with the image sensors to cause the image sensors 1400 to acquire new videos or images (alternatively, the blowout detection module 1616 may crop the image or video for further analysis).

In connection therewith, the blowout detection module 1616 is configured to perform object detection using the deep learning model 1600 to detect power lines (training the deep learning model 1600 is performed similarly to instances explained elsewhere herein). The blowout detection module 1616 is configured to then focus on the areas with power lines and classify the video/image sequence into the appropriate class.

In various embodiments, the blowout detection module 1616 is configured to pre-process the image sequence/video before providing the image sequence/video to the deep learning model 1600. The blowout detection module 1616 is configured to use a pre-processing step similar that which is described elsewhere herein, except that pre-processing step may include an additional cropping step right at the beginning of the pre-processing, to thereby focus on the region of the video with power lines. The blowout detection module 1616 is configured to then train the deep learning model 1600 using a training dataset that includes classifications of video clips into a "normal" class or an "oscillation" class. In various embodiments, the deep learning model 1600 used by the blowout detection module may include recurrent neural networks and/or attention networks.

Figure 22:
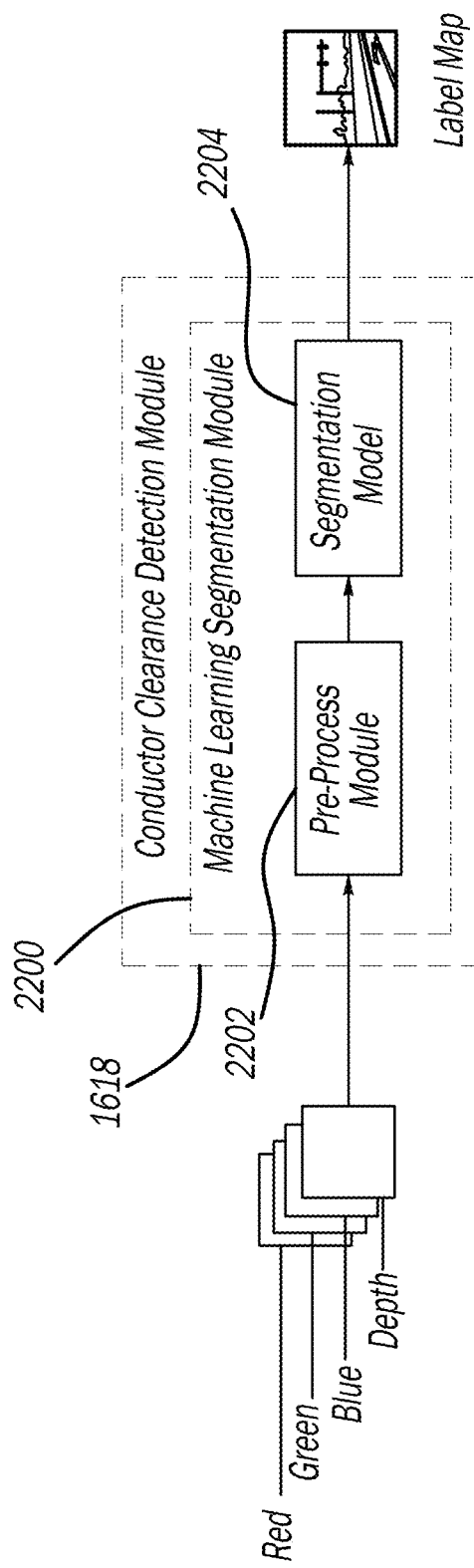
FIG. 22 is a graphical illustration of an example conductor clearance detection module 1618 that may be used in the system of FIG. 13.

FIG. 22 is a graphical illustration of the example conductor clearance detection module 1618. The example conductor clearance detection module 1618 includes a machine learning segmentation module 2200 that includes a pre-process module 2202 and a segmentation model 2204.

Figure 23:
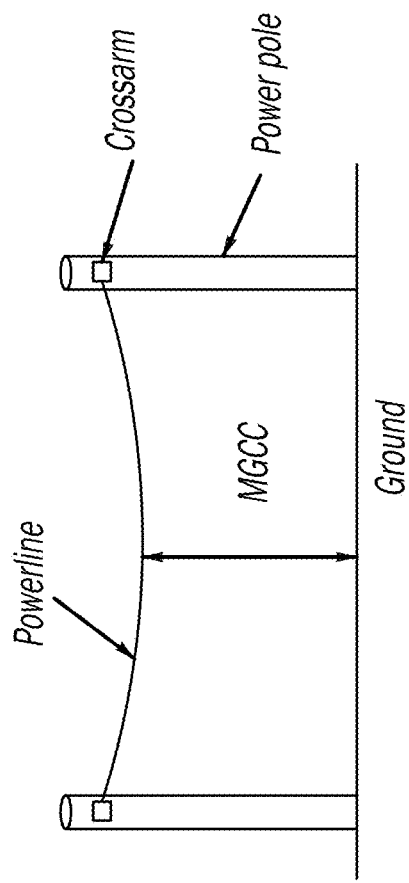
FIG. 23 is a graphical depiction of an example arrangement of a power line spanning between two support structures within a utility infrastructure.

FIG. 23 is a graphical depiction of an example arrangement of a power line spanning between two support structures within the utility infrastructure.

In connection therewith, it should be appreciated that power lines are attached to support structures (e.g., a pole or tower, etc.) in a way that it they form a curved shape between the points of attachments, which is referred to as catenary. This curved shape of the power line causes a varied vertical distance to the ground along the length of the section in between two attachments points which is generally termed as span or bay. This vertical distance between a catenary and ground becomes the minimum at certain point of the span (or bay) depending on the terrain and location of the two consecutive poles or towers forming the span/bay due to sag of the power line under gravity force.

Maintaining a minimum ground clearance distance resulting from the maximum sag for a power line depending on the circuit voltage and geographic location (e.g., high fire treat areas, wildland and urban interface, urban, rural and suburban, etc.) is a regulatory requirement to ensure public safety at all the time.

In certain conditions a power line sag may change. The power line design and construction consider a constant called, catenary constant, C to determine sag of a span, S. The value of this constant may be mathematically derived from the sag tension of the power line $T_0$, material density of power line construction p, cross-sectional area A, and gravitational constant g using the equation no. 1 below.

$$C = \frac{T_0}{\rho g A} \tag{1}$$

Value of the maximum sag (at mid span length in an ideal case) S for a span may be estimated from this catenary constant C length of the span L using equation no. 2 below.

$$S = \frac{L^2}{8C} \tag{2}$$

Constant C is inversely proportional to the sag tension. This means a taut (less sag) power line will have a larger value of C and a sagged (more sag) power line will have a smaller value of C for a given span length. A higher ambient temperature and higher current load will cause a fixed voltage power line to elongate (thermal expansion) resulting more sag and reduced ground clearance distance. It is a dynamic situation with changing operating and ambient conditions that needs to be monitored and controlled for power line safety and reliability.

The conductor clearance detection module 1618 is configured to receive the captured data from one or more sensors 1400 (e.g., the image sensor 1404a, video sensor 1400b, or LiDAR sensor 1400c, etc.) and to estimate, based on the captured data, a distance between the ground and the conductor (e.g., a power line, etc.) using the deep learning model 1600. Using the alert module 1504, the conductor clearance detection module 1618 is configured to, based on the estimated distance failing to satisfy a predefined threshold, cause an alert for conductor to be provided. In various embodiments, the threshold may include a required minimum-ground clearance-to-conductor-clearance (MGCC) distance.

In various embodiments, the conductor clearance detection module 1618 is configured to estimate the distance between ground and the conductor using images from the image sensor 1400a and the LiDAR sensor 1400c. The image sensor 1400a and the LiDAR sensor 1400c may be mounted at the same point, stand, or structure, whereby the LiDAR 1400c is configured to measure the distance between the image sensor 1400a and objects in the field of view of the image sensor 1400a.

In connection therewith, the LiDAR sensor 1400c is configured to generate a "depth" map for the image acquired by image sensor 1400a. Using optical models, the conductor clearance detection module 1618 is configured to register the LiDAR sensor 1400c and the image, whereby there is a known correspondence between pixels in the image and LiDAR points. In this way, the conductor clearance detection module 1618 is configured to estimate depth for each pixel of the image. In another embodiment, one or more reference planes, image reference scale, perspective reference and perspective length calibrations can be used for size and distance measurements.

It should be appreciated that it is possible that the LiDAR data is not dense enough and some image pixels have missing depth values. For these pixels, the conductor clearance detection module 1618 may be configured to interpolate depth from their neighboring pixels that have depth value and belong to the same object (semantic segmentation maps generated by deep learning models can be used here). On the other hand, the conductor clearance detection module 1618 may be configured to map a LiDAR point to a pixel in the image and assign a color (RGB values) to the LiDAR point.

In various embodiments, the conductor clearance detection module 1618 is configured identification objection, including ground and conductors (or power lines) in the condition data (e.g., images or video, etc.) using segmentation techniques, for example, as illustrated in FIG. 22. However, it should be appreciated that any segmentation technique, such as semantic segmentation, object segmentation, etc. can be used, which can be implemented by any method including those based on deep learning.

The conductor clearance detection module 1618 may also be configured, in a first variation, to combine the condition data (e.g., an image, etc.) with a depth map and provide the condition data and depth map as an input to the segmentation algorithm for objection identification. In connection therewith, the conductor clearance detection module 1618 may be configured to generate a depth map with the same size as the RGB image and provide three RGB channels of the image along with the depth map as the fourth channel to the segmentation model 2204.

The conductor clearance detection module 1618 may be configured, in a second variation to assign an RGB vector (red, green, and blue values) to each LiDAR point, whereby point cloud data includes coordinate information and RGB information for each point. The conductor clearance detection module 1618 may also be configured, to perform segmentation, whereby a point cloud with a segmentation label assigned to each point is generated as a segmentation output. The conductor clearance detection module 1618 may also be configured to, in the first variation, to map the segmentation output to the point cloud. Thus, conductor clearance detection module 1618 is configured to generate a point cloud with labels for each point, including conductor and ground labels.

The conductor clearance detection module 1618 may be configured to then calculate a distance between each point on the conductor and each point on the ground to find the minimum distance between the conductor and the ground. Alternatively, in various embodiments, the conductor clearance detection module 1618 may be configured to determine the distance between every point on the conductor and every point on the ground that is within a radius R from the point on conductor, where R is a value equal to or larger than the minimum required distance.

In various embodiments, the conductor clearance detection module 1618 may be configured to use the segmentation label generated by the images to guide the LiDAR sensor 1400c and generate more samples for the targeted areas in the field of view of the LiDAR sensor 1400c. In this way, the conductor clearance detection module 1618 is configured to increase the accuracy of distance measurements.

Figure 24:
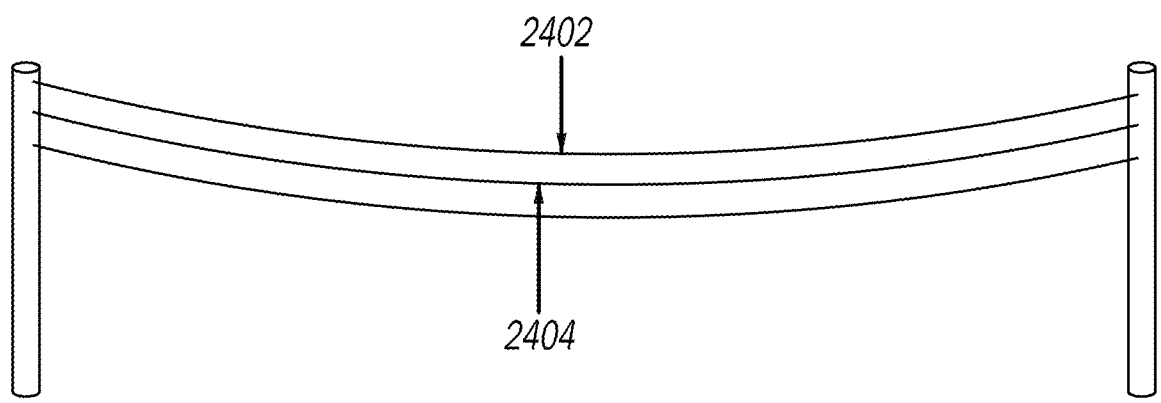
FIG. 24 includes a graphical depiction that illustrates a distance between conductors and that form a span between the two supports structures of a utility infrastructure.

The example conductor distance detection module 1620 is configured to receive the captured data from one or more sensors 1400 (e.g., the image sensor 1404a, video sensor 1400b, or LiDAR sensor 1400c, etc.) and to determine, based on the captured data, a distance between the two difference conductors (e.g., power lines, etc.). FIG. 24 includes a graphical depiction that illustrates a distance between conductors 2402 and 2404 that form a span between the two supports structures (e.g. poles or towers, etc.) of the utility infrastructure.

Using the alert module 1504, the conductor distance detection module 1620 is configured to, based on the determined distance failing to satisfying a predefined threshold, cause an alert for the conductors to be provided. In various embodiments, the threshold may include a required minimum distance between the conductors 2402 and 2404. And, the alert may include, for example, an indication of a violation of a quire minimum distance between the conductors 2402 and 2404 (e.g., due to various reasons including galloping caused by wind, structural damage of the tower or pole, etc.)

In various embodiments, the conductor distance detection module 1620 may be configured to use condition data (e.g., still images or LiDAR, etc.) from the image sensors 1400a and/or the LiDAR sensor 1400c to determine the distance between the conductors. Further, the LiDAR data may be used by the conductor distance detection module 1620 (e.g., with the aid of the blow detection module, 1616, etc.) to account for the conductor oscillation in the distance determination.

In connection therewith, the conductor distance detection module 1620 may be configured to, using the deep learning model 1600, locate the conductors in the images, either alone or in combination with depth maps. In a manner consistent with the conductor clearance detection module 1618, the conductor distance detection module 1620 may be configured to generate labels for points in the point cloud generated using the LiDAR sensor 1400c. The conductor distance detection module 1620 may then be configured to calculate distance between every point on one conductor (e.g., constructor 2402, etc.) and the other conductors (e.g., conductor 2404, etc.) and determine minimum distance between the conductors. In various embodiments, the conductor distance detection module 1620 may be configured to determine the distance between every point on the one conductor (e.g., conductor 2402, etc.) to every point on the other conductor (e.g., conductor 2404, etc.) that is within a radius R from the former point, where R is a value equal to or larger than the minimum required distance.

The example damage and ice detection module 1622 is configured to receive the captured data from one or more sensors 1400 (e.g., the image sensor 1404a, video sensor

1400*b*, or LiDAR sensor 1400*c*, etc.) and to determine, based on the captured data, damage to a power line, support structure (e.g. pole or tower, etc.), or other utility infrastructure equipment, and/or ice formation at the utility infrastructure (e.g., on power lines or support structures, etc.) using the deep learning model 1600.

Using the alert module 1504, the damage and ice detection module 1622 is configured to, in response to the determined damage, cause an alert for the damaged power line, support structure, equipment, and/or ice formation to be provided.

In various embodiments, the damage and ice detection module 1622 module may be configured to is configured to use condition data (e.g., images, etc.) from one or more image sensors 1400*a* or condition data (e.g., video clips, etc.) from one or more video sensors 1400*b*. The damage and ice detection module 1622 module may be configured to use a sequence of images to generate higher resolution images using super-resolution techniques and use the higher resolution images to detect the damage and/or ice formation.

The example environmental encroachment detection module 1626 is configured to receive the captured data from one or more sensors 1400 (e.g., the image sensor 1404*a*, video sensor 1400*b*, or LiDAR sensor 1400*c*, etc.) and to determine, based on the captured data, an environmental encroachment (e.g., an encroachment of vegetation, etc.) or an encroachment of another foreign object on the utility infrastructure (e.g., a pole or tower or a power line, etc.) using the deep learning model 1600.

Using the alert module 1504, the damage and ice detection module 1622 is configured to, in response to the determined encroachment, cause an alert for the encroachment to be provided.

In various embodiments, the environmental encroachment detection module 1626 may be configured to, in connection with determining the environment encroachment, measure a three-dimensional (3D) distance between the utility infrastructure (e.g., a power line, etc.) and an encroaching object (e.g., vegetation, etc.). The environmental encroachment detection module 1626 may be configured to then compare the measured distance to a predefined threshold (broadly, an action threshold) that is based on the voltage rating of the power line.

In connection therewith, the environmental encroachment detection module 1626 may be configured to classify and identify in the condition data (e.g., images, etc.), using bounding box and instance segmentation techniques, ground, power line, support structures (e.g., towers or poles, etc.), vegetation and other objects (e.g., buildings). The environmental encroachment detection module 1626 may be configured to then measure the height of each identified object from the ground to the top most pixel of the identified object and determine whether there is an encroachment based on the height meeting a predefined threshold. The environmental encroachment detection module 1626 may be configured to categorize the determined encroachment as a grow-in, fall-in, or overhang based on the relative location and mechanism of the object in reference to the utility infrastructure (e.g., the power line, etc.).

In various instances, the environmental encroachment detection module 1626 may be configured to measure distance between same class of objects (e.g., conductors, etc.) and, when the distance reaches a predefined threshold, report the distance (e.g., using the alert module 1504, etc.), for example, in the case of a conductor-to-conductor distance among different phases or polarities. In connection therewith, it should be appreciated that it is necessary to maintain a specific minimal distance between two adjacent conductors to avoid contacts and short circuiting and/or sparking under windy or icy conditions.

In various embodiments, the system may include a plurality of sensor packages 1304 and, in particular, a plurality of LiDAR sensors 1400*c*, each mounted at a different known location of (or in the vicinity of) the utility infrastructure (e.g., transmission towers, poles, buildings, ground, etc.). However, the plurality of LiDAR sensors 1400*c* at the different locations may be arranged to have a common field of view, such that the LiDAR sensors 1400*c* are configured to capture data for a common target area.

In connection therewith, the example LiDAR combination module 1626 may be configured to obtain simultaneously (or substantially simultaneously) data captured by each of the LiDAR sensors 1400*c* at the same (or substantially the same) point in time and combine the captured data into a set (e.g., a single set) of point cloud data (broadly, a composite set of point cloud data).

Any one or more the detection modules described in reference to detection module 1502 may then be configured to use the composite set of point cloud data to determine a condition associated with the utility infrastructure (e.g., instead of using single depth map or point cloud generated based on condition data from a single LiDAR sensor 1400*c* (or other sensors), etc.)

Figure 25:
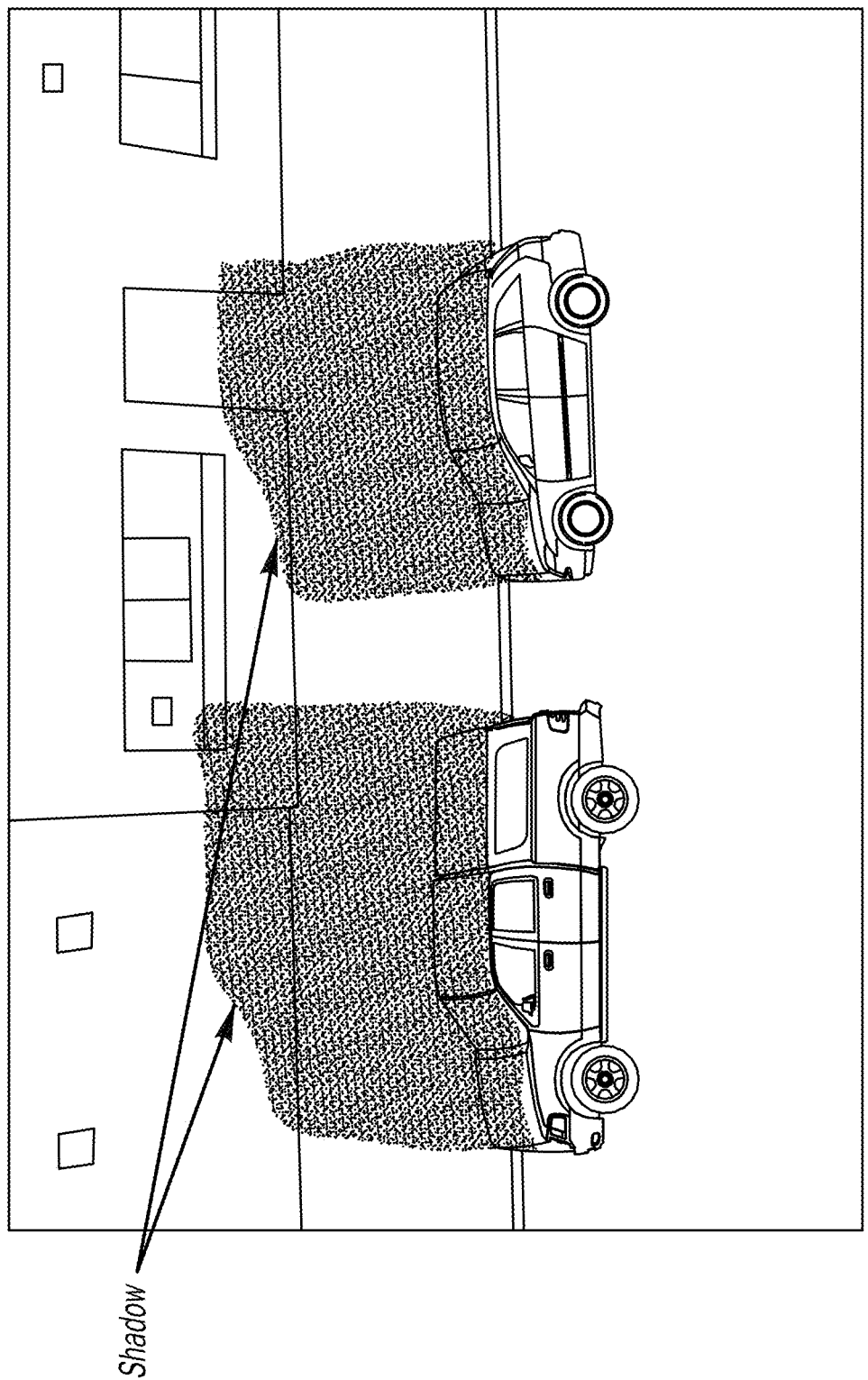
FIG. 25 illustrates a field of view of a single stationary LiDAR sensor.
Figure 26:
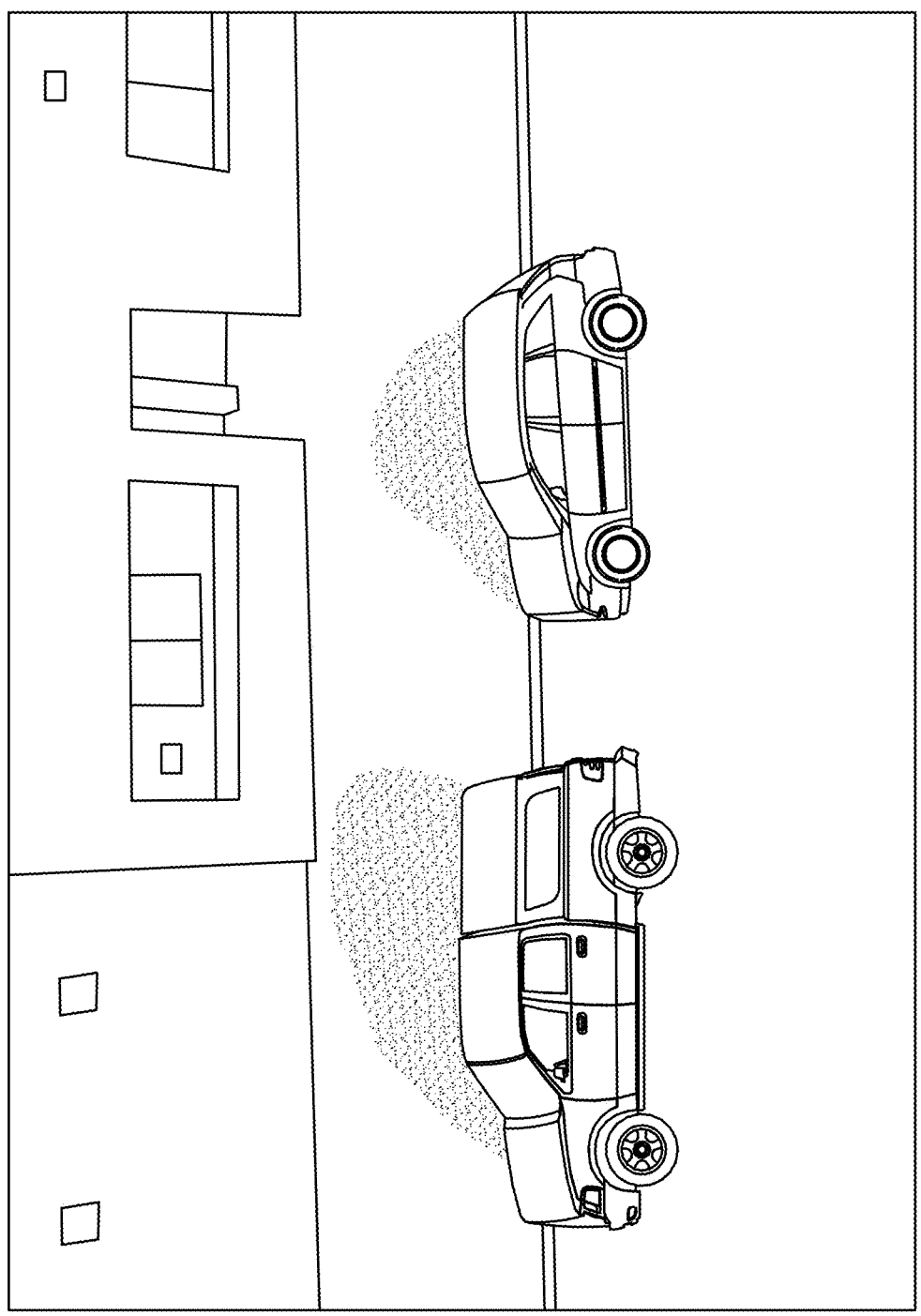
FIG. 26 illustrates composite condition data that is a combination of condition data captured by multiple sensors of the system of FIG. 13 at different locations.

FIGS. 25 and 26 are illustrative of the benefits of the configuration described in reference to the LiDAR combination module 1626. FIG. 25 illustrates a field of view of a single stationary LiDAR sensor 1400*c*. As can be appreciated, the LiDAR sensors 1400*c* with this field of view is not able to obtain condition data for objects behind obstacles (here, automobiles), as emphasized by the shadows therein. FIG. 26, however, illustrates composite condition data that is a combination of condition data captured by multiple sensors 1400 at different locations but with the same field of view. As can be appreciated from FIG. 26, readable condition data may be captured for what would otherwise be a blind spot.

In various embodiments, each LiDAR sensors 1400*c* is GPS- and Internal Measurement Unit (IMU)-enabled, thereby enabling the LiDAR combination module 1626 to combine point clouds generated from the appropriate LiDAR sensors 1400*c* without any large data voids. In various embodiments, each LiDAR sensor 1400*c* is configured to scan the common target area in a pre-programmed sequence, to thereby avoid interface or contamination of signals from one another.

Figure 27:
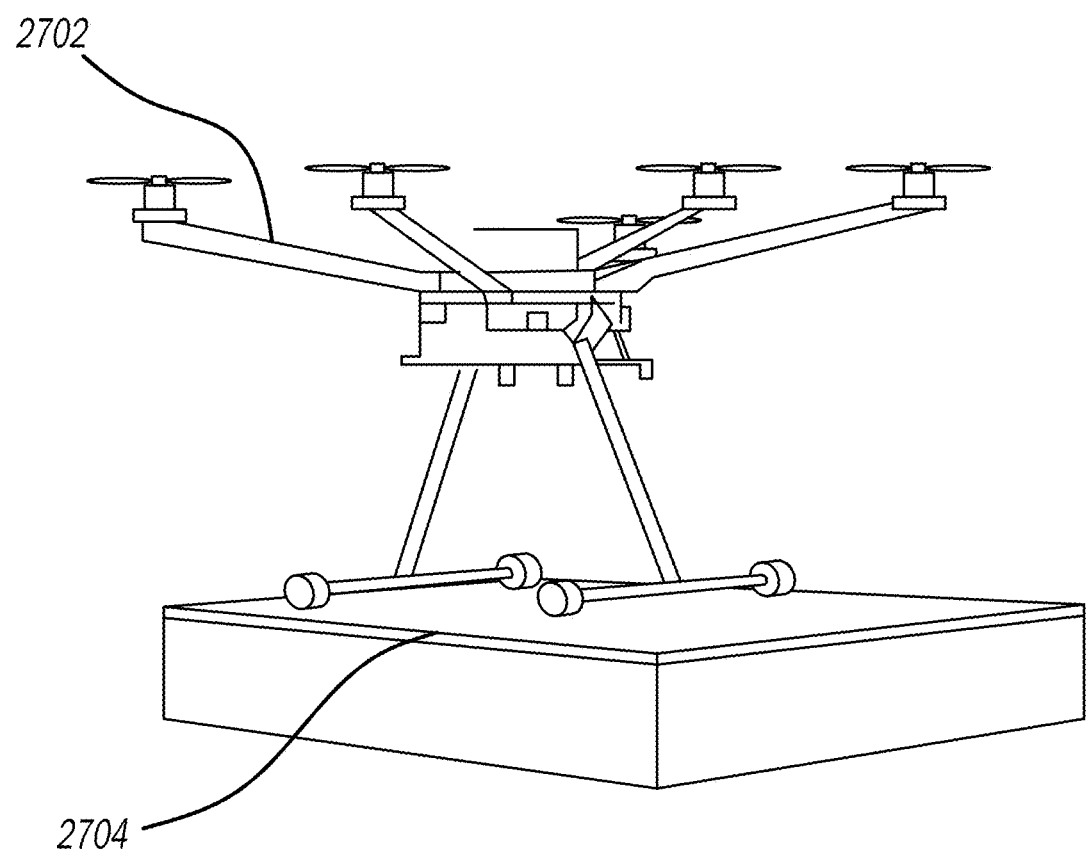
FIG. 27 includes a graphical depiction of an unmanned aerial system (UAS) of the system of FIG. 13.

The example alert module 1504 is configured to receive an indication of the detected condition from each of the detection modules described in reference to the detection module 1502 and, based on the detected condition, transmit an alert for the detected condition to one or more personnel associated with the utility infrastructure, emergency responders, or other individuals and/or computing devices associated with the same. In various embodiments, the transmitted alert includes an indication that the detected condition is (or poses) a hazard (or potential hazard) to the utility infrastructure. The alert module 1504 may also be configured to store the detected conditions in a database, from which the condition information may be accessed for a variety of uses including, for example preemptive de-energization of power line in extreme weather event such as arid high wind or seasonal high wind "Diablo" or "Santa Ana" winds to avoid ignitions from downed power line or structure or equipment In various embodiment, the system 1300 may include a plurality (or a fleet) of unmanned aerial systems (UAS) 2702 (broadly, drones). FIG. 27 includes a graphical depiction of a UAS 2702 and a wireless charging station 2704 for the UAS 2704 on which the UAS 2702 is landed. The wireless charging station 2704 is configured to charge the UAS 2702 using inductive coupling technology.

Figure 28:
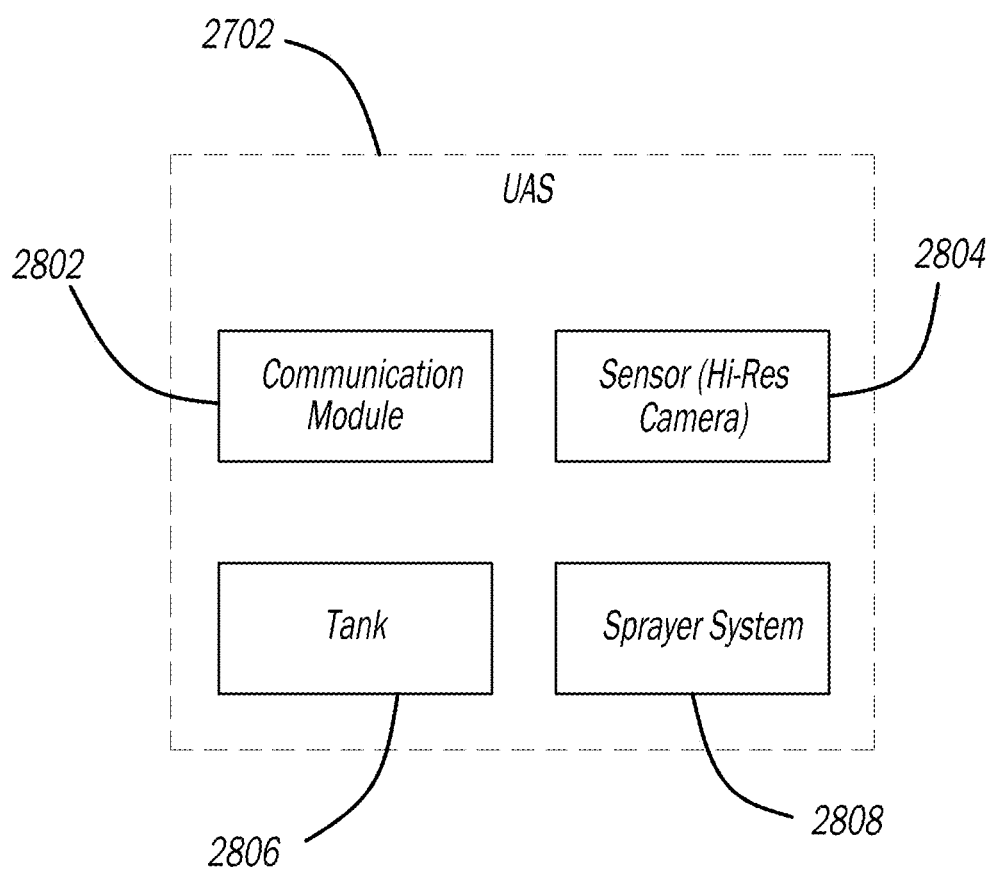
FIG. 28 includes a graphical depiction of a plurality of components of the UAS of FIG. 27.

FIG. 28 includes a graphical depiction of a plurality of components of the UAS 2702, including a communication module 2802, a sensor 2804 (e.g., a high-resolution camera, etc.), a tank 2806 (e.g., a removable tank, etc.), and a sprayer system 2808.

The example communication module 2802 is configured to telemetrically communicate with the sensors 1400 (e.g., image sensors 1400a, etc.) and the monitoring and control module 1306. The sensors 1400 and/or, as described in greater detail, the monitoring and control module 1306, are configured to trigger and control the UAS 2702 to fly along through the utility infrastructure and, in particular, along the power line ROW in response to a detection of an emergency event, such as a spark, ignition, fire, or landslide event (e.g., as may be detected by the detection module 1502) for further retailed investigation from a distance close to the incident location. In connection therewith, the sensor 2804 of the UAS 2702 is configured to capture condition data in the vicinity of flight and provide real-time situational awareness (e.g., live, real-time images or video streaming feeds) of the emergency event (e.g., fire, etc.) to first responding emergency service personnel (e.g., firefighters, members of law enforcement agencies, utility crews, or rescue personnel during an active firefighting or emergency response operation via their mobile devices, etc.)

The example tank 2806 is configured to store as contents a fire-retardant (ammonium polyphosphate or equivalent), water, herbicide, and/or other chemical storage. The example sprayer system 2808 includes a hose, nozzle, and pump and, in connection therewith, is configured to spray the contents of the tank 2806. In various embodiments, the sprayer system 2808 may be configured to disburse contents of the tank 2806 at a location where an emergency event is occurring, to thereby remediate the emergency event (e.g., spraying water or fire-retardant on a fire, etc.). In various embodiments, the sprayer system 2808 may be configured to spray the contents of the tank 2806 for use in vegetation management (e.g., spraying chemicals or herbicides in the power line corridor or ROW based on camera sensor-generated alert, etc.), In various embodiments, the UAS 2702 is configured for guidance by the camera sensors 1400 mounted on the poles or towers of the utility infrastructure, whereby obstacles and collisions are avoided so that the UAS 2702 may fly in compliance with the requirements of the United State Code of Federal Register (CFR) 14, Federal Aviation Regulation (FAR) Part 107 restriction of Beyond Visual Line of Sight (BVLOS) or similar regulations without a human remote pilot in command (PIC), an observer, or similar ground operator.

The system 1300 may include strategically located hangars (e.g., along the power line ROW, etc.) at which the UAS 2702 are configured to park. The hangers may include wireless charging stations (e.g., wireless charging stations 2704, etc.) for the UAS 2702. In this manner, the UAS 2702 may be configured to stop and recharge at intermediate hangers for longer missions, as needed. In addition, the hangers may store fire retardant, water, herbicide, or other chemical prefilled tanks for use by the UAS 2702. While parked at the hangers, the UAS 2707 may be configured to upload visual inspection data captured by the sensor 2804 and vegetation control treatment data via a network connection at the hanger, for example, to a server running in the cloud.

In various embodiments, the poles or towers of the utility infrastructure may include independent, self-powered charging stations attached thereto approximately three to five miles apart. The charging stations may include a cell phone transmitter. A microprocessor of the UAS 2702 may be configured to access the cellular network via the cellular phone transmitter to upload (e.g., to a central server in the cloud or the monitoring control module 1307, etc.) power line, asset, vegetation, and emergency event inspection images captured by the sensor 2804. In various embodiments, the central server may be the same server to which pole or tower mounted sensors 1400 provide (e.g., transmit, etc.) captured data for later analysis.

In various embodiments, the example UAS control module 1506 is configured to dispatch the fleet of UAS 2702 to fly to the location of an emergency event or vegetation condition as described above and to treat the emergency event or vegetation condition as described above.

In various embodiments, where, for example, the system 1300 is configured to for use in monitoring underwater infrastructures, the system 1300 may include, in addition or alternative to the UAS 2702 (or fleet thereof), a fleet of surface and/or submergible autonomously and/or remotely controlled watercrafts (e.g., an unmanned autonomous submarine as described in U.S. Pat. No. 7,290,496 to Asfar et al., etc.). In connection therewith, a watercraft control module (as described above) may be configured to dispatch and/or control the watercraft in a fashion consistent to that which is described above for the UAS control module 1506.

In various embodiments, the sensor nodes 1302 and, in particular, the sensor packages 1304 and/or sensors 1400 are installed at locations of the utility infrastructure (e.g., at a pole or tower, etc.) based on node prioritization variables (NPVs) for the locations. In connection therewith, the system 1300 may include node prioritization module that is configured to determine the node prioritization variables based on a plurality of data parameters. The parameters include a probability of infrastructure failure at each location, severity of the failure at each location, and capability to detect or suppress a condition associated with the failure.

In various embodiments, the node prioritization module may be configured to determine the node prioritization variable, according to equation no. 3 below, where a represents the probability of failure at the location, b represents a magnitude of the severity of the failure at the location, and c represents the magnitude of the capability to detect or suppress a condition associated with the failure.

$$NPV = a \times b \times c \qquad (3)$$

In various embodiments, the node prioritization module may be configured to, for each location, determine the node prioritization variable based on one or more of the following: a type of the utility infrastructure at the location, an age of the utility infrastructure at the location, a voltage of the utility infrastructure at the location, a criticality of the utility infrastructure at the location, a height of a wire of the utility infrastructure from ground at the location, sparking equipment attached to the of the utility infrastructure at the location, a riparian area in a vicinity of the location, a vegetation species in a vicinity of the location, a health of vegetation in a vicinity of the location, and/or a growth rate of vegetation in a in a vicinity of the location.

In various embodiments, the node prioritization module may be configured to determine, for each location, the severity of the failure based on one or more of the following: the location being a high fire threat area, wildland interference in a vicinity of the location, urban interface in a vicinity of the location, the location being in the vicinity of a rural area, the location being in the vicinity of an urban area, a number of critical customers served by the utility infrastructure, potential for propagation of fire from the utility infrastructure, potential for destruction by fire from the utility infrastructure, properties of gas emission from the utility infrastructure greenhouse gas emission from the utility infrastructure, vegetation density in a vicinity of the location, fuel load of the utility infrastructure, climate at the location, terrain in a vicinity of the location, topography of the location, ambient temperature at the location, wind speed at the location, direction of wind at the location, humidity at the location, soil type in a vicinity of the location, vulnerability of the location, the location being a protected area, a presence of protected habitat at the location, the location being an archeological site, and/or the location being a cultural site In various embodiments, the node prioritization module may be configured to determine, for each location, the capability to detect or suppress a condition associated with the failure is determined based on one or more of the following: a width of a right of way (ROW) for the utility infrastructure at the location, an ingress facility being in a vicinity of the location, an egress facility being in a vicinity of the location, a type of road in a vicinity of the location, a traffic capacity of a road in a vicinity of the location, a fire station being in a vicinity of the location, a capacity of a fire station in a vicinity of the location, an air suppression unit being in a vicinity of the location, a capacity of an air suppression unit in a vicinity of the location, and/or a water source being in a vicinity of the location.

In various embodiments, factors a, b, and c are determined by the node prioritization module as unitless numbers derived from a number of independent variables using mathematical models and analysis (e.g., a regression analysis, etc.).

In various embodiments, higher NPV values for a location represent a risker location (e.g., a risker span, pole, tower, etc.) and, therefore, a higher priority location for installation of a sensor node 1302 and, in particular, a sensor package 1304 and/or sensor 1400.

In various embodiments, the sensor nodes 1302 and, in particular, the sensor packages 1302 and/or sensors 1400 may be installed and configured at the locations using a manual calibration and setup process. An example manual calibration and setup process is described below in reference to a sensor 1400 and, in particular, an image sensor 1400*a*. However, this process is similarly applicable to installation of a sensor package 1304, a sensor node 1302, or other type of sensor 1400.

The example manual calibration and setup (MCS) process may include, for each sensor 1400*a*, installing the sensor 1400*a* on or near the electric utility infrastructure. In connection therewith, the sensor 1400*a* may be attached to an electric power pole or tower, a building, on a separate pole, tower, or boom, or on another structure, as desired at each location. In various embodiments, the MCS process may be performed, at least in part, using an MCS module.

The MCS process then includes adjusting the pan, tilt and zoom of the sensor 1400*a* to fit the desired scene to ensure desirable areas are covered within the desirable fields of view of the sensor 1400*a*.

The MCS process then includes viewing the images and adjusting the pan, tilt and zoom settings for the sensor 1400*a* to capture the entire electric utility infrastructure right of way.

The MCS process then includes drawing a line, circle, rectangle, or polygon on one or more images to label and categorize the hazard, environmental encroachment detection threshold, and actions important areas of interest.

In connection with the labeling and categorizing, the MCS process may include, in various embodiments, drawing a polygon on the image around the electric conductors where there is no vegetation, labeling the area as conductors with no vegetation and defining the action that if any vegetation occurs inside the polygon to automatically send a warning. The MCS process may then include drawing a line on the image on the edge of the vegetation, labeling the line vegetation edge and, if any vegetation occurs on other side of the drawn line, automatically sending a warning. The MCS process may then include drawing a circle on the image to identify the area where the electrical conductors are the closest to the ground, labeling it as the minimum-ground-to-conductor-clearance (MGCC) distance, and automatically sending a warning if the distance is reduced to more than an action threshold.

Also in connection with the labeling and categorizing, the MCS process may then include, drawing a polygon on the image to show the outline of individual trees, vegetation, electric infrastructure equipment, poles, towers, conductors, cross arms, transformers, guy wires, buildings, label these regions with the appropriate unique identification value, specifications and metrics, and send a warning if these values change more than an action threshold. Drawing a polygon around any known hazard trees, label it with the unique hazard tree identification number and send a warning if any parts of the tree extend beyond the polygon or move within the polygon more than an action threshold. The MCS process may then include drawing a polygon around a tree trunk and drawing a line on the tree trunk aligned with the average centerline angle of the tree trunk, labeling the polygon as tree trunk and the line as tree lean with the appropriate tree ID number, and send a warning if the value changes more than an action threshold in any direction. The MCS process may then include drawing a line to show the closest distance between any hazard such as vegetation and the electric conductors or other infrastructure, and sending a waring in the values changes more than an action threshold.

The MCS process next includes, using a calibration measuring tool (e.g., a laser range finder or measuring tape, etc.), measuring the size and distance of the next electrical infrastructure (e.g., pole, tower, building, or other structure), and inputting the measurement into sensor 1400*a*. It should be appreciated that the distance between electrical infrastructure is relatively constant and this measurement can be used as a calibration factor to assist with measuring distance and size of objects by counting pixels at any pan, tilt, or zoom setting. The size of the object can also be used as a reference to count pixels at any pan, tilt, or zoom setting.

The MCS process next includes running an initial image processing sequence that segments the image and classifies the objects in the image. The MCS process next includes manually selecting each object and naming the selected objects, including the individual trees, other vegetation, vegetation species, and health conditions. The MCS process next includes labeling the infrastructure components such as poles, towers, cross arms, insulators, splices, bolts, communications wires, transformers, guy wires, signs, and/or other components. The MCS process next includes adding the electric infrastructure equipment ID, voltage, age, materials of construction (wood, metal or composite), number of conductors and conductor arrangement and conductor type and material.

The MCS process next includes manually measuring the electrical conductor (power line) closest distance to the ground in the span or multiple spans assigned to the sensor 1400a. The MCS process next includes inputting the distance(s) from the sensor 1400a and the value of the MGCC.

The MCS process next includes drawing a circle in the image over the zone of the conductor minimum ground clearance to record the pan, tilt, and zoom settings of the sensor 1400a to focus on the area of the conductor minimum ground clearance. The MCS process next includes record the number of pixels between the conductor and the ground at the minimum clearance area and calibrating the number of pixels the measured distance. The MCS process next includes recording the ambient temperature, wind speed and direction, voltage, amps and overall condition of the span, pole, tower, crossarms, splices, insulators, hooks and/or bolts of the utility infrastructure.

The MCS process next includes selecting points in the scene to record the pan, tilt, and zoom settings. In connection therewith, it should be appreciated that these settings are of particular concern for vegetation encroachment, such as potential grow-in or fall-in vegetation.

Next in the MCS process, if other data such as LiDAR data, hyperspectral or photogrammetry derived data, or geographic information system (GIS) vegetation and electrical infrastructure inventory data exists, the MCS process includes inputting the results and statistics from that data into the sensor data system. In various embodiments, inputting the results and statics may be performed remotely using GIS processing tools to "spatially join" attributes from existing data to each sensor node 1300 represented by a GIS data layer. Then the sensor node 1300 GIS data layer may be used to update all the power line assets and vegetation inventory GIS data. Inputting the results and statistics may also be performed manually by extracting the attributes from other data sets and inputting the attributes into each sensor 1400a at the time of installation and performing a quality control review to ensure all the pre-loaded and setup data is correct for that location of the sensor 1400a. Inputting the attributes may include adding assets and vegetation identification numbers, vegetation species, health, risk assessment value (e.g., NPV value), status, height, trunk diameter at breast height (DBH), volume, fire risk, falling risk, growing risk, growth rate to each tree or vegetation.

Next in the MCS process, after the sensor 1400a is installed and the initial image processing is completed, all the trees and vegetation are identified. In connection therewith, the MCS process includes automatically or manually assigning a unique identification number to each tree or vegetation. The MCS process also includes manually or automatically measuring the location in terms of latitude and longitude and elevation using a GPS system (or other coordinate system of choice), or measuring the distance and bearing or distance and location to each tree and vegetation.

The MCS process next includes manually measuring a subset of the tree's height and trunk DBH and distance and location relative to the sensor 1400a and absolute location on the earth, and inputting the distance and location into the data attributes for the region of the image classified as the specific tree. This information is then used to calibrate pixel counting algorithms at various pan, tilt, zoom settings.

The MCS process next includes using image processing such as pixel counting at various pan, tilt, and zoom settings and comparing the known size and location of trees and objects, such as the adjacent power infrastructure pole, tower, cross arm, building or other structure. The MCS process also includes calculating which trees could potentially fall into the conductors or poles/towers, calculate which vegetation could grow into the infrastructure, and calculate the volume of vegetation which can be used to calculate the fire fuel loading.

In the MCS process, during the initial setup, the user may manually adjust the image segmentation results to properly identify the boarder of each individual tree and vegetation to the most accurate extent possible. In a very dense forest, it may not be clear exactly how many trees there are as some trees may have multiple trucks coming from the apparent ground or many trees may be in view behind other trees which obscure the exact number of trees in a single span between electrical poles or tower. After each tree or vegetation segmentation is adjusted, the overall color of each tree is recorded by averaging the pixel colors and this is saved with the time of year and location to track the tree or vegetation health. Depending on the species, location and time of a season the vegetation color is expected to change. The changes of all the similar trees in the sensor 1400a's view and in the sensor network in that region can be compared and recorded to find vegetation which changes color abnormally compared to the other vegetation of the same species in the same region. The vegetation that changes color or size abnormally is automatically flagged for inspection by remotely viewing the vegetation using the image camera 1400a. If during that inspection any concern or hazard is found then a manual inspection is used to verify or mitigate the hazard Also during initial setup in the MCS process, a quality control calculation is performed. After the system is metrologically, radiometrically and telemetrically calibrated by using the size and location of known objects (such as the adjacent power line, pole or tower or building, cross arm, transformer, insulator, etc.), the system will calculate the height and location of unknown objects such as trees or vegetation, rocks, vehicles, or other known targets placed into the scene. The results of the calculation are then compared to manual measurements using standard tools, such as laser range finders or measuring tape, to compare the results and ensure the system is performing within desired measurement accuracy requirements.

The MCS process next includes updating the power line assets and vegetation inventory GIS data layer periodically or when a change is detected with sensor system data, such as tree dimensions, height, tree trunk lean, and distance between objects and risk and status of each tree, vegetation, pole, tower, conductor, guy wire, cross arm, and other components and equipment.

Figure 29:
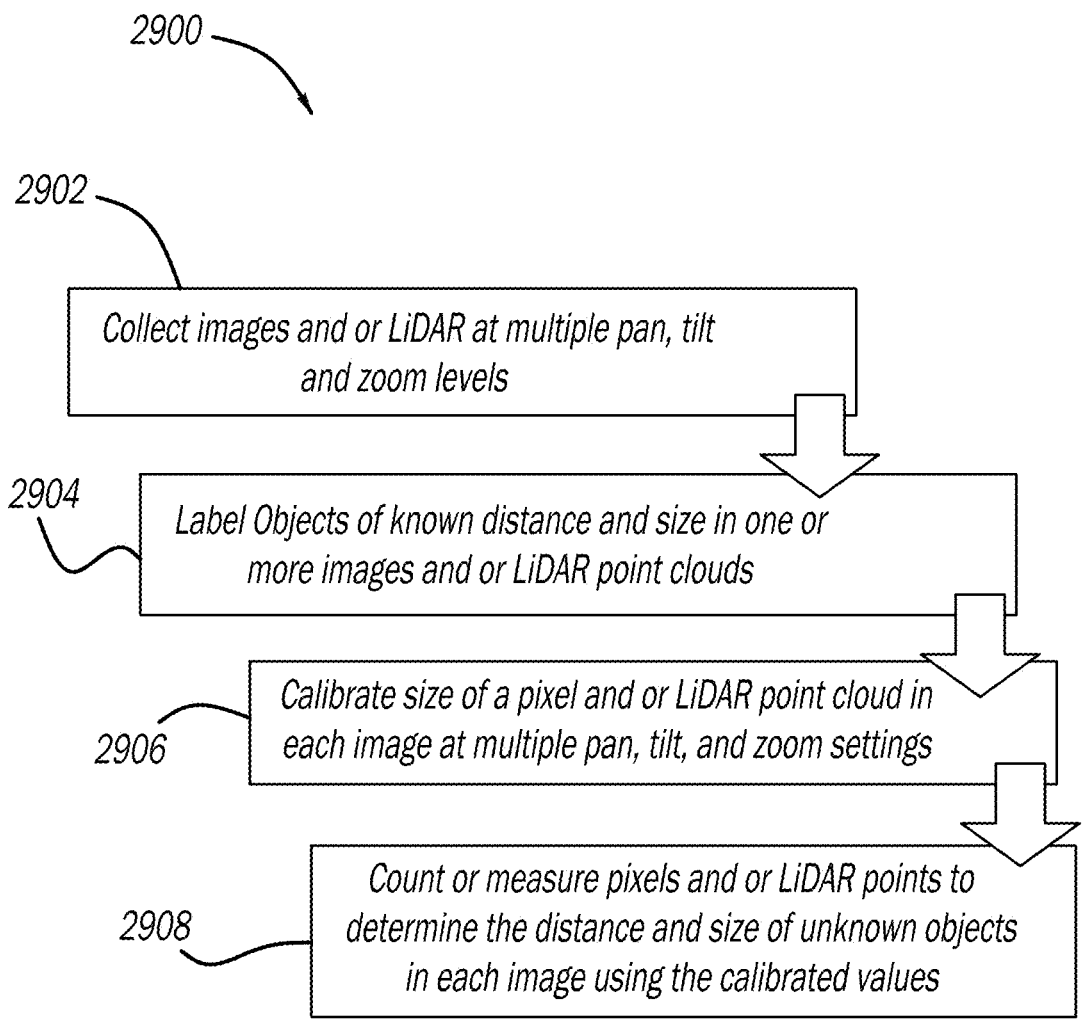
FIG. 29 includes steps of a method, suitable for use with the system of FIG. 13, that may be performed in accordance with calibrating a sensor of the system of FIG. 13.

FIG. 29 includes steps of a method 2900, suitable for use with the system 1300, that may be performed in accordance with calibrating a sensor 1400. At 2902, the method includes collecting images and/or LiDAR data at multiple pan, tilt, and zoom levels. At 2904, the method includes labeling objects of known distance and size in one or more images and/or LiDAR point clouds. At 2906, the method includes calibrating size of a pixel and/or a LiDAR point cloud in each image at multiple pan, tilt, and zoom settings. At 2908, the method includes counting pixels and/or LiDAR points to determine the distance and size of unknown objects in each image using the calibrated values.

Figure 30:
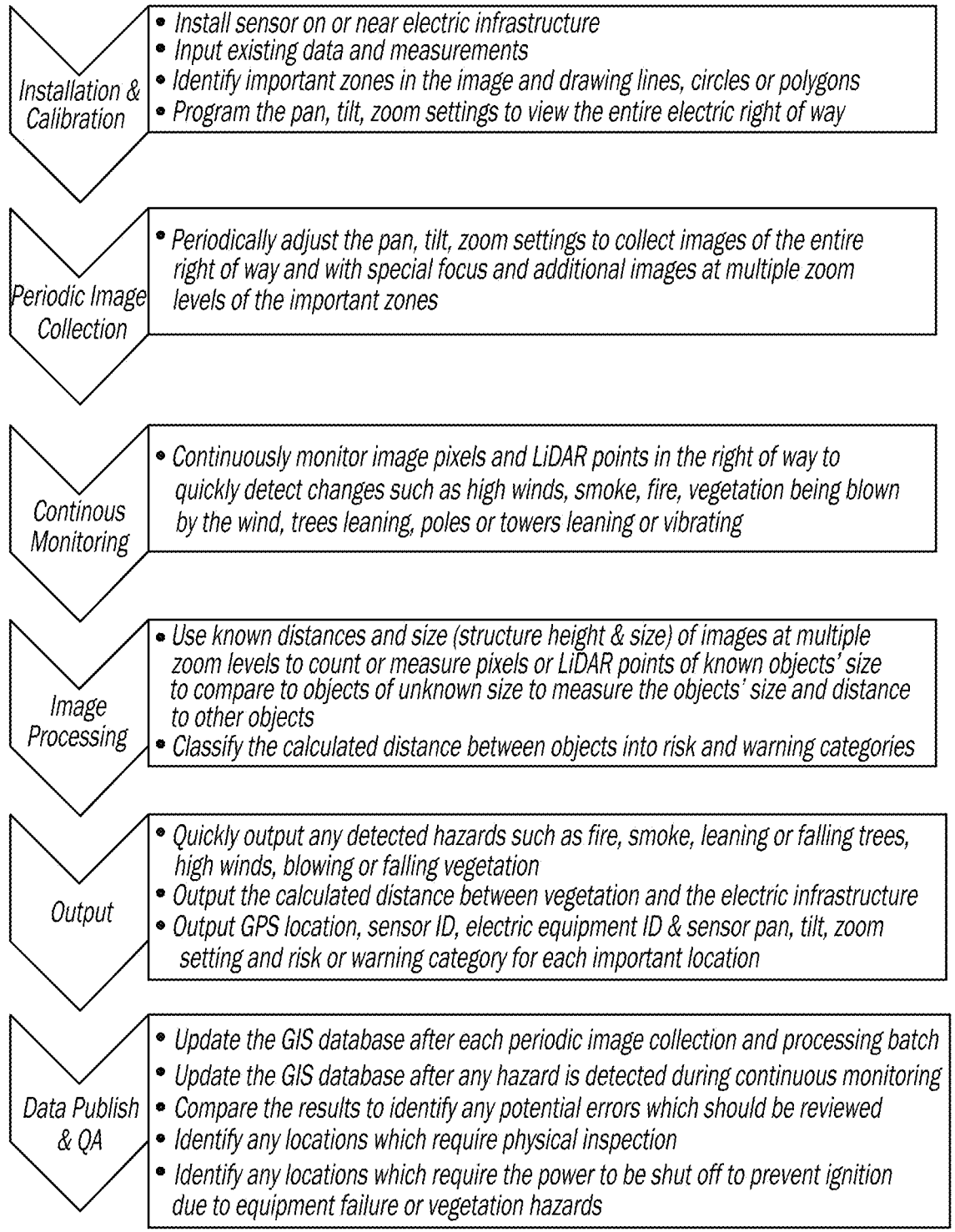
FIG. 30 includes steps of a method, suitable for use with the system of FIG. 13, that may be performed in accordance with installing a sensor of the system of FIG. 13, calibrating the sensor, sensing conditions, and reporting the conditions.

FIG. 30 includes steps of a method 3000, suitable for use with the system 1300, that may be performed in accordance with installing a sensor 1400, calibrating the sensor 1400, sensing conditions, and reporting the conditions.

In various embodiments, existing data such as GIS or LiDAR derived data may be used, for each sensor 1400, to calibrate the distance from the sensor 1400a to each vegetation (e.g., tree, etc.) in the right of way (ROW) of the utility infrastructure. In various embodiments, existing data such as GIS or LiDAR derived data may be used, for each sensor 1400, to calibrate the distance from each vegetation (e.g., tree, etc.) to the electrical conductors and poles or towers in the ROW of the utility infrastructure.

Given these embodiments a skilled person in the art will realize many possible optional and combinational embodiments to optimize the type of sensor packages, installation locations, fields of view, scan range, coverage based on variations in the number of conductors in a power line corridor, the design of the transmission towers or power poles, length of spans and the type of vegetation and proximity detection requirements based on MVCD requirements.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

The phrase at least one of A, B, and C should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. References to multiple processor circuits encompass multiple processor circuits on discrete dies, multiple processor circuits on a single die, multiple cores of a single processor circuit, multiple threads of a single processor circuit, or a combination of the above.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for monitoring a utility infrastructure, comprising:
    a node installed at a stationary tower or pole location, wherein the node includes a sensor configured to capture data associated with an area of the utility infrastructure;
    a detection circuit configured to:
        obtain the captured data from the sensor; and
        based on the captured data, determine whether a condition associated with the area of the utility infrastructure poses a risk of hazard to the utility infrastructure; and
    a control circuit configured to, based on a determination that the condition associated with the area poses a risk of hazard to the utility infrastructure, cause an unmanned aerial system (UAS) or watercraft to be dispatched.

2. The system of claim 1, wherein the control circuit includes a watercraft control circuit configured to cause a watercraft to be dispatched the watercraft comprising a watercraft-mounted sensor, a communications transmitter configured to transmit captured data from the watercraft-mounted sensor to the control circuit associated with the pole or tower-mounted node, and the control circuit associated with the node causing the watercraft to move adjacent to the location in an autonomously or remotely controlled manner.

3. The system of claim 1, wherein the control circuit includes an unmanned aerial system control circuit configured to cause an unmanned aerial system to be dispatched, the unmanned aerial system comprising a camera, a sprayer and a tank connected to the sprayer, the tank containing at least one of: a fire-retardant, water or herbicide, and the pole or tower-mounted sensor providing information to assist in guiding the unmanned aerial system to a desired location adjacent the utility infrastructure.

4. The system of claim 1, wherein the system further includes an alert circuit configured to, provide a live video feed of the condition to a receiver, and the stationary tower or pole has a high voltage electrical wire of the utility infrastructure mounted thereto.

5. The system of claim 4, wherein the condition includes a fire, and the node includes at least one camera.

6. The system of claim 1, further including:
    a wind effect detection circuit configured to, based on the captured data, detect motion of vegetation in a vicinity of the utility infrastructure with at least one camera; and
    based on the captured data, determine whether the motion poses a potential risk of hazard to the utility infrastructure.

7. The system of claim 3, further including the unmanned aerial system, wherein:
    the unmanned aerial system includes:
        a sensor;
        a communication circuit;
        a tank; and
        a sprayer system;
    the sensor is configured to capture data associated with the utility infrastructure;
    the communication circuit is configured to communicate the captured data to a receiver; and
    the sprayer system is configured to disperse a content of the tank onto the hazard.

8. The system of claim 7, wherein the communication circuit us configured to provide a live video feed of the condition to a receiver.

9. The system of claim 3, wherein the unmanned aerial system control circuit is configured to cause the unmanned aerial system to be dispatched to remedy the hazard, and the tank contains the herbicide.

10. The system of claim 3, wherein the unmanned aerial system control circuit is configured to cause the UAS to be dispatched to surveil the hazard, and when the unmanned aerial system is parked at a hanger, the unmanned aerial system is wirelessly charged and uploads visual inspection data and vegetation control treatment data via a network connection.

11. A system for monitoring a utility infrastructure, comprising:
(a) a node installed at a location within the utility infrastructure;
(b) a wind detection sensor configured to capture data associated with an area of the utility infrastructure, the wind detection sensor operably detecting real-time motion of a power line in a vicinity of the utility infrastructure, the wind detection sensor including at least one camera mounted to a stationary pole or tower;
(c) a detection circuit configured to:
obtain the captured data from the sensor;
automatically cause the at least one camera to adjust and perform multiple scans for a power line span;
based on at least the captured data, determine whether a condition associated with the area of the utility infrastructure poses a hazard risk; and
(d) a control circuit configured to cause an unmanned autonomous vehicle to be dispatched based at least in part on the hazard risk determination, the control circuit including a controller.

12. The system of claim 11, wherein the control circuit is configured to move the unmanned autonomous vehicle along the power line in response to detection of an emergency event, and monitor capturing of real-time images in the vicinity of the power line by the unmanned vehicle.

13. The system of claim 11, further comprising:
the unmanned aerial system autonomously controlled to fly along the power line, in response to at least the power line motion detection, the unmanned aerial system comprising:
a communications circuit configured to send the images to a remote user;
a tank, within which is a fire-retardant; and
a sprayer configured to disperse the fire-retardant onto the hazard.

14. The system of claim 11, wherein the controller automatically causes the at least one camera to adjust a field of view and perform the multiple scans for the power line span including images of nearby vegetation, in response to at least the power line motion detection.

15. The system of claim 1, wherein the node sensor is the at least one camera which provides a utility infrastructure-mounted camera image or video sensor, and the node further comprises an accelerometer sensor, a humidity sensor, a temperature sensor, a light sensor and a wind sensor.

16. The system of claim 1, wherein the node comprises a heater activating in response to an ambient temperature reaching a predefined threshold.

17. The system of claim 1, further comprising programmed instructions operably detecting ice on a power line, and sending an alert signal when the ice is detected.

18. The system of claim 1, further comprising a vibration detection module including programmed instructions operably detecting motion or vibration of the pole or tower of the utility infrastructure.

19. The system of claim 1, further comprising a blowout detection module, mounted to the utility infrastructure, including programmed instructions operably detecting power line blowout due to wind.

20. The system of claim 1, wherein the detection circuit is configured to identify a power line, from a plurality thereof, within detected blowout data from video clips or image sequences captured by the sensor which includes a camera.

21. A system for monitoring a utility infrastructure, comprising:
(a) at least one camera and at least one sensor installed on a stationary tower or pole location, the at least one camera and the at least one sensor being configured to capture data associated with an area of the utility infrastructure which includes a power line;
(b) a detection processor circuit configured to:
obtain the captured data from the at least one camera and the at least one sensor; and
based on the captured data, determine whether a condition associated with the area of the utility infrastructure poses a hazard risk;
(c) a blowout detection processor circuit operably detecting blowout of the power line due to wind, based on inputs from the at least one camera and the at least one sensor;
(d) a vibration detection circuit operably detecting motion or vibration of the pole or tower of the utility infrastructure; and
(e) a controller configured to cause an unmanned aircraft to be dispatched to remedy the hazard risk, based on a determination that the condition associated with the area of the utility infrastructure poses the hazard risk.

22. The system of claim 21, wherein the unmanned aerial system comprises:
a camera;
a communication circuit connected to the camera;
a tank; and
a sprayer connected to the tank, the sprayer system being configured to disperse a content of the tank onto the hazard.

23. The system of claim 21, wherein the detection processor circuit uses a deep learning model trained by historical data and previously determined conditions, and an alert circuit transmitting an alert along with a real-time live video feed to an emergency responder or utility infrastructure person.

24. The system of claim 21, wherein the unmanned aircraft comprises a tank containing a herbicide configured to manage vegetation in the area of the utility infrastructure based on an output from the controller.

* * * * *